United States Patent [19]

Norell

[11] Patent Number: 5,634,126
[45] Date of Patent: May 27, 1997

[54] SOFTWARE PROGRAM STRUCTURE AND METHOD FOR MODULIZING THE OPERATIONS OF A TELECOMMUNICATIONS SYSTEM

[75] Inventor: Bror L. Norell, Älvsjö, Sweden

[73] Assignee: Telefonaktiebolaget LM Ericsson, Stockholm, Sweden

[21] Appl. No.: 451,072

[22] Filed: May 25, 1995

Related U.S. Application Data

[63] Continuation of Ser. No. 112,809, Aug. 27, 1993, abandoned.

[30] Foreign Application Priority Data

Aug. 28, 1992 [SE] Sweden ................................. 9202488
Mar. 25, 1993 [SE] Sweden ................................. 9301000

[51] Int. Cl.$^6$ .................................................. G06F 15/00
[52] U.S. Cl. .................................................. 395/674
[58] Field of Search .............................. 395/600, 650, 395/700; 455/39

[56] References Cited

U.S. PATENT DOCUMENTS

| | | | |
|---|---|---|---|
| 5,280,610 | 1/1994 | Travis, Jr. et al. | 395/600 |
| 5,303,375 | 4/1994 | Collins et al. | 395/650 |
| 5,303,379 | 4/1994 | Khoyi et al. | 395/700 |

FOREIGN PATENT DOCUMENTS 405 829  1/1991  European Pat. Off. .

OTHER PUBLICATIONS

K. Maruyama et al., "Object–Oriented Switching Program Structure", *Electronics and Communications in Japan*, Part 1, vol. 75, No. 6, pp. 26–40 (1992).

R. Bruins, "Stored Program Controlled Telecommunication Services", *IEEE International Conference on Communications*, vol. 4, pp. 1632–1636 (1990).

K. Maruyama et al., "A Concurrent Object–Oriented Switching Program in Chill", *IEEE Communications Magazine*, vol. 29, No. 1, pp. 60–68 (1991).

*Primary Examiner*—Kevin A. Kriess
*Attorney, Agent, or Firm*—Burns, Doane, Swecker & Mathis

[57] ABSTRACT

The invention relates to a telecommunication system provided with resources and with software which controls the individual resources and also the manner in which the resources cooperate mutually at a system level. In accordance with the invention, the software is divided into two parts. The first part, called object logic, comprises a number of object units, each of which represents an individual type of resource. Further, each object unit includes operations for controlling its individual resource. An individual type of resource may be used for a number of different purposes. The second part, called control logic, includes a number of control cases. Each control case, in turn, combines a number of object units in a superordinate fashion, to control the mutual cooperation of corresponding resources irrespective of the manner in which an individual object unit is intended to influence its resource. A control case includes a number of control stages, each of which has only one input, at least a first operation, called control stage operation, and at least one output. The control stages of a control case are mutually connected by links, each of which is designed to connect an output of a preceding control stage with the input of a following control stage. The points at which links are connected to the control stages are called potential connection points to which additional control cases, called control case features, can be connected to the control case in which the control stages are present, called the basic control case, for modification of the basic control case.

30 Claims, 34 Drawing Sheets

Fig 7

```
class Y    {
    public:
        Y()   { //START SEQUENCE } ;
        virtual  ~Y ()  { //END SEQUENCE };
        int op1();
        int op2();
}
int Y ::op1()  {
    //op1 procedure
}
int Y ::op2()  {
    //op2 procedure
}
```

Fig 8

```
X=new Y    {
. . .
X->op1();
X->op2()
delete (X)
```

Fig 18a
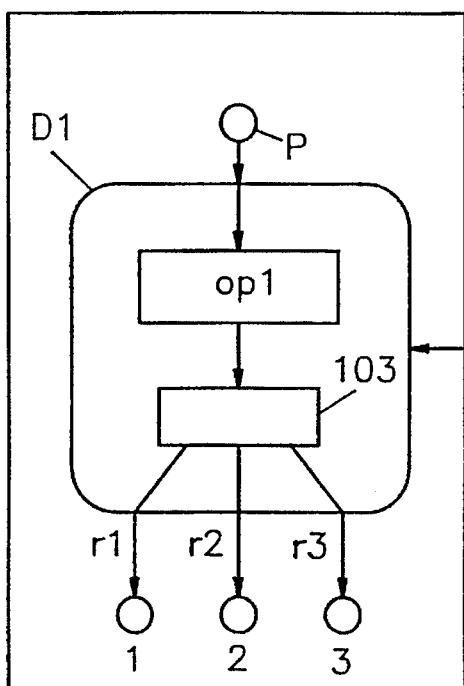
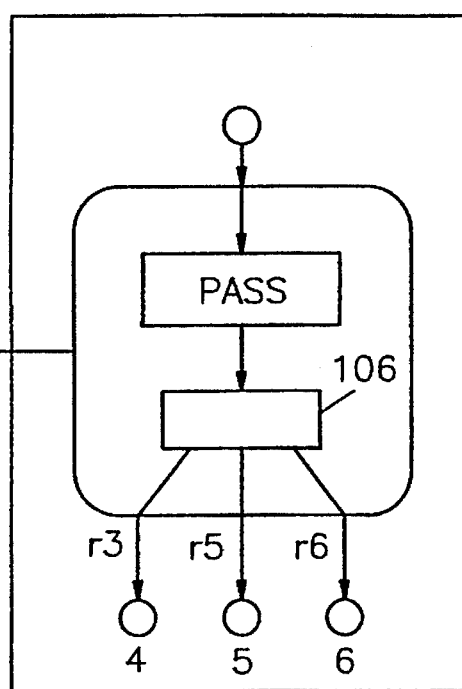
Fig 18b
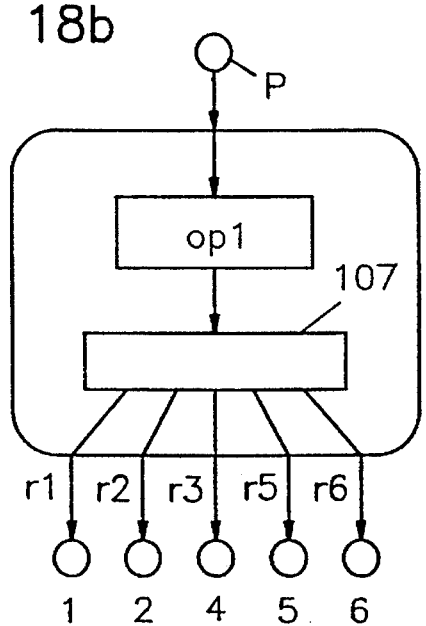

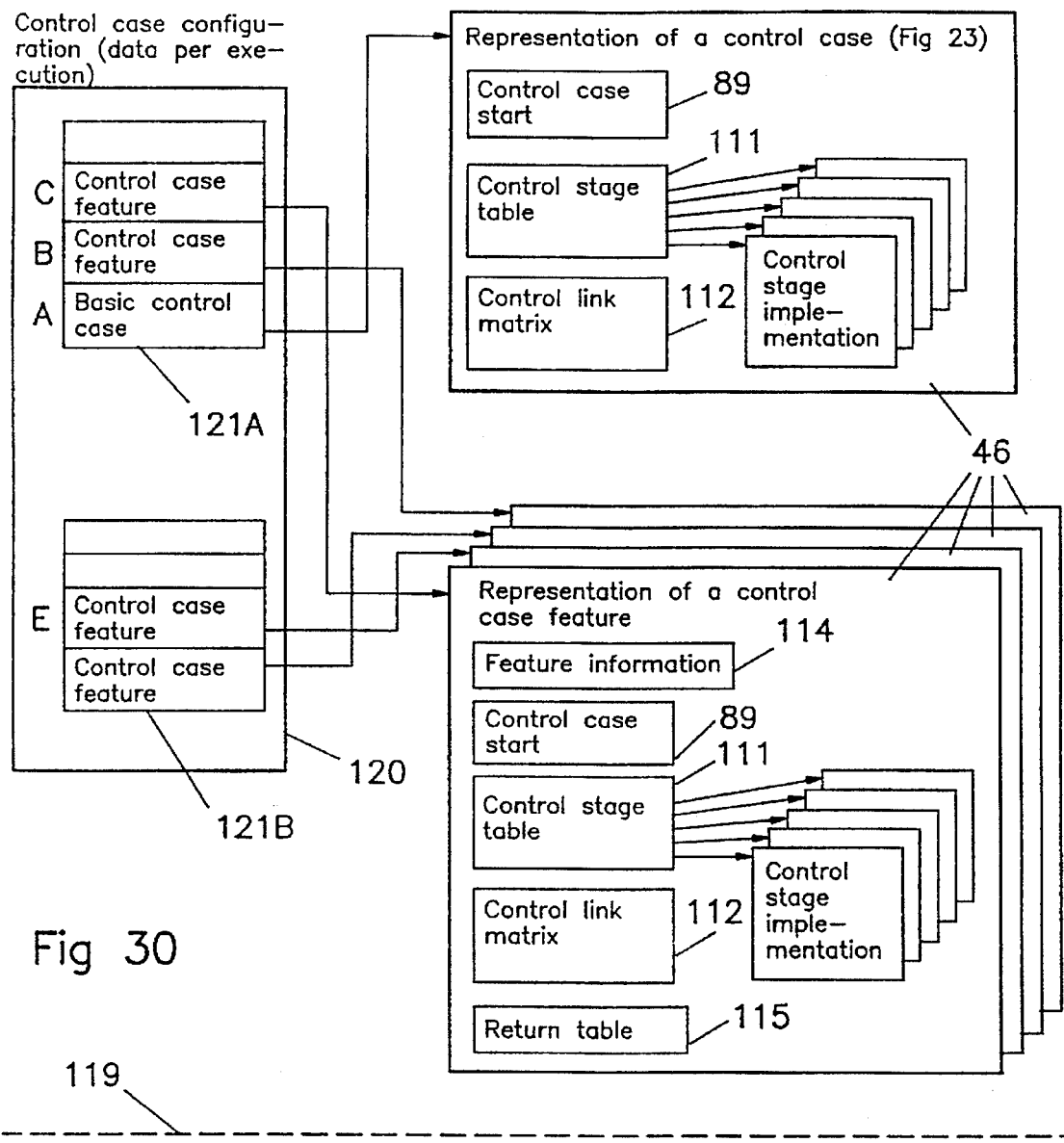
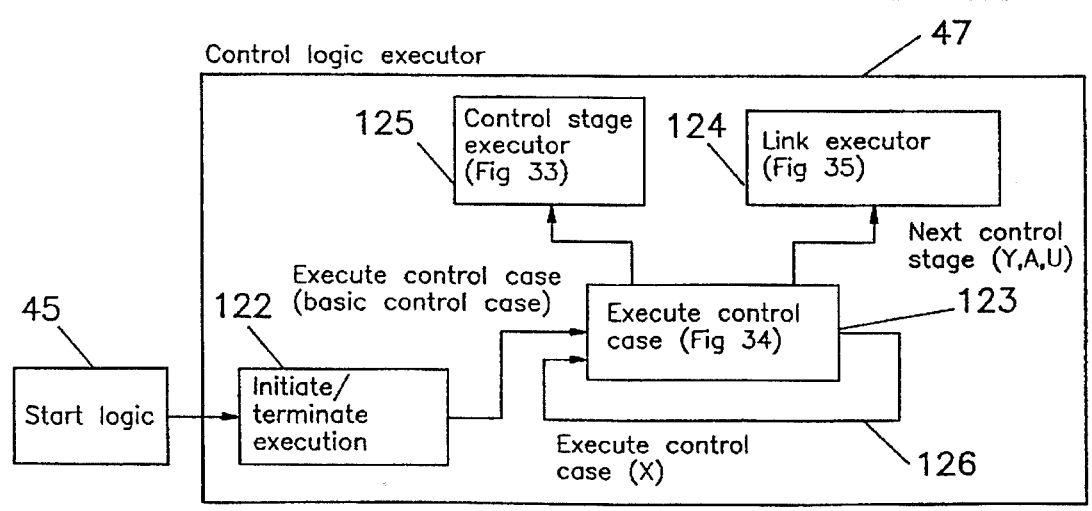
Fig 30

Call of function with input parameter X and output parameter Y

Call of function which has the alternative responses A and B with response data (X) and (Y)

Entry point in the definition of a function

Return from a function definition

Loop

Fig 38

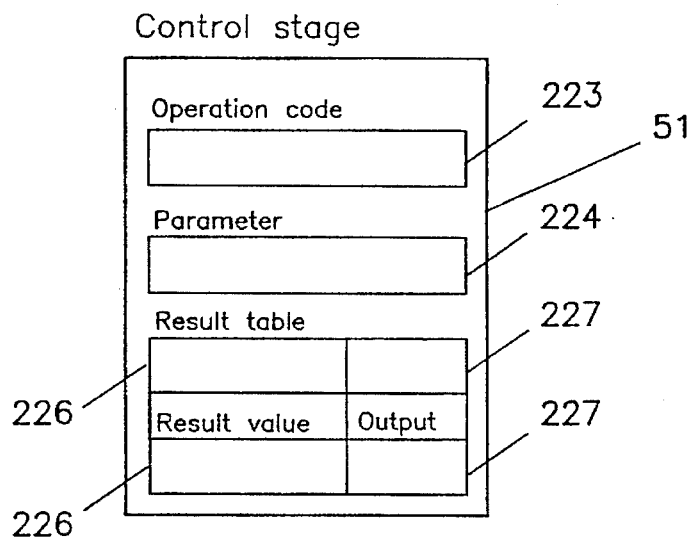

Table 1

| Operation code | Operation | Parameters | Result |
|---|---|---|---|
| 1 | Overlay control case | 1 Identity of control case features that shall be added to the now executing configuration<br>2 Priority (0=observing) | Lacking |
| 2 | Create object | 1 Identity of the object unit for which a new object shall be created<br>2 Reference for this object | Lacking |
| 3 | Pass | Lacking | Lacking |
| 4 | Object operation | 1 Reference to object<br>2 Operation | Maps result value to output |
| 5 | Part-sequence | Reference to part-sequence | Lacking |

SOFTWARE PROGRAM STRUCTURE AND METHOD FOR MODULIZING THE OPERATIONS OF A TELECOMMUNICATIONS SYSTEM

This application is a continuation of application Ser. No. 08/112,809, filed Aug. 27, 1993 now abandoned.

TECHNICAL FIELD

The present invention relates generally to a method and to an arrangement by means of which a functionality in a telecommunication system can be quickly changed. By telecommunication system is meant telecommunication, devices and arrangements and methods by means of which such devices and arrangements can be operated. The term telecommunication arrangement as used here also includes the network or networks in which communication takes place. By telecommunication network is meant a typical telephone network, a telex network, a circuit switched data network, picture information transmission network, a private telecommunication network, a radio network, a satellite communication network and general carriers of telecommunication services. Communication can be effected by analog transmission, digital transmission, synchronous multiplex transmission or asynchronous multiplex transmission. This list is given merely by way of example and has no limiting effect on the invention.

By functionality is meant the ability to carry out a function in a telecommunication network. Examples of functionality are activities and services that can be performed in the telecommunication network. Examples of functionalities are the ability to establish a connection or signal route or path between two parties, and the digit analyzing, billing, operating and maintaining of functions.

By connection is meant a circuit switched connection or packet switched connection. In the case of a circuit switched connection, it is meant by establishing a connection that a circuit switched connection is established between two pieces of hardware terminal equipment, while in the case of a packet switched connection relationships are created between logic channels on physical links which mutually connect nodes in the telecommunication network.

One main problem with present-day telecommunication systems is that the systems must be tailor-made to a large extent, so that they can be adapted to network operators in different markets. A telecommunication system that has been developed for a network operator in one market, for instance the European market, cannot be used by another network operator in another market, for instance the U.S.A. market, since the different network operators place different demands on the configuration of the telecommunication services. The work required in tailoring an existing telecommunication system to comply with the requirements of a network operator is a highly comprehensive operation on a system level. The task is sometimes impossible to achieve with reasonable work inputs, since the changes required become much too complicated.

A telecommunication system is a complex arrangement which constantly changes. The hardware involved changes with time, as a result of continuous development in appropriate technologies. Telecommunication networks are extended into new geographical areas, and users come and go.

Different users within one and the same telecommunication network require different services. For instance, company users require the network operator to handle and control certain specific network services, while private users require the network operator to handle and control other specific network services which differ from the former. Different company users may also require access to mutually different network services. Consequently, a telecommunication system must be capable of providing the network operator with a system which can be readily adapted to the requirements of different subscribers with regard to telecommunication services, preferably by the actual network operator.

Different markets may also have different requirements as to how one and the same service shall be implemented with respect to hardware and software. It may be possible in one market to implement a functionality with the aid of one certain piece of hardware, while in another market, it may be possible to implement the functionality with other hardware that is different from the first-mentioned. The opposite may also occur, namely that the same may be programmed to carry out different functions in different markets. In both cases, the software which controls a functionality on one market differs from the software which controls the same functionality on another market. This creates problems when wishing to make changes in the telecommunication system on a system level, since the change will influence the software used in the different markets.

The present-day technique of tailoring telecommunication systems to meet the aforesaid requirements of the network operator is highly deficient in several aspects.

KNOWN TECHNIQUES

The telephone system AXE 10 retailed by the Swedish company Ericsson can be adapted to different markets by enabling the use of specific hardware for different work tasks, and also by enabling a particular piece of hardware to be replaced with another without needing to reprogram on a system level. To make this possible, when constructing the telephone exchanges of the telephone system the system constructors have prepared each telephone exchange for connection to predetermined types of functionalities that have been envisaged by the system constructors to be necessary in the future. This preparation resides in the construction of separate interfaces which permit predetermined types of future functionalities to be added to the telephone system. Attempts have been made to make these interfaces as general as possible within the framework of the type of functionality concerned.

However, it is difficult to try to anticipate at the construction stage of a telecommunication system all conceivable futuristic functionalities that may be required but which do not yet exist.

The known technique only provides a limited possibility of adapting the telecommunication system. The only functionalities which can be changed and varied are those functionalities for which the system has been prepared. The number of possible variants is limited. The task of changing a functionality where the system has been prepared for making such a change is time consuming. The known technique provides no solution to the problem of adapting a telecommunication system to an end user who requires the telecommunication system to handle a novel type of functionality for which the system has not been prepared.

When a new functionality for which the telecommunication system has not been prepared is to be constructed, or configured, problems occur. For instance, it is necessary to ascertain whether or not the new functionality can be combined with the functionalities possessed by the existing telecommunication system.

In order to ascertain whether or not the new functionality can be combined with existing functionalities, it is necessary to investigate the functions of the telecommunication system as a whole and also to investigate the different functions of the individual existing functionalities and also the function of the new functionality. Since a telecommunication system is highly complex, this analysis is often very comprehensive and difficult to carry out, even when several system constructors work together. The incorporation of the new functionality in the existing telecommunication system constitutes a problem, since no prepared interfaces are included in the system. It is possible that the entire telecommunication system must be reconstructed in order to adapt the system to the new functionality. It is also possible that an existing interface in the telecommunication system must be reconstructed and made more general in order to enable the new functionality to be connected-up in the system. On the other hand, it may be necessary to construct an entirely new interface.

The development of a new functionality requires the assistance of system constructors that have a special competence in this field. More particularly, the system constructors must have detailed knowledge of the function of the telecommunication system, more specifically knowledge of how the system resources shall be used in order to implement the desired new functionality. Such competence is very rare, which is a disadvantage.

The document Electronics and Communications in Japan, Part 1, Volume 75, No. 6, June 1992, K. Maruyama et al, "Object-Oriented Switching Program Structure" pages 26–40 and the document IEEE Communications Magazine, Volume 29, No. 1, January 1991, K. Maruyama et al, "A concurrent Object-Oriented Switching Program in Chill", pages 60–68 do both describe an object oriented program for controlling a switch. Chill is an object-oriented programming language. The two documents are almost identical and therefor only the first one will be described. There is first created a logical model of a switch and its resources. The model has three layers, a service layer, a resource layer and an execution control layer. Each logical component in the different layers is implemented as a software "object".

An object at the service layer sends a request message to a resource allocation object at the resource layer. A resource is seized, the object-ID of the resource is returned and then the seized resource is controlled from the resource layer by sending logical messages to the "object-ID".

At the service layer there is a call-control object (in reality there are two call-control objects, one associated with the caller and one associated with the callee). A call-control object receives among other things the digits dialled by the caller. The digits are analyzed by a service analyzer object so as to establish the type of the requested service. A call control-object shall not comprise all "features" of a requested service. Each service should be packaged individually as an independent program.

The term "service scenario" class definition is introduced. The service analyzer object dynamically creates a service scenario object from the class definition and returns a scenario object-ID to the call control object. Afterwards the call-control object executes the scenario object.

The program structure makes it easy to maintain and modify a complex software system and does also allow for distributed processes.

The software described in the two documents is divided into two parts, a first one is called logic at the resource layer and relates to the resources of the telecommunication system, and the second one is called logic at the service layer and relates to control of the resources at the resource level.

The logic at the service layer handles and controls functions on a system level. For instance, to enable a telephone exchange operator to enter certain data, to enable an operator to take a specific subscriber line interface into operation, to enable a subscriber to make a telephone call, i.e., it controls external functions which the telecommunication system provides for its environment, i.e., its operators, subscribers, etc. The logic at the service layer includes a control program for each such function on a system level, these control programs combining the system resources mutually in a desired manner, irrespective of how each specific resource is implemented.

A switch is, for instance, hardware which contributes to the utility of enabling two connections to be coupled together and to enable this utility to be used for different functions, for instance for a first function in which two speech channels are connected together, and a second function in which a signal path or route is established for an internal signalling arrangement in the network, and a third function which enables a rented or hired line to be connected to a company. One and the same resource can thus be used in many different functions. The logic at the service layer defines which.

A service scenario utilizes the resources via a standardized interface towards the logic at the resource layer. This enables one and the same operation towards the logic at the resource layer to be used in totally different contexts and by several different service scenarios in creating different functions in the surroundings of the telecommunication system.

For instance, the logic at the service layer is able to define the procedure to be carried out when connecting a telephone call from a subscriber; the logic at the resource layer makes subscriber stages, switches and trunk lines available to the logic at the service layer. Definitions of what shall be carried out at system level, for instance the procedures to be followed with regard to the aforesaid telephone call, are found in a service scenario. A service scenario defines a desired functionality by defining different operations which control a number of resources in a manner to obtain the desired functionality.

The aforesaid structuring of the software into logic at the service layer and logic at the resource layer makes it easy to change a functionality in the system, for instance to add to an existing functionality or service, since the logic at the service layer is not dependent on how the resources are implemented. Access to people having the aforesaid specialist knowledge is not required when introducing a new functionality into the telecommunication system. It is sufficient to use only two types of constructional engineer, of which one type need only know the function of the telecommunication system on a system level, while the other need only have knowledge of parts of the telecommunication system on a detail level, more specifically knowledge of how the resources shall be used to implement the desired new functionality. The first type of construction engineer, or designer, need have no knowledge of the system on a detail level, while the second type of construction engineer, or designer, need not have knowledge of the function of the system on a system level. The first type of designer is a programmer who programs the logic at the service layer, while the second type of designer is a programmer who programs the logic at the resource layer.

This enables a functionality to be tailored for a given market or for a given customer, with reasonable work in put.

Existing services can also be supplemented with new services, while existing services can be modified, and different traffic parameters can be measured and determined and billing procedures changed, etc., in a ready fashion, since the system programmer need not know how the system resources concerned are configured structurally.

A drawback with the technique taught by two documents is that a service scenario is created from a fixed class definition. Once a particular service scenario has been programmed, it cannot be modified.

DISCLOSURE OF THE INVENTION

The present invention uses a similar structuring of the software of a telecommunication system. The logic at the service layer is referred to as control logic while the logic at the resource layer is referred to as object logic.

An object of the invention is to reduce the above-mentioned disadvantages inherent in the known technique by defining so called control cases of a specific structure that makes it possible to statically or dynamically modify the control case. Modification is enabled by so called control case features.

DISCLOSURE OF THE INVENTION

The present invention uses a similar structuring of the software of a telecommunication system. The logic at the service layer is referred to as control logic while the logic at the resource layer is referred to as object logic.

An object of the invention is to reduce the above-mentioned disadvantages inherent in the known technique by defining so called control cases of a specific structure that makes it possible to statically or dynamically modify the control use. Modification is enabled by so called control case features.

According to the present invention, the control logic is structured in control cases and control stages or steps. A control case includes one or more object unit control stages. A control stage includes an input, at least one output, and one or more operations which can act on one or more of the object units. The control stages of a control case, are mutually connected by means of links. Each link functions to connect an output from a preceding control stage to the input of a subsequent control stage. One or more links from one or more preceding control stages can pass to the same input on a subsequent control stage.

A control case supplementary feature is supplementary to a control case. A control case feature supplementary to the aforesaid control case concerning a telephone call from a subscriber may, for instance, change the billing of the call. Billing may be different in different markets. Thus, different control case features are constructed for different markets, despite the fact that the control case is the same.

According to the present invention, it is possible to modify an existing control case. The control case to be modified, hereinafter referred to as the basic control case, is modified by overlaying or superimposing one or a number of control case features on the basic control case. A control case feature includes one or more control stages. According to the invention, each control case has a number of potential points, called switching points, to which control case features with which the basic control case is to be modified can be connected with the aid of links. A control case feature can take over, or accept, the continued execution of the basic control case, either on the input to or on one of the outputs from a control stage in the basic control case. When a control case feature has taken over execution from the basic control case, continued execution is effected by the control stages in the control case feature, wherein actual modification of the basic control case occurs until the control case feature hands over continued execution to the basic control case. A control case feature can hand execution back to the basic control case, either on the input to a control stage in the basic control case or on one of the outputs of said control stage. According to the invention, there are three different types of control case features or auxiliaries. The first type, called control stage specialization, is one in which the control case feature concerned specializes the control stage (in the basic control case) from which execution was taken over. The second type of control case feature, called the input takeover feature, is one in which the control case feature replaces the control stage (in the basic control case) from which execution was takenover. The third type, called output takeover feature, is one in which the basic control case is expanded with new control stages.

According to the invention, a control case feature can modify a basic control case in three different ways, or rather on three different occasions. According to the first procedure, the basic control case is modified in conjunction with programming the control logic, i.e. the control case feature is bound firmly to the basic control case in conjunction with programming the telecommunication system or in conjunction with packaging the program prior to delivery. Alternatively, the control case feature can be bound to the basic control case when loading the control logic into the unit, for instance a telephone exchange, whose purpose is to control those resources that are subordinate to the control logic. In this way, the control case feature is bound firmly to the basic control case and remains bound until it is replaced with a new control case feature at a later time. This procedure retains the possibility of combining selected, different control case features to a basic control case on the occasion of delivering the telecommunication system, so as to adapt the system to a specific market. A third method of modifying a basic control case to a feature control case is to bind the control case feature to the basic control case dynamically with each connection established, for instance with each telephone call in the case of telephony, or with each session in the case of communication between processors.

According to the invention, there is provided a control logic executor, also called a control case interpreter, which functions to interpret and control execution of a control case. The inventive control logic executor is characterized in that it has a unitary interface towards object units that are created with the object logic, and towards all control cases. The control logic executor activates the control stages in sequence in a control case.

BRIEF DESCRIPTION OF THE DRAWINGS

An exemplifying embodiment of the invention will now be described in more detail with reference to a telephone network and also with reference to the accompanying drawings, in which

FIG. 7 illustrates an example of an object unit shown in FIG. 5, represented in C++ code;

FIG. 8 illustrates how an object of the type shown in FIG. 5 can be created with the aid of the code shown in FIG. 6;

FIG. 12 illustrates switch interaction between the control logic executor and the control stage in FIG. B1a;

FIG. 18A illustrates modification of a control case by result expansion;

FIG. 18 illustrates the equivalent control stage in FIG. 18A;

FIG. 30 illustrates the generic structure of a control case;

FIG. 38 illustrates a control state in the form of data structure.

BEST MODES OF CARRYING OUT THE INVENTION

Figure 1:
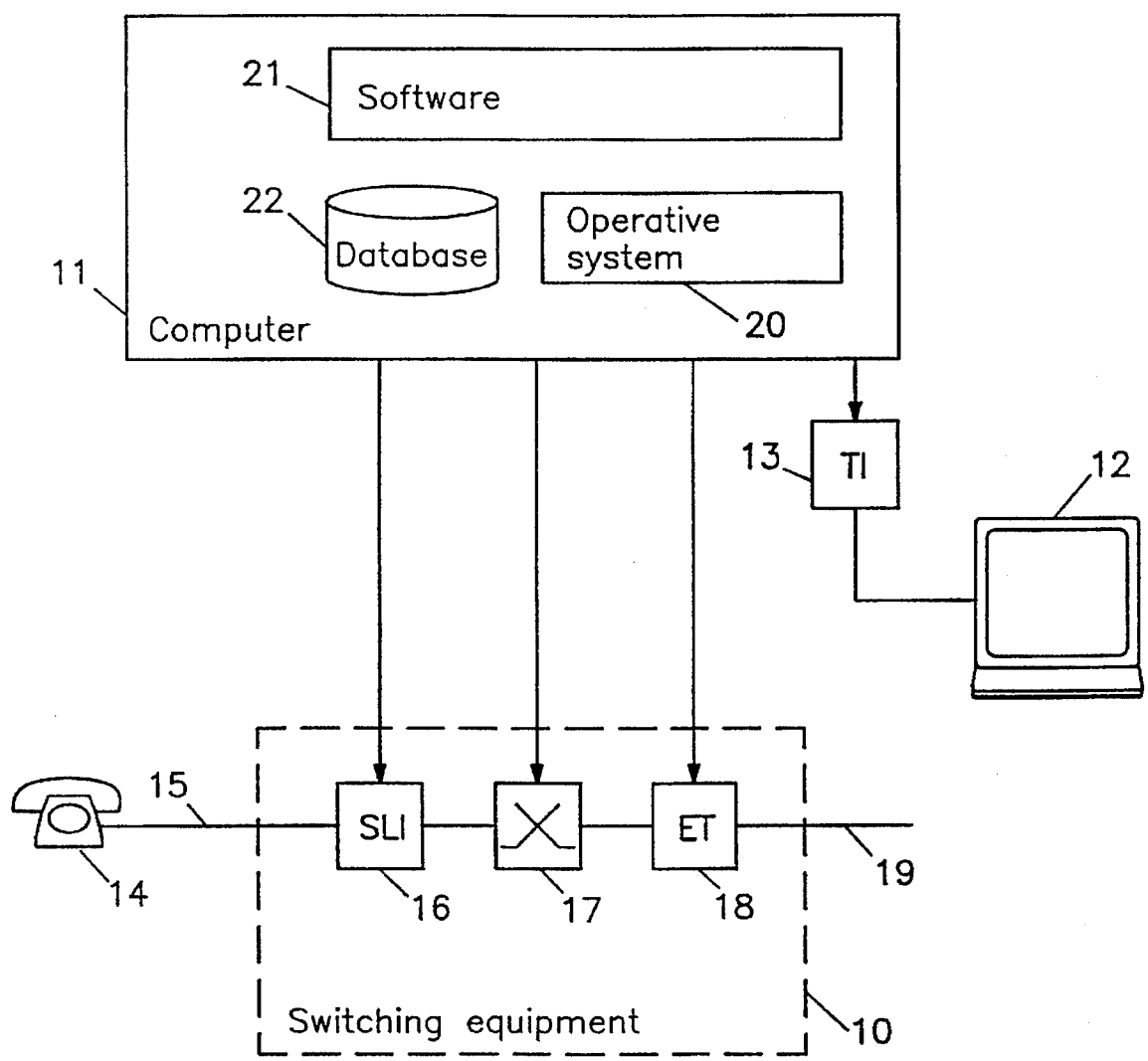
FIG. 1 is a block schematic illustrating a simplified model of a telephone exchange.

FIG. 1 illustrates schematically a telephone exchange which includes switching equipment 10, computer equipment 11 which functions to control the switching equipment, operator equipment 12 which functions to control part of the switching equipment and to insert subscriber data through the agency of an operator interface 13. A subscriber 14 is connected to the telephone exchange by means of a subscriber line 15, which passes to a subscriber line interface 16. Several subscribers can be connected to the interface 16 and the switching equipment includes several subscriber line interfaces 16. The core of the switching equipment is a selector switch 17 which is connected to the input side of the interface 16 and also to the output side of a trunk interface 18. The switching equipment may include several trunk interfaces 18. A trunk line 19 extends from the trunk interface 18. Although not shown, the computer equipment 11 of the telephone exchange may include one or more computers, an operative system 20, software 21 and a database 22 for the storage of data relating to the telephone network and its subscribers. The computer equipment 11 controls the switching equipment 10. Hitherto, the described telephone exchange is conventional, which is encumbered, among other things, with the aforesaid problems which system designers must face when introducing a new service. Examples of such new services include the transfer of a call when the number called is engaged, automatic callback when the number is engaged, follow-me diversion, temporary transfer, all of which are subscriber-related services. It may also be necessary to introduce services that are related to the operator of the telephone network, for instance services relating to billing, statistics, the connection of new subscribers, the disconnection of subscribers who do not pay their bills, etc. The present invention is directed to the manner in which the software 21 is structured.

Figure 2:
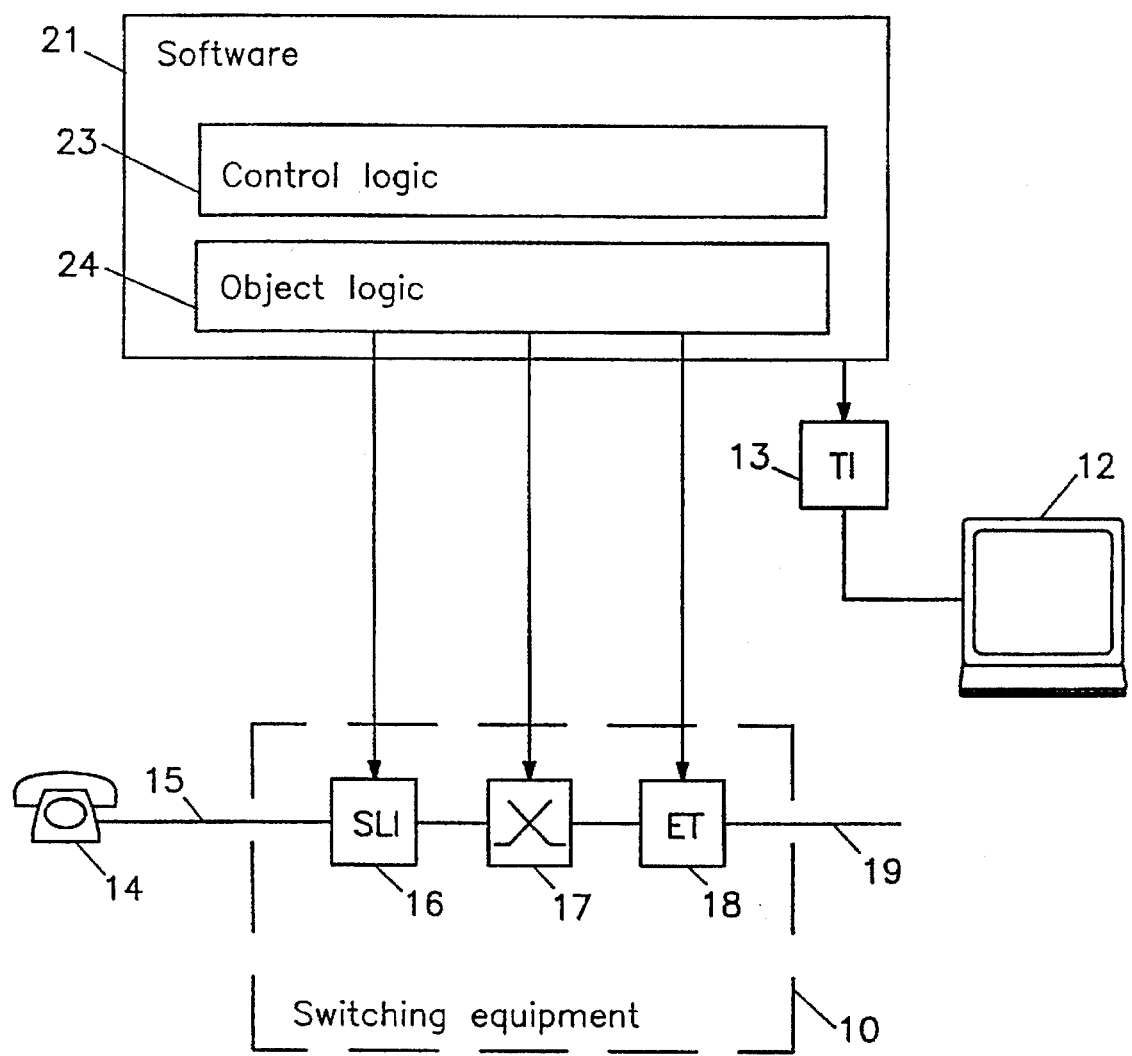
FIG. 2 is a block schematic similar to FIG. 1, in which the software has been divided into control logic and object logic.

FIG. 2 illustrates schematically the same telephone exchange as that shown in FIG. 1 with the exception that the software 21 of the FIG. 1 illustration has been divided into two parts, namely a first part 23 called control software, hereinafter referred to as control logic, and a second part 24 called object software, in the following referred to as object logic. The control logic includes a number of programs which determine how the resources/hardware of the telephone exchange shall be used to produce different functions for different purposes, for instance the connection of a telephone call from one subscriber to another, the connection of a telephone call arriving on a trunk line, the connection of a subscriber service enquiry, an operator request to change data in the database, an operator request to read statistics from the telephone exchange, etc. All of these various functions are controlled by the control logic 23 by allowing these programs in the control logic to operate in different ways on different programs within the object logic 24. The object logic 24 also includes a number of programs which control the resources of the telephone exchange, so as to obtain the desired control logic functions. The object logic includes software which controls the subscriber line interface 16, the switch 17, the trunk interface 18 and the operator interface 13.

It is thus the software programs within the control logic 23 that controls software programs within the object logic, which in turn control the resources of the telephone exchange.

Figure 3:
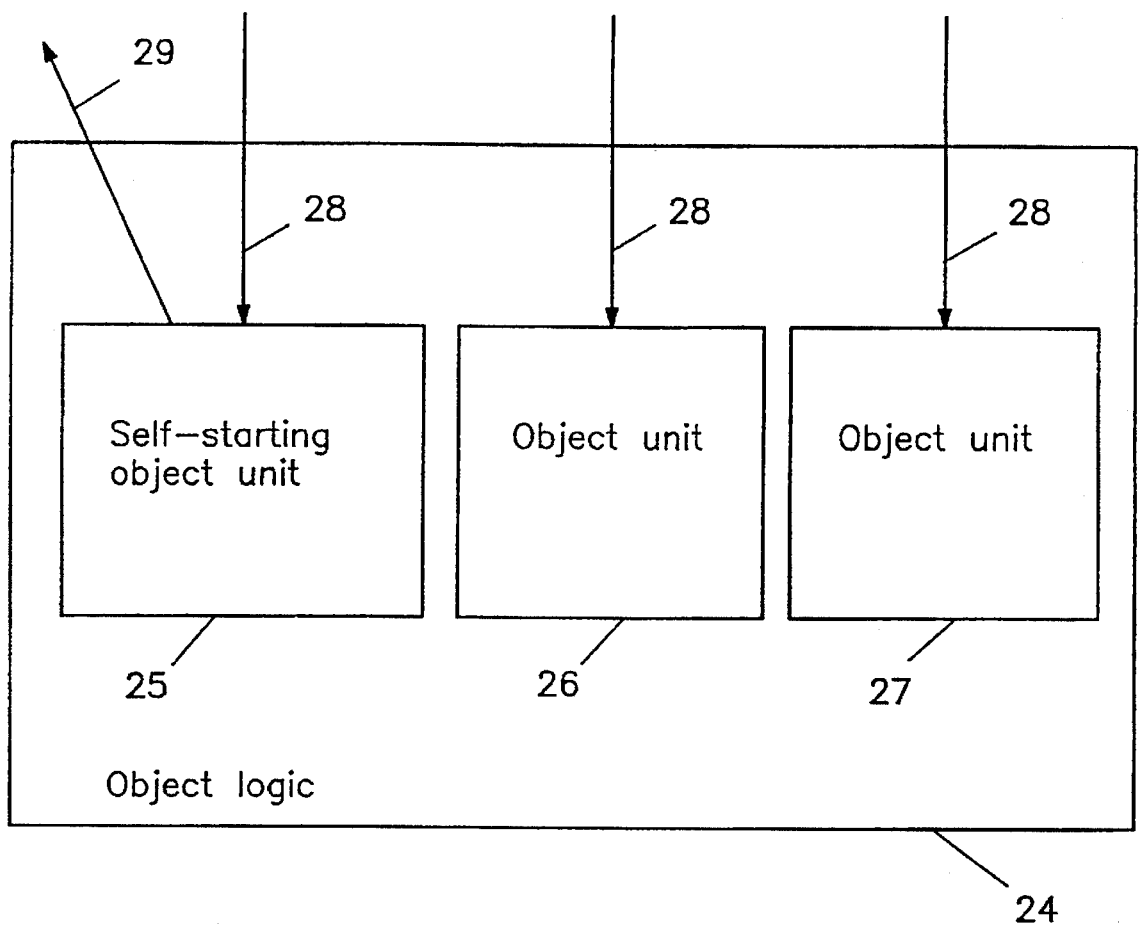
FIG. 3 illustrates the structure of the object logic.

FIG. 3 illustrates the structure of the object logic 24. The object logic is comprised of a number of object units 25, 26, 27, all having the same generic structure. Each object unit has an interface 28 towards the control logic. Although the structure of the interface 28 is the same for all object units, its operations are different. Each object unit can be understood as being one or a number of software programs which control a predetermined resource. Each object unit represents a particular type of resource. For instance, the object unit 25 represents one type of resource, the object unit 26 represents another type of resource and the object unit 27 represents still another type of resource. Although FIG. 3 shows only three object units, it will be understood that many more object units will normally be included and that the invention is not restricted to precisely three different types of resources. Examples of object units are described below with reference to FIG. 4. The object units include at least one unit, shown at 25, which begins the execution of an associated control case in response to an external stimulus. An example of an external stimulus is when a subscriber lifts a telephone receiver, this being detected in that object unit which is of the kind which controls the subscriber line interface 16. Another example of an external stimulus is a stimulus which derives from the operator interface 15 when the operator switches current to the terminal 17. In turn, an object unit which is activated by an external stimulus, the object unit 25 in FIG. 3, has an interface 29 towards the control logic 23. An object unit which is activated by an external stimulus is referred to hereinafter as a self-starting object unit. This is because when the aforesaid external stimulus is received by its respective self-starting object unit, the object unit delivers, via the interface 29, a start call which initiates the start of those programs within the control logic that are associated with this stimulus. Those programs that are then started are referred to in the following as control cases and will be described in detail later on. When the external stimulus is represented by a subscriber lifting a telephone receiver, the control cases that are executed are those which calls the object logic to activate those resources required to establish a connection path from the A-subscriber to the B-subscriber. When the external stimulus concerned is another stimulus, for instance when the operator wishes to measure the impedence of a subscriber line, the self-starting object unit shall initiate those control cases that are required for measuring impedence and which call the object logic, which in turn controls those resources used in the impedence measuring operation.

Figure 4:
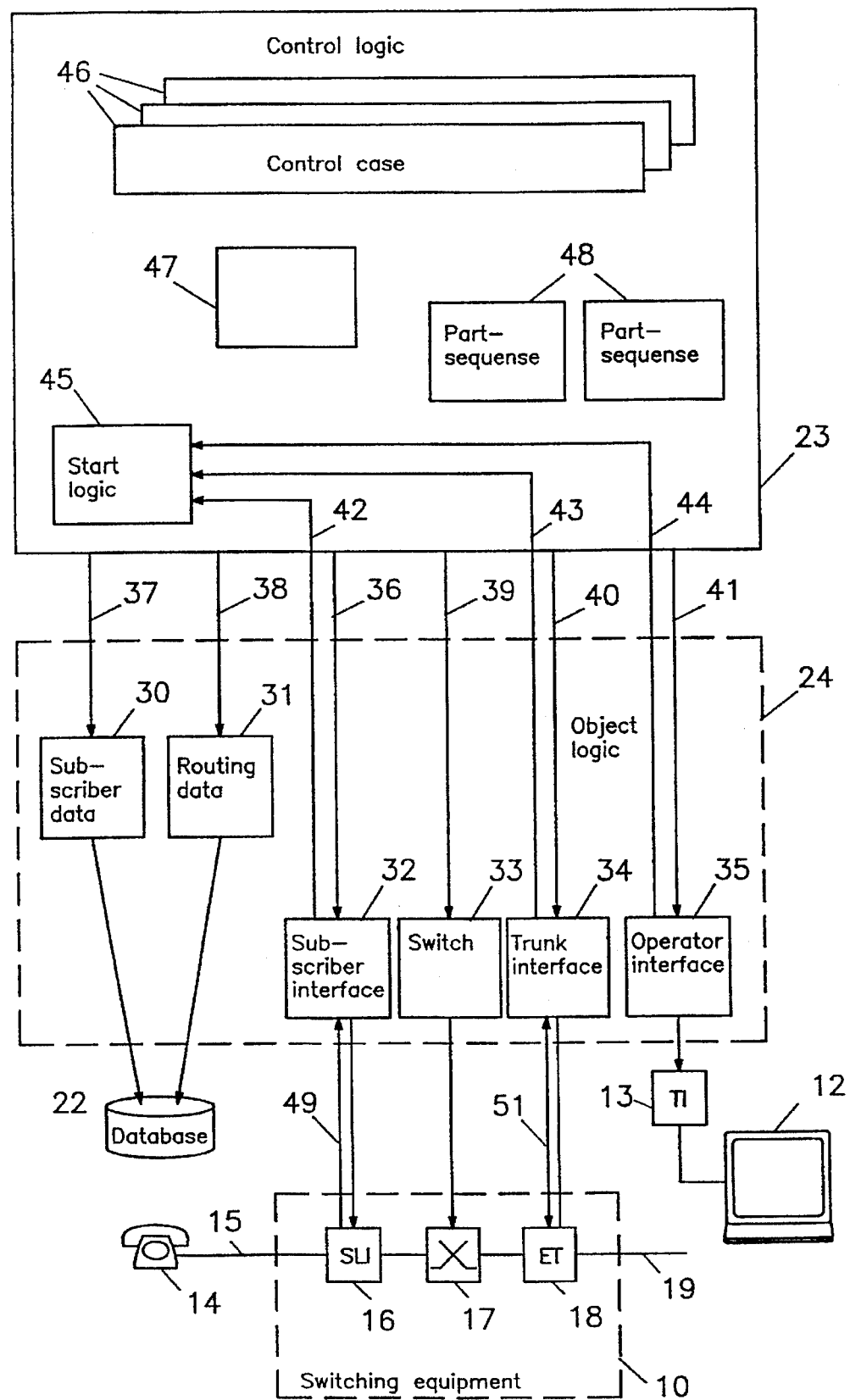
FIG. 4 is a block schematic of the same telephone exchange as that illustrated in FIG. 2, but also shows both control logic units and object logic units.

FIG. 4 illustrates the same telephone exchange as that illustrated in FIG. 2, although both the control logic 23 and the object logic 24 are illustrated in more detail. The Figure illustrates the manner in which the object logic controls the resources, in this case the units 16, 17, 18 in the switching equipment and the operator interface 13, and also how the object logic controls subscriber data and routing data in the database 22. The object logic 24 includes a number of object units, each of which is intended to control a respective type of resource. The FIG. 4 illustration includes six object units 30–35, each of the type 25 or 26. The object unit 30 handles subscriber data. The object unit 31 handles routing data, the object unit 32 handles the subscriber line interface 16, the object unit 33 handles the switch 17, the object unit 34 handles the trunk interface 18, and the object unit 35 handles the operator interface 13. Consider, for instance, the object unit 32. This Object unit has an interface 36 of the type 28 in FIG. 3. The object unit 32 is controlled by the control logic 23 via the interface 36. Correspondingly, the object units 30, 31, 33, 34 and 35 have respective interfaces 37, 38, 39, 40 and 41 of the type 28. The object unit 32 also has an interface 42 of the type 29 in FIG. 3. The object units 34 and 35 also have interfaces of the type 29. The object units 30, 31 and 33, on the other hand, lack interfaces of the type 29, since no external stimulus is obtained from those resources that are controlled by these object units.

It is thus evident that the object logic 24 will include a large number of programs which control the resources of the telephone exchange. The resources may have the form of hardware, data in the database 22, different types of interface, signalling interfaces, etc. The object logic is thus structured in object units which are each specialized to control a respective type of resource.

It is possible to create different, desired functions on a control logic level, by mutually combining object units. Each desired function created on a control logic level is a control case. For instance, a control case may be setting-up subscriber data from the operator terminal. Another example of a control case is the establishment of a telephone call connection. Different control cases thus perform different desired functions.

The control logic 23 in FIG. 4 includes one or a number of programs which form a start logic 45, a number of controls cases 46 having a structure prescribed in accordance with the invention, a control logic executor 47 which controls the execution of the control cases, and one or a number of part-sequences 48. Arrow 49 indicates an external stimulus from the subscriber line interface 16, while arrow 51 indicates an external stimulus from the trunk interface 18. A control case contains information relating to those operations that shall be carried out on one or a number of object units indicated by the control case. The start logic 45 interprets those start calls which arrive from the various object units via type 29 interfaces, in the illustrated case those start calls which arrive via the interfaces 42, 43 and 44. When the start logic chooses the control case which corresponds to the start call delivered by the object units, the control case shall be executed by the control logic executor 47.

In the case of the preferred embodiment of the invention, the control cases 46 do not have the form of software programs, but are each represented by data which describes the control case. The control logic executor 47 interprets the data found in the control case indicated by the start logic and executes operations on those object units that are indicated by the data. Each control case is divided into one or a number of stages, referred to hereinafter as control stages, which are executed in sequence while controlled from the control logic executor in a manner described in more detail below.

Although it is preferred to represent a control case in the form of data, a control case can also be represented in the form of a program written, for instance, in the program language C++.

A part-sequence 48 is a special type of control case, more specifically a control case which is not associated with any form of external stimulus. A part-sequence can be called by another control case and may be included as a control stage in the latter. A part-sequence may thus occur in many different types of control case. All properties applicable to one control case are also applicable to one part-sequence. In this way, part-sequences become building blocks which can be used to construct a control case. Similar to a control case, a part-sequence will include one or a number of control stages, which are executed in sequence while controlled from the control logic executor. A series of control stages occurring in several control cases can be combined to form a macro-part-sequence which is used in a control case. In this way, it is not necessary to repeat a given sequence of control stages each time the sequence is used for different control cases.

An example of a part-sequence is to choose a trunk on the outgoing side of a switch and to connect a speech channel to the trunk selected.

Figure 5:
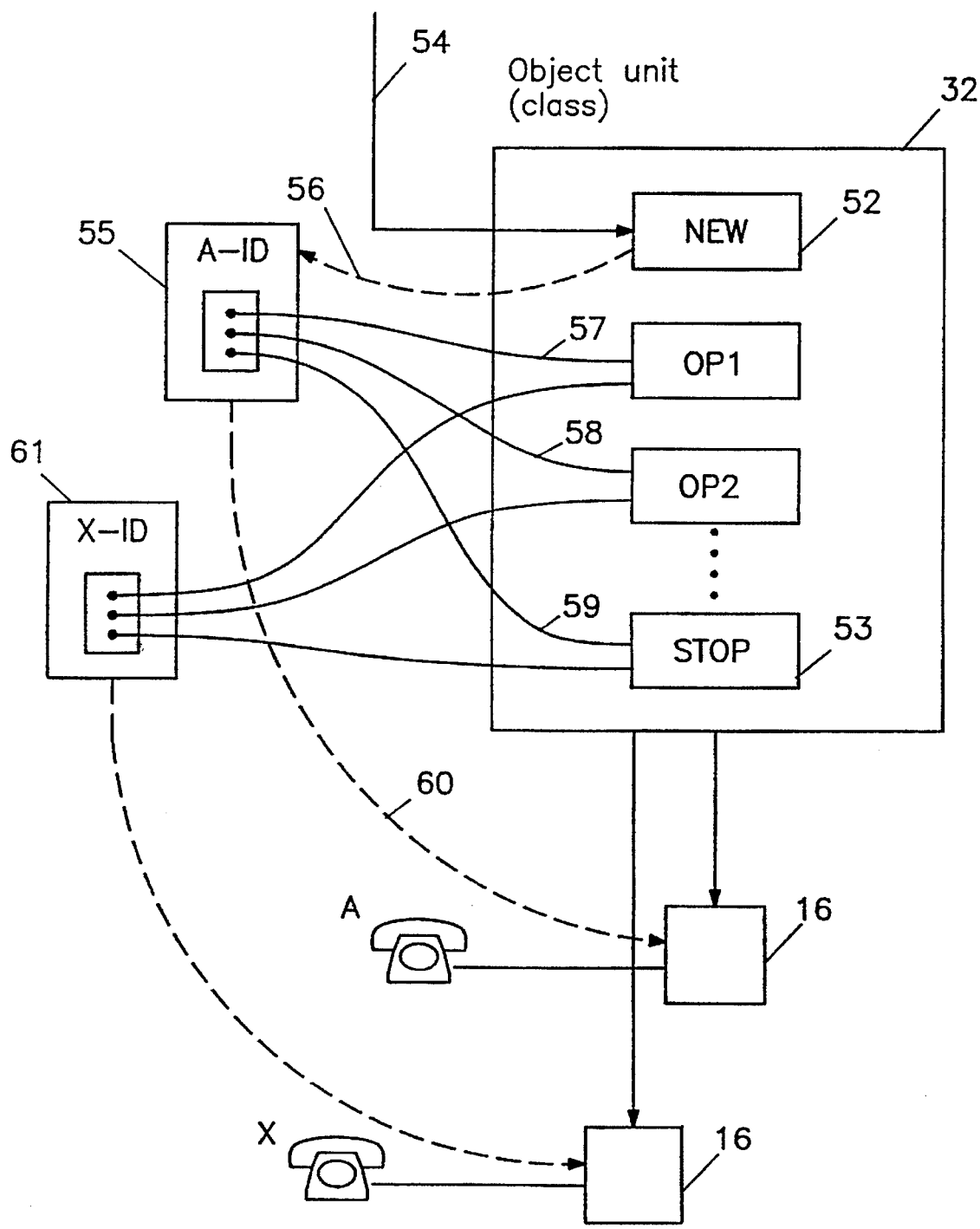
FIG. 5 is a flowsheet illustrating the generic structure of an object unit.

FIG. 5 illustrates how calling an object unit of a specified type, a control case can create an object which, in turn, controls an example of the resource of the specified type. The Figure subject matter illustrates a specified type of object unit, in the illustrated case the object unit 32 which controls subscriber line interfaces. However, the Figure can be applied to any one of the remaining types of object units 30, 31, 33, 34 and 35 of the telecommunication system. The object unit includes an object creating operation 52, designated NEW, a number of resource controlling operations OP1, OP2 . . . , and a created object annulling operation 53, designated STOP. Using terminology taken from object orientated programming, the object unit is called a class. A call 54 arriving from a control case 46 states that the control case wishes to control a subscriber line interface 16 for a specified subscriber A. The operation 52 creates an object 55, as indicated with the broken arrow 56. The object is assigned an object identity, A-ID, and this object 55 has access to all operations that are found in the object unit 32. This is illustrated by the arrows 57, 58, 59. The object 55 now represents an example of the subscriber line interface 16, more specifically the subscriber line interface 16 that belongs to the subscriber A, and is able to perform operations towards the interface, as shown schematically by the broken arrow 60. Similarly, a control case 46 can request through a call 54 to control a subscriber line interface 16 for another subscriber X, wherein a new object 61 having the object identity, XI-D, is created. This object 61 also represents a subscriber line interface 16, more specifically an interface that has been bound to the subscriber X and which is able to control the subscriber line interface 16 via the operations in the object unit 32. Although the operations that can be performed by both objects 55 and 61 are the same, the data in the objects is different. When an object is no longer required by a control case, the object is annulled through execution of the operation 53. It should be noted that the number of physical subscriber line interfaces 16 in a telephone exchange is limited, and that the number of subscriber line interfaces-objects of the type 55, 61 is also limited.

Figure 6:
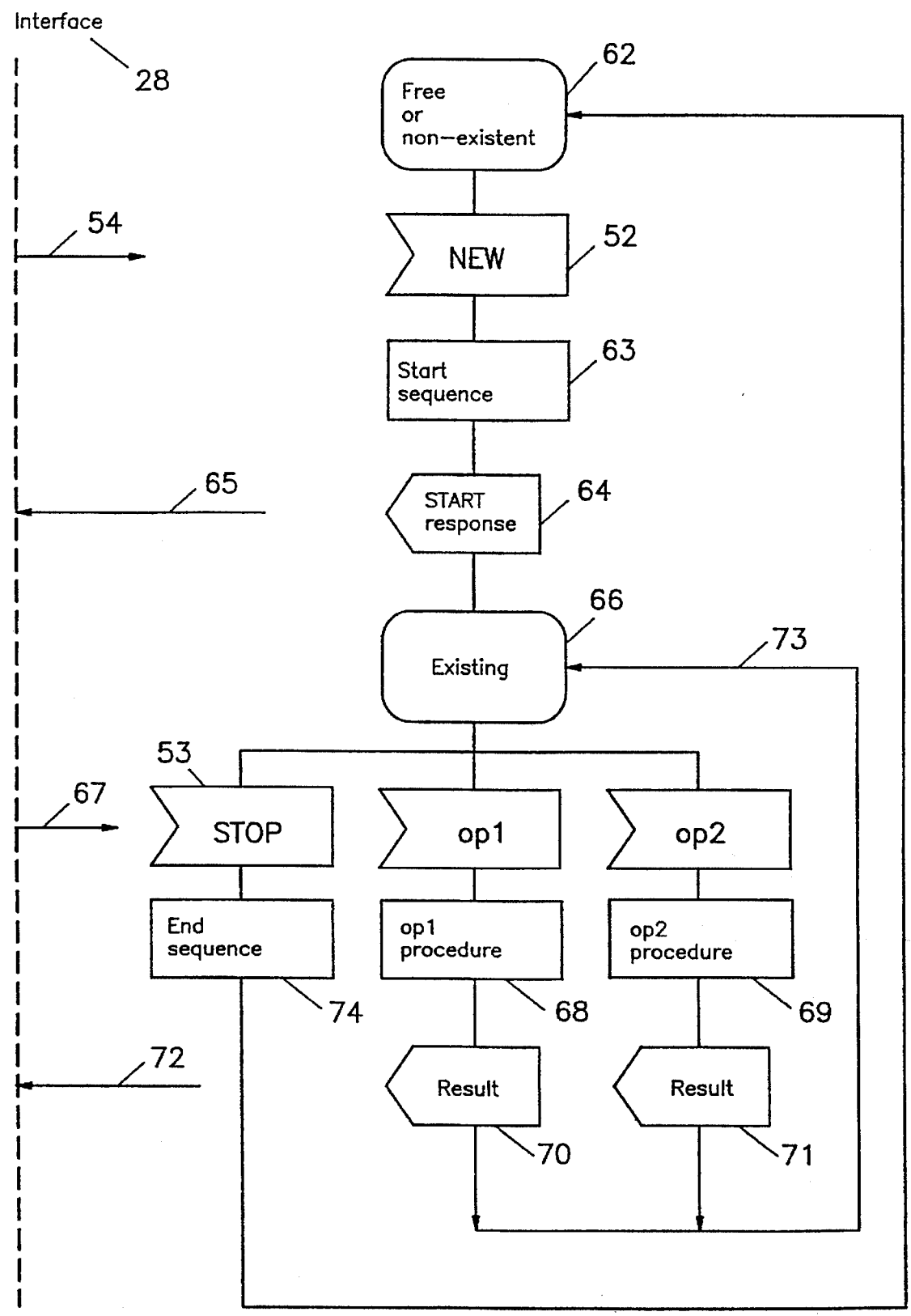
FIG. 6 illustrates an object unit and a number of objects created by said unit, these objects controlling a number of hardware devices.

FIG. 6 describes the superordinate function of the program in an object unit shown in FIG. 3. Each of the object units 25, 26, 27 has the same superordinate function. The illustrated superordinate function takes into account the two general cases that occur, depending on whether the resource controlled by the object unit is hardware or data. If the resource is hardware, only a limited number of objects can be created, of which some are engaged and others are free. A free object can be used by a control case while an engaged object cannot. If the resource is data, there will not then be any specific hardware which waits to be controlled by a data object. On the other hand, there is a memory area in which data can be stored. Block 62 shows the two cases in which the resource is free and non-existent respectively. When a call 54 is of the general kind shown by the arrow 54 in FIG. 5, a call 54 with a command to create an object arrives via the interface 28 and cot-responding operations 52 (NEW) are executed. A start sequence, block 63, is initiated as the next stage in the structure. Among other things, the start sequence involves allocating an identity OBJEKT-ID, when the object is free. If the object is non-existent, the start sequence includes the allocation of a predetermined memory area to the object. In the next stage of the structure, the object unit acknowledges the call 54 with a start response, block 64, which involves sending the identity OBJEKT-ID back to the calling control case. OBJEKT-ID is a reference to an object and is stored by the control logic in an object table, which is a list of all objects that have been taken in use by the control logic at that moment in time. Transmission of the identity OBJEKT-ID is shown by the arrow 65. The next stage in the structure is to mark the created object as existing, block 66. The existence of an object enables operations to be carried out on the object. FIG. 6, which relates to FIG. 5, shows two operations referenced OP1 and OP2. These operations are executed by being summoned from the control logic, via the interface 28, as shown by the arrow 67. A response is always obtained when an operation has been carried out, blocks 68, 69. According to the present invention, an operation response shall always include a result as a first parameter. This is shown in block 70, 71. A result is always sent back to the control logic, shown by arrow 72, and is the basis for a selection, as described below. Operations are carried out in an object unit one at a time and a return to block 64 takes place subsequent to the delivery of a result parameter, as shown by arrow 73. One of the operations performed on an object unit is always the last, and is referenced STOP, block 53; compare FIG. 5. Such a last operation will always have a final sequence, referenced 74, meaning that the object is either marked free or non-existent, as indicated by the arrow 75.

An operation which ascertains whether or not the receiver of a telephone set has been lifted is an example of the operations OP1, OP2 . . . in an object unit 25, 26 or 27. Another example is an operation which receives dialled digits. Still another example is an operation which transmits ringing signals.

When the object unit controls a trunk line, i.e. when the object unit is of the type 34, the order or command 54 is a trunk selection call and a specified trunk is then selected in stage 52. In stage 74, the selected trunk is released and placed back in a common pool of trunk lines. When the object unit is concerned with the storage of data, for instance data relating to a specified connection, an object is created for storing such data in a specified memory area. Stage 63 involves the allocation of the memory area, and stage 64 involves the transmission of the identity OBJEKT-ID. OBJEKT-ID is a pointer which points, either directly or indirectly, to the allocated memory area, and stage 74 involves placing the allocated memory area in a memory area pool which is common to all control cases.

The operations OP1 and OP2 in FIG. 6 are, of course, different for different classes/object units. However, a common feature of all operations is that as response parameters, they always deliver a result. When the resource is a switch and the function is to establish a connection route or path through the switch, a typical result is "switch route established" or "not possible to establish a switch route" or representations of these responses.

FIG. 7 illustrates an example of an object unit 25, 26 or 27 which is represented in object orientated programming, in this case in the language C++. The class Y is one of the object units 30–35 in FIG. 4. FIG. 8 illustrates the code for creating an object X of the class Y. This object is thus the object that can be controlled. The first line in FIG. 7 discloses that Y is the name of a class comprised of those parts contained within the { }-parenthesis, i.e. comprised of a start sequence, an end sequence and two operations OP1 and OP2. The following line then discloses those operations that are included in OP1. The last statement or set in the code discloses those operations included in the operation OP2. FIG. 7 can be said to serve as a template by means of which many classes can be constructed.

It will be evident from the aforegoing that the invention relates to a structure for all types of object units. This structure is such that each object unit shall have one operation "create object" (NEW), another operation "annul object" (STOP), and one or a number of other operations OP1, OP2 . . . , each being so constructed as to deliver a result as the first response parameter. The object units and the operations contained therein are known to the control logic.

The structure of the object logic has been described in the aforegoing. The control logic will now be described. As before mentioned, the control logic executor 47 starts a specific control case, in that a resource delivers a stimulus to a self-starting object unit. The self-starting object unit then sends a start call to the start logic 45, which interprets the start call and selects that control case which corresponds to said stimulus. A control case can also be started from another control case, in which case no external stimulus occurs. The starting control case is hereinafter referred to as a part-sequence.

Figure 9:
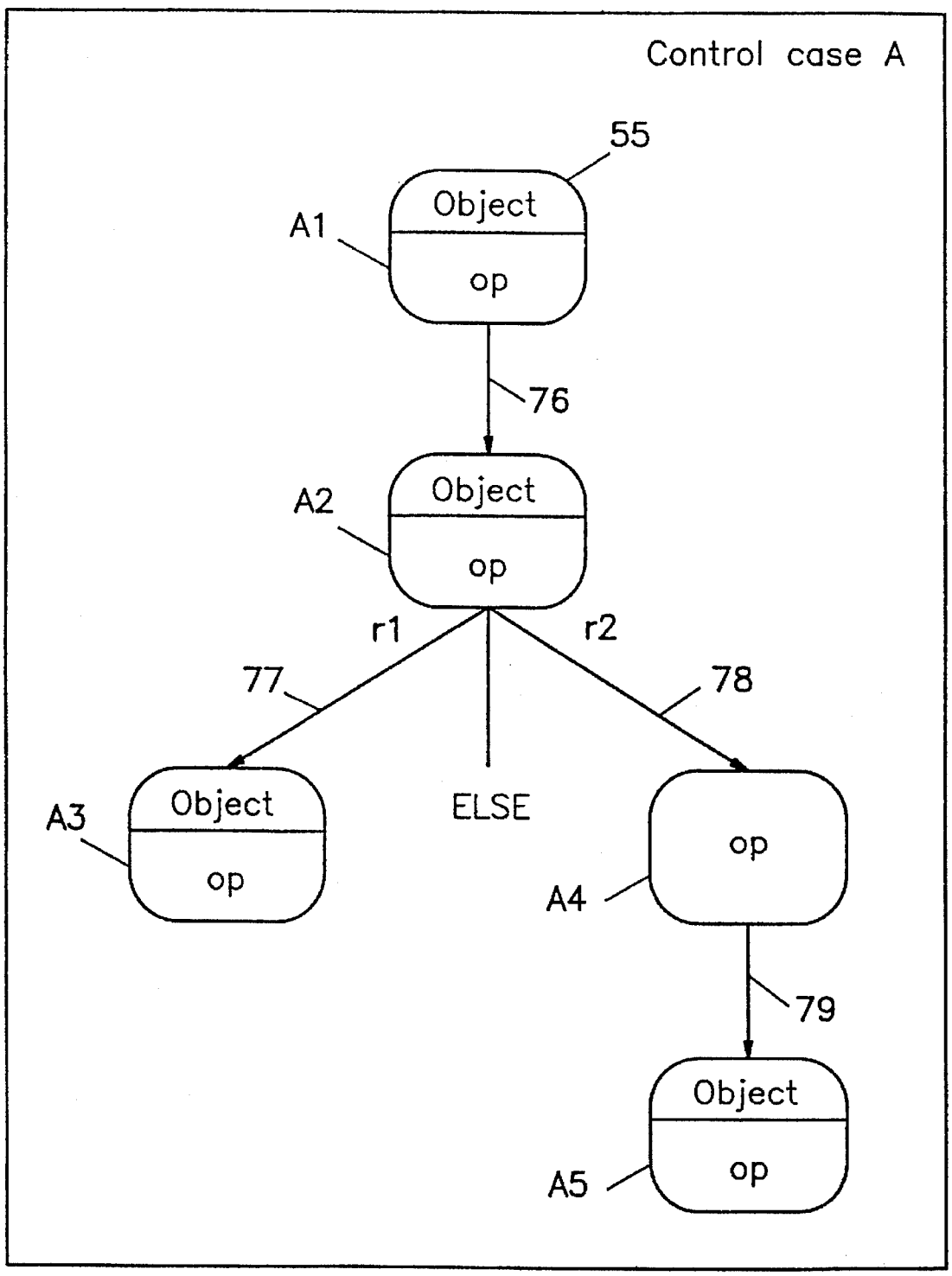
FIG. 9 is a graph which illustrates an example of a control stage incorporated in the control logic shown in FIG. 8.

FIG. 9 shows a control case, which is illustrated with the aid of a one-way graph. The control case is referenced A and includes a number of control stages referenced A1, A2, A3, A4 and A5. The illustrated control case is an example of how a control case 46 can be structured. Although different control cases are structured in different ways, a common feature of all control cases is that they are constructed of control stages that are connected mutually by links. The links of the control case A are marked with arrows 76, 77, 78 and 79. This possibility of combining different control stages with the aid of links is a powerful mechanism according to the invention. That control stage to which the head of an arrow points is dependent on the control stage at the base of the arrow. The opposite does not apply, and hence the term one-way graph.

Each control stage A1–A5 is associated with an operation, referenced OP. An operation in a control stage is referred to hereinafter as a control stage operation. A control stage operation may be of a first or a second type. A control stage operation of the first type is directed towards objects, as illustrated in the control stages A1, A2, A3 and A5. A control operation of the second type is not directed towards an object, but towards the control logic executor 47. The control stage A4 is associated with an operation of the second type, i.e. is not directed towards an object. In the case of the preferred embodiment of the invention, a control stage includes only one control stage operation. However, the invention is not restricted to this embodiment, because theoretically there is nothing to prevent a control stage including a sequence of control stage operations.

According to the invention, control stage operations of the first type shall always return a result as a first parameter. Control stage operations of the second type deliver no result.

A control stage operation which is directed towards an object has been described with reference to FIG. 5. How the control stage operation is aware of which object it shall work towards is described below with reference to FIG. 32.

When the control stage operation in the control stage A2 gives a result which belongs to a result set, referenced r1, described below, the control logic executor 47 chooses to execute the control stage A3. On the other hand, if the same control stage operation in the control stage A2 returns a result whose value belongs to another result set, referenced r2, the control logic executor chooses to execute the control stage A4. If the same control stage operation in the control stage A2 returns a result which belongs neither to r1 nor r2, referenced ELSE, the control case A ends. When the control stage A4 has been executed, the control logic executor 47 orders the control stage A5 to begin to execute. The control case A ends when the control stage A5 has been executed. The control case also ends when the control stage A3 has been executed. A result set is referred to in the following as an output of a control stage.

It should be noted that no object units are incorporated in a control stage. Object units belong to the object logic. A control stage includes only one call to an object unit. It is these calls to object units that are incorporated in the control stages and which are referred to in the following as an input to a control stage. The links are found in the control logic. An object unit, for instance a C++ class, has a number of methods/procedures that can be called. When such a method/procedure is called, execution of the program continues in the called method/procedure, i.e. in the so-called procedure body. This body lies in the object logic, as described above with reference to FIGS. 5 and 7. It is thus a control stage in the control logic that orders a given method/procedure to be carried out, and the actual method is carried out, or executed, in the object logic.

A first example of a control stage operation is an operation which, when executed, performs an operation on an object. This is also the most common control stage operation of the first type. For instance, the control stage A1 may include a control stage operation which is directed to the object 55 in FIG. 5. Another example of a control stage operation is an operation which orders execution of a part-sequence 48. This is an example of a control stage operation of the second type. A third example of a control stage operation is an operation 52 which starts a new object. This is an example of a control stage operation of the second type. A fourth example of a control stage operation is to start another control case. This is an example of a control stage operation of the second type. A fifth example of a control stage operation is an operation which superimposes one control case on another control case. It is considered in this respect that the superimposed control case, referred to in the following as the control case feature, changes the appearance of the graph of the control case on which the control case feature is superimposed. This is an example of a control case of the second type. A sixth example is an operation PASS, in which the control stage operation does nothing. This is an example of an operation of the second type.

In order to monitor events in more than one object simultaneously, for instance to detect when a-subscriber and b-subscriber both replace their telephone receiver at the end of a conversation, separate control stage operations are found, or separate object units are created to this end. Such monitoring procedures are not described, however, since they are not needed when describing the present invention.

In the following, a control case is referenced with a letter of the alphabet, as is also the control case feature of a control case.

A control stage in a control case is referenced with a letter of the alphabet together with a numerical reference (alphanumeric). The letter used is the letter in which the control stage is included. If several control stages are found in the same control case, the stages are numbered consecutively.

A control stage has an identity, referred to as control stage-ID, an input and one or a number of outputs. When a control stage has several control stage outputs, the control stage outputs are numbered numerically, beginning from 1. A control stage input is referenced P.

Example: One control case is referenced A, and another is referenced B. The control stages of control case A are referenced A1, A2, A3 ... An, where n is a whole number which corresponds to the number of control stages in the control case A. The control stages of the control case B are referenced B1, B2 ... Bm, where m is a whole number corresponding to the number of control stages in the control case B.

Example: In a control case referenced A (not the control case shown in FIG. 9), the control stage A1 has three outputs and the control stage A2 has two out-puts. The outputs of the control stage A1 are reference 1, 2 and 3. The outputs of the control stage A2 are similarly referenced 1 and 2. This is a convention that has been chosen to facilitate the following setup. However, the invention is not restricted to this notation and other notations can be used.

The identity of a control stage is referenced in the following with the alphanumerical reference of the control stage together with the suffix -ID. Example: The control stage A1 has the control stage identity A1-ID. This is also a convention that has been chosen to facilitate the continued set-up. However, the invention is not restricted to this notation, and other notations can be used.

With regard to control stage operations of the first type, i.e. control stage operations which are directed to objects and which always return a result as a first parameter, the result is used as a basis for a selection of outputs from the control stage, this selection being referred to in the following as the result selection. A specific value of the result corresponds to a specific control stage output or the result lies within a specific area of the values, hereinafter referred to as the result area. This specific value of the result forms together with the result area the result set of the control stage operation. When a first control stage operation returns a first result whose value is a first predetermined value, or whose value lies within a first predetermined result area, a first control stage output is chosen, for instance output number 1, whereas when the same first control stage operation returns a second result which differs from the first result and whose value has a second predetermined value, or whose value lies within a second predetermined result area which differs from the first result area, a second control stage output is chosen, for instance output number 2. This reasoning can be extended to apply generally to any desired number of control stage outputs. A result obtained from one control stage operation is sent to the control logic executor and is used by this executor to select the control stage output at which execution of the control stage shall continue. In order to simplify continued production, the result obtained from a control stage operation is designated r, where r is an abbreviation of the word result. The notation rxy or ry is used below. The dyadic notation ry signifies that a control stage delivers a result belonging to a result set ry that is associated with the choice of output number y in a control stage, wherein the choice is made in the result selection and y is assumed to be a whole number in accordance with the above. The triadic notation rxy similarly denotes that a result belongs to a result set rxy which is associated with the choice of output number y in control stage number x in one control case, x being a whole number, which is used to number the control stages in a control case in sequence. Example: A control stage A3 in a control case A is assumed to have two control stage outputs referenced 1 and 2. When the result obtained from control stage A3 has a first value, for instance the integer 5, the result belongs to the result set r31 and execution continues on the control stage output 1. On the other hand, if the result obtained from the control stage A3 has another value, for instance the integer 10, the result belongs to the result set r32 and execution continues on control stage output 2. Another example: The control stage B4 in control case B is assumed to have two control stage outputs, referenced 1 and 2. When the result obtained on the control stage B4 lies within a first area r41, defined, for instance, by the range of whole numbers between 1 and 10, the output selection results in the selection of the output 1 in the control stage 4. Execution thus continues on the control stage output 1. On the other hand, if the result obtained from the control stage B4 lies within another area, for instance the result area r32, e.g. the area which is defined by n>10, where n is a whole number, execution continues from the control stage output 2. Although the result values mentioned in the aforegoing have been whole numbers and that whole numbers have also been described in the codes in FIGS. 7 and 8, it will be understood that whole number values have been used merely to simplify the understanding of the invention and that the invention is not restricted to whole numbers and that a result may have any desired value.

Figure 10:
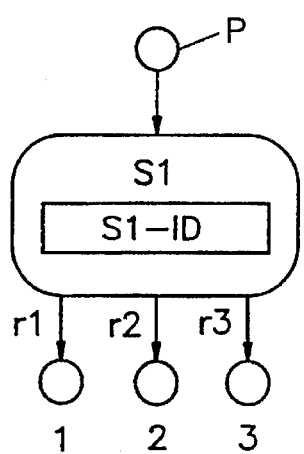
FIG. 10 illustrates a control stage that has several control stage outputs.

FIG. 10 illustrates a control stage S1 having a control stage operation of the first type. An output selection is made on the basis of the result of the control stage operation. The control stage S1 has a control stage identity S1-ID, a control stage input P and three control stage outputs 1, 2 and 3.

Figure 11:
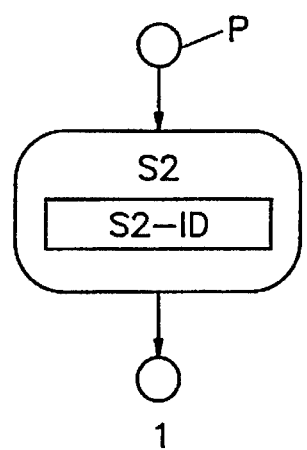
FIG. 11 illustrates a control stage that has one control stage output.

FIG. 11 shows another control stage S2 of the second type which delivers no result. The control stage S2 therefore has only one control stage input 1. The control stage has a control stage identity S2-ID which differs from the control stage identity S1-ID in FIG. 10.

Figure 12:
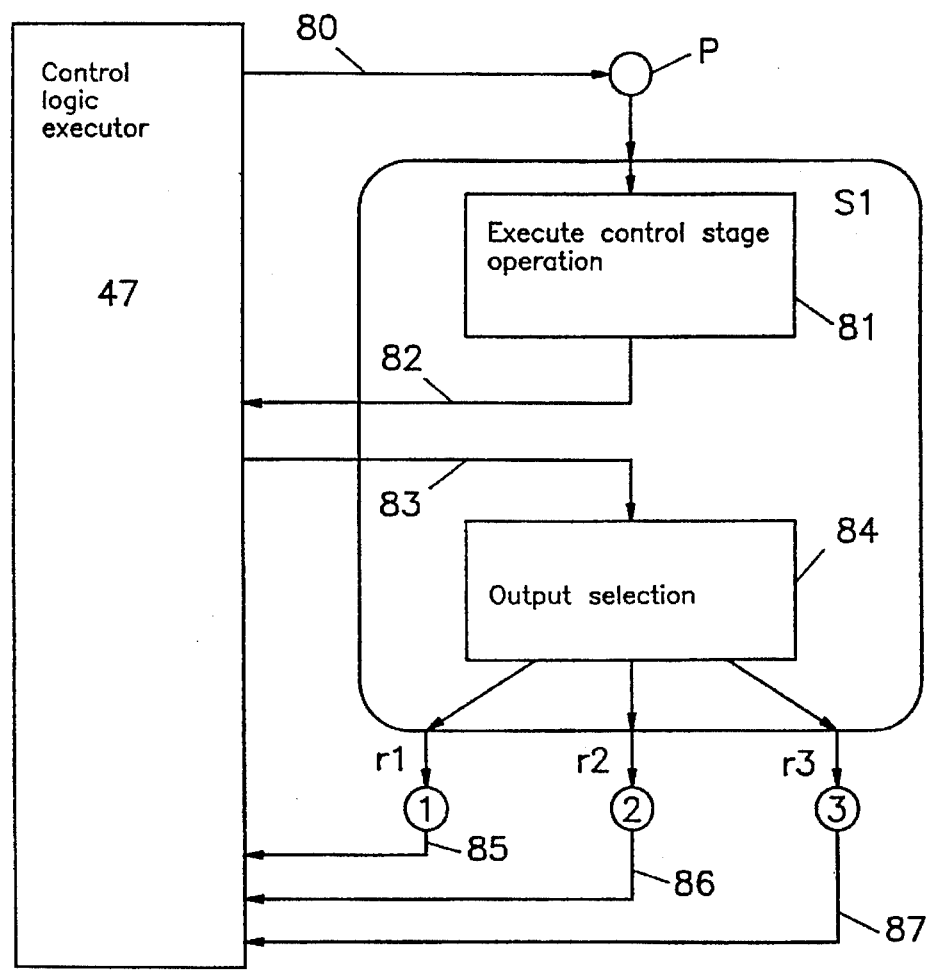

FIG. 12 illustrates generally the execution of a control stage, irrespective of whether the control stage is of the first or the second type. Execution of the control stage is effected under the superordinate control of the control logic executor 47. The control stage S1 shown in FIG. 10 has been chosen as an example of the control stage being executed. Execution is commenced by starting the control case, arrow 80. The control stage operation 81 is then executed, which returns a result r, which is sent to the control logic executor 47, marked with arrow 82. The result r is sent back to the control stage by the control logic executor, arrow 83, and the control stage operation 81 includes a sequence which involves making an output selection 84. Either control stage output 1, 2 or 3 is selected, depending on whether the result belongs to the result set r1, r2 or r3. The selected output sends a signal to the control logic executor 47 indicating that this output has been selected, as represented by arrow 85, 86 or 87. When the control logic executor has been informed as to which output has been selected, the executor searches a control link matrix belonging to the control case and described with reference to FIG. 3, in order to acquire information relating to the link which is to connect the control stage S1 to the next following control stage in the control case. When the control logic executor has received this information, the executor begins execution of this next following control stage. The result r is thus used to produce branches in a control case.

When the control stage in FIG. 12 is of the second type, which delivers no result, i.e. the control stage S2 in FIG. 11, the control stage is terminated by the control stage operation 81 sending the result r, arrow 82, to the control logic executor 47. In this case, arrow 82 represents the output 1 of the control stage. The control logic executor takes-over control and points to the next following control stage in the control case.

Figure 13:
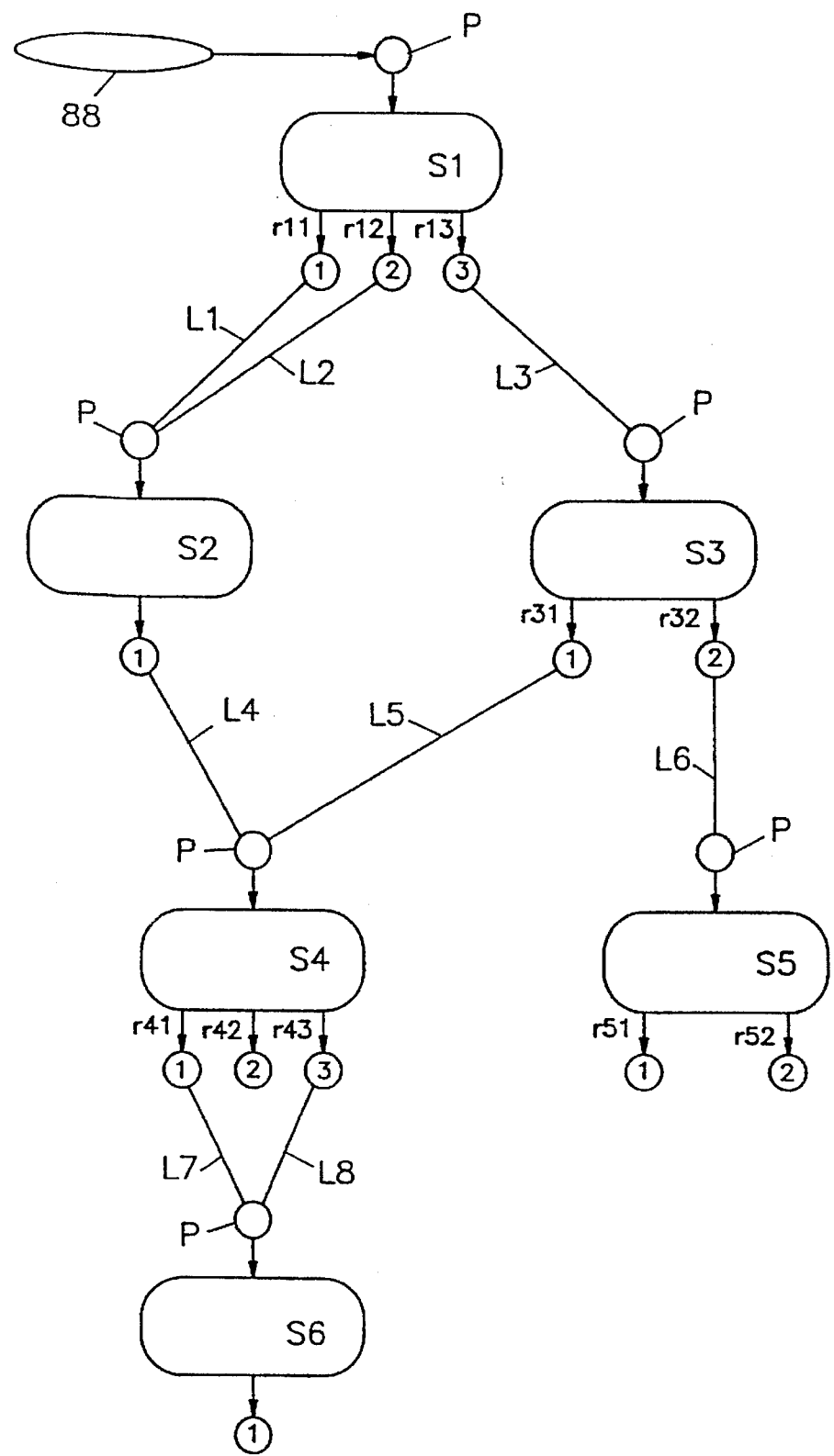
FIG. 13 is a logic picture illustrating execution of a control case.

FIG. 13 illustrates a logic picture of a control case S which is constructed of a number of control stages S1–S6. Execution of the control case is commenced when the control case is called from the control logic executor 47 with an operation 88 called a control case start operation. According to one aspect of the invention, a control stage may have only one input P but one or more outputs. According to another aspect of the invention, no more than one link may extend from a control stage output. A control stage output may have only one link, or no link. The control case is terminated when no link is found on the control stage output. When a link is found on the control stage output, this link will point to the next control stage in the control case. On the other hand, one or a number of control links can be connected to one and the same input of a control stage.

FIG. 13 illustrates the order in which the control stages are executed. FIG. 13 also shows that some control stages, for instance control stages S1, S3, S4 and S5, have multiple outputs. The control stage S1 has three outputs 1, 2 and 3, each corresponding to a respective result set r11, r12 and r13. When the operation carried out in the control stage S1 returns a result which belongs to the result set r11, the control logic executor will continue to execute the control stage S2. The control stage S2 is also executed when the operation returns a result which belongs to the result set r12. On the other hand, when the operation returns a result which belongs to the result set r13, the control logic executor elects to execute the control stage S3. Execution of the control case continues in either the control stage S4 or S5, depending on the result obtained from the operation carried out in the control stage S3. It is therefore evident that the result in S1 will decide whether the control case is executed in control stage S2 or control stage S3. The result obtained in S3 causes execution of either S5 or S4, depending on whether the result belongs to the result set r31 or r32. If the result belongs to r31, execution is continued in S4. Execution is also continued in S4 when S2 is executed.

The result of the control stage operation in S4 provides three possible choices. If the result belongs to either r41 or r43, S6 is executed and the control case then terminated. If the result belongs to r42, the control case is terminated without executing S4.

When the result in S3 means that control stage output 2 is selected, control stage S5 is executed. The control case is terminated, irrespective of whether the result in S5 belongs to r51 or r52.

Figure 14:
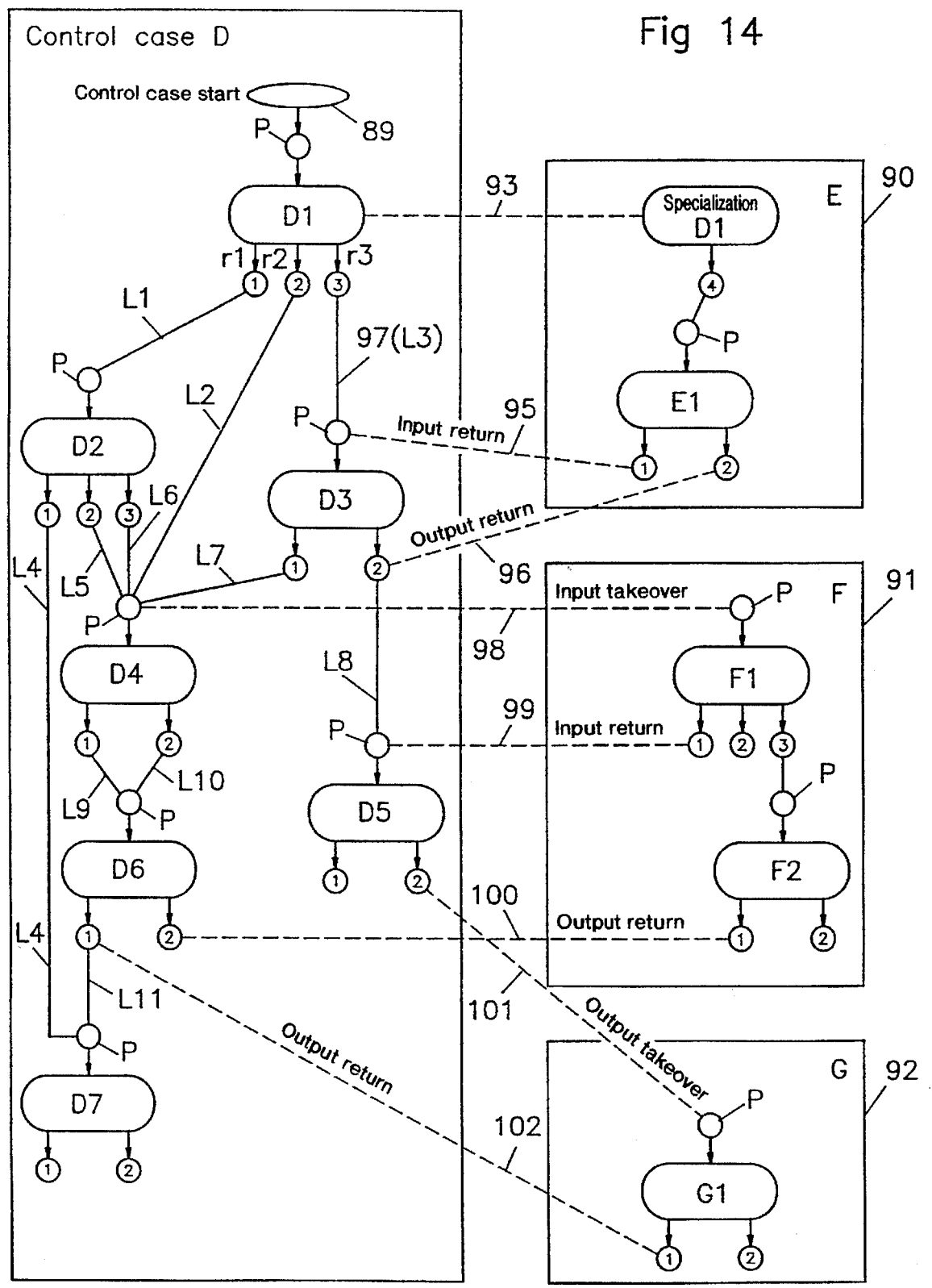
FIG. 14 illustrates three different ways of superimposing a control case feature on a control case.

FIG. 14 illustrates a control case and shows how result selection can be used to achieve branches to control stages, short circuiting of existing control stages, and also shows how new control stages can be overlaid on an existing control case.

The control case is constructed of modules, and the modules are the control stages. It is this modulized construction, made possible by division into control logic and object logic and the possibility of being able to mutually combine control cases, which in turn is made possible by a coupling mechanism which uses the links as connecting points between the modules/control stages, which provides the desired advantages of being able to construct simply and uniformly new features of functionalities for a telecommunication system, and therewith enable features to be readily incorporated in existing telecommunication systems.

FIG. 14 illustrates a control case D which comprises a number of control stages having the identities D1, D2, D3, D4, D5, D6 and D7. The control case D is referred in the following as a basic control case. As will be evident from the following, the basic control case can be expanded by superimposing or overlaying control case features, referenced E, F and G, on the basic control case.

The control case features are superimposed on the basic control case by modifying existing control stages in the manner described below. According to the invention, a basic control case can be modified with three mutually different types of control case features E, F and G. FIG. 14 illustrates these three types of features in respective blocks 90, 91, 92, the control case features differ from one another, as will be evident from the following. The control case features have a unitary construction and each may be used in a selected control stage in a control case.

The control case feature E in block 90 is a first type of control case feature. The control stage D1 in the basic control case has a link to the control case feature E, as shown by the broken line 93. The control case feature E reacts against the control stage D1 in the basic control case D and results in control stage specialization. By control stage specialization is meant that a control stage, in this case D1 in the basic control case, is assigned one or a number of outputs, each corresponding to a respective result and/or the operation in the control stage D1 in the basic control case is indicated (pointed-out). The operation D1 in the control case feature E is related to the operation D1 in the basic control case D and, for this reason, has been given the same sign in FIG. 14. In the basic control case, the control stage D1 has three outputs 1, 2, 3, each of which is associated with a respective result set r1, r2 and r3. The control case feature E adds a further output, referenced 4, to the control stage D1. If the control stage D1 in the control case feature E returns a result which belongs to the result set r4, the output 4 is selected. The output 4 has a link 94 to the input of the control stage E1 in the control case feature E. The control stage E1 has two outputs 1 and 2. The operations in a control stage can also be influenced by a control case feature which implies a control stage specialization, as described below with reference to FIG. 17A.

According to the present invention, the transition from a control case feature back to the basic control case takes place in one of two different ways, one of which is referred to as the input return and the other as the output return.

A return to the basic control case D from the output 1 of the control stage E1 takes place on the input of the control stage D3 through input return, indicated by the broken line link 95. A return to the basic control case D from the output 2 of the control stage E1 takes place on the output 2 of the control stage D3 through output return, as indicated by the broken line link 96. It will thus be clear that expansion of the result with the aid of the control case feature E means that the link 97 from output 3 on the control stage D1 to the input of the control stage D3 is either retained, corresponding to a result r3, or is missed out, corresponding to a result r4, and is replaced with either the input return 95 or an output return to the output 2 of the control stage D3.

FIG. 14 illustrates an example of control stage specialization. There is nothing to prevent the control stage specialization E returning to the basic control case D at the input of the control stage D1, i.e. at the same point from which the control case feature E accepted the execution.

The other type of control case feature is the control case feature F shown in FIG. 14. The control case feature F acts towards the control stage D4 in the basic control case and is said to be of the input takeover type. More specifically, the input takeover control case feature F acts towards the input of the control stage D4 and modifies the basic control case D, in that continued execution of the basic control case is taken-over, or accepted, by the control case feature F when execution of the basic control case has reached the input of the control stage D4. The broken line link 98 represents this input takeover. This takeover means that the control stage F takes over control from the control stage D4 and replaces the operations in the control stage D4 with the control stages F1 and F2. The control stage F1 has an input return 99 to the input of the control stage D5 and an output return 100 to the output 2 of the control stage D6. Thus, the control case feature F may involve short circuiting of the control stages D4 and D5. Although not shown, the control case feature F may have an input return instead of an output return 100. It is characteristic of the control case feature F that it replaces at least the control stage from whose input the takeover took place, this last-mentioned control stage thus never being executed.

The third type of control case feature is the control case feature G. In the case of the control case feature F, when execution of the basic control case has reached an output of a control stage, in the illustrated case the output 2 of the control stage D5, continued execution is taken over by the control case feature F, hereinafter referred to as the output takeover control case feature. The output takeover is shown by the broken line link 101. In the case of the illustrated example, the control case feature G modifies the basic control case D, in that instead of being terminated, as would be the case if the control stage D5 returned a result which resulted in the selection of output 2 of control stage D2, execution of the basic control case is continued in a new control stage, in this case the control stage D1 in the control case feature G. In the case of the illustrated example, the control stage G1 has an output return 102 to the output 1 of the control stage D6. Output takeover can take place on any of the outputs of a control stage, and is therefore not restricted to solely control stage outputs on which a control case terminates, as illustrated in FIG. 14.

The three different types of control case features E, F and G differ from one another in the way in which a control case feature takes over execution, i.e. the way in which the control case feature is superimposed on an existing control stage. This takeover can thus take place on the input of a control stage, on an output of a control stage, or a control stage can be specialized, i.e. provided with further operations and/or results.

Figure 15:
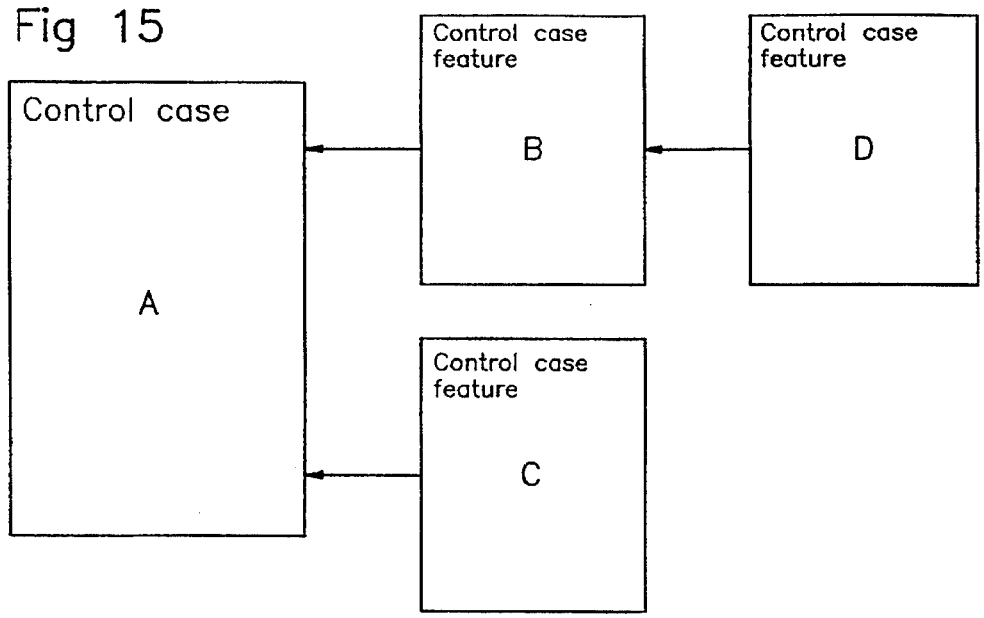
FIG. 15 illustrates a control case with two control case features and one control case feature, added to one of the two control case features.

FIG. 15 illustrates a control case A which has been modified with two different control case features referenced B and C. These features modify the basic control case A in one of the ways described with reference to FIG. 14. The precise manner in which execution of the basic control case A is modified will depend on the B and C type of the control case feature and also on the operations in the individual control stages in the control case features B and C. FIG. 15 illustrates that a control case feature D can be made into a control case feature B. The change of a control case feature to another control case feature further modifies the flow in the basic control case A.

FIGS. 16A–F illustrate different combinations of control cases and control case features that can be achieved with the control case and the control case feature illustrated in FIG. 15. Branches can be made from the basic control case A to the control case feature B and C, shown in FIGS. 16A and 16B, or solely to the control case feature B, FIGS. 16D and 16E, or to solely the control case feature C, FIG. 16C. Another possibility is that the basic control case A has no branches, FIG. 16F. In the case of the examples shown in FIGS. 16A and 16D, the control case feature D, in turn branches-off the control case feature B.

The basic control case and the control case feature shown in FIG. 15 and in FIGS. 16A–F are executed in a sequence which is determined strictly by the links and the result parameters. Compare FIG. 14.

The invention enables the control logic to be adapted readily to different markets and, at the same time, enables the control logic to be easily changed. A control case feature can be easily superimposed on a basic control case in conjunction with programming, i.e. in the back-up or support system, or when packaging the control program prior to delivery, wherein a compiler generates a resultant control case. Subsequent to having established such a fixed connection, the connecting parts, i.e. the basic control case and the control case feature, are inseparably arranged, i.e. they cannot be broken from one another in that node in the telecommunication system in which the software is later stored. One example of such a node is a telephone exchange. This can be a good thing in some cases, for instance in markets where it is assumed that no changes will occur. However, the control case feature can still be achieved in accordance with that described above.

In other cases, a more flexible control logic may be desired, and that a basic control case and control case feature are superimposed dynamically, either when loading the software into the aforesaid node or is it done at the time of each connection. When the software is loaded into a telephone exchange, the software will remain in said station until the software is replaced. It is desirable, however, to retain the modularity and to be able to change and replace control case features at a given time point after having loaded the software. For instance, different markets may have different billing requirements. A particular country may require billing to commence from the moment that a telephone number is dialled, while another country or another operator may require billing to commence from the time at which the connection is established virtually, while a third country may require billing to commence only when the terminal equipment/subscribers have begun to communicate with one another. In this case, different control case features which initiate billing procedures are not connected to the basic control case relating to billing procedures until the software is installed in a telephone exchange. It is still possible to subsequently replace the control case feature that has been associated with the basic control case and to replace this feature with a new feature. For instance, a basic control case can be combined with a certain type of billing procedure, for instance a billing procedure in which billing is commenced when the B-subscriber answers, and with a certain type of statistic. It shall be possible to use the basic control case in many different markets and shall also be capable of being modified for certain types of markets, for instance with a program package which, in one market, begins the billing procedure when the A-subscriber dials a number. In this way, it is possible to combine and deliver tailor-designed program packages for specific markets. It is still possible, however, to change the billing procedure simply by replacing this control case feature that belongs to the billing procedure.

It is convenient to combine a control case and a control case feature with each connection when, in order to execute the control case and the control case feature, the control case feature depends on the result of a given execution process. For instance, the subscriber may request feature services which require particular treatment for a particular connection or require a connection to fulfil certain criteria for which a given type of statistic is desired. This can be illustrated with reference to FIG. 15. Assume that execution of the basic control case A begins when a specific stimulus is received by the control logic executor, e.g. subscribers which belong to one and the same telephone exchange lift their respective receivers. In this case, the control case feature B may be configured such that the feature will not be superimposed on the basic control case A until a given, determined subscriber lifts its receiver. The control case feature C may then be configured so as to be superimposed on the basic control case A only when a given outgoing trunk line is selected from the telephone exchange. The control case feature D may be a feature which is only superimposed on the control case feature B when the subscriber who has lifted its receiver actively calls-in the service by dialling a given number sequence, e.g. *21 (which in Sweden indicates activation of a temporary transfer service). In this way, the software is built-up successively while a connection is being established. The software can be said to configure itself. Those control cases which shall be tied to a given subscriber and those control cases which shall be tied to a given call are stored in subscriber data, as described below with reference to FIG. 36.

When a given subscriber lifts its receiver, or obtains access to a telecommunication network in some other way, the subscriber is identified and the subscriber data opened. The subscriber data includes references to the control case feature which the subscriber concerned requires/subscribes to. These control case features pick the traffic system in a manner described in more detail herebelow and are used in the continued traffic process. Thus, this enables the control logic to be configured differently for different subscribers, although the control logic in the telephone exchange is one and the same for all stations.

In turn, the control case feature of the first type, i.e. the control stage specialization, may be of three different types, since specialization can imply operation exchange and/or result expansion. This is described in more detail below with reference to FIGS. 17A–B, 18A–B and 19A–B.

Figure 17A:
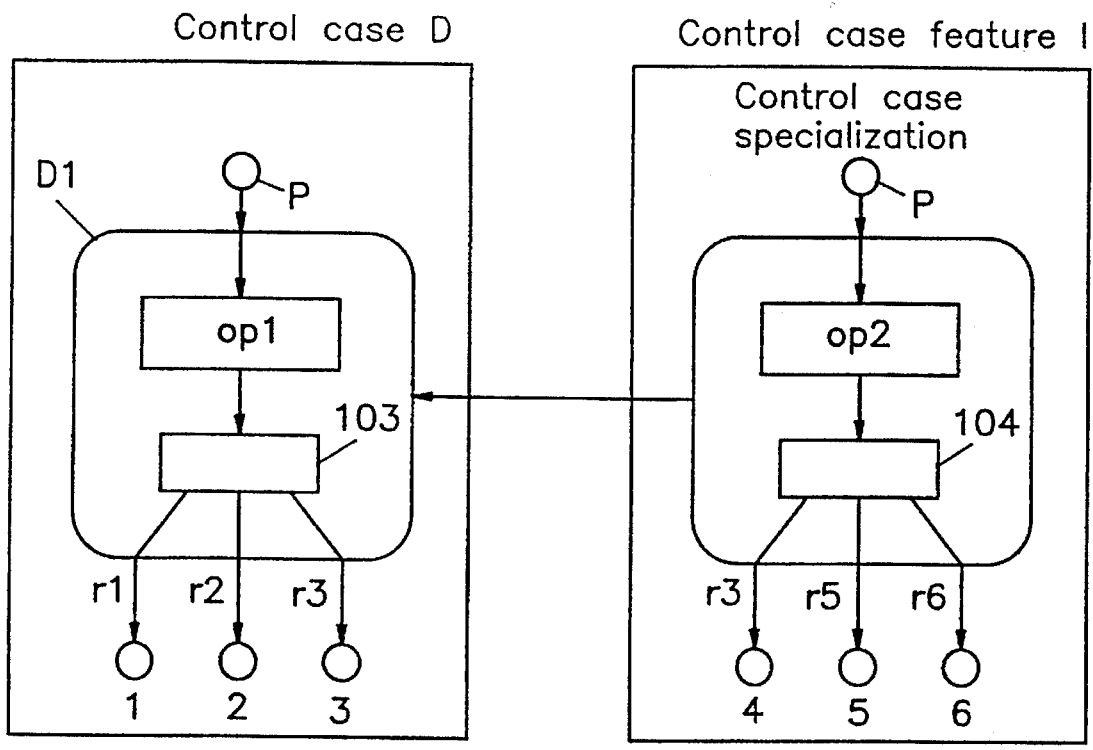
FIG. 17A illustrates control case modification, involving operation exchange and result expansion.

The first type is illustrated in FIG. 17A. In FIG. 17A, the basic control case is referenced D, while the control case feature which includes control stage specialization is referenced I. The first type of control stage specialization involves operation exchange and result expansion. The control stage D1 in the basic control case D is modified with a control case feature I. The control stage D1 has a control stage input P, a control stage operation OP1 which returns a result on the basis of which an output selection 103 is made. Either one of three control stage outputs 1, 2 or 3 is selected in dependence on the result obtained. The control case feature I has a control stage input P and a control stage operation OP2 which returns a result.

Figure 17B:
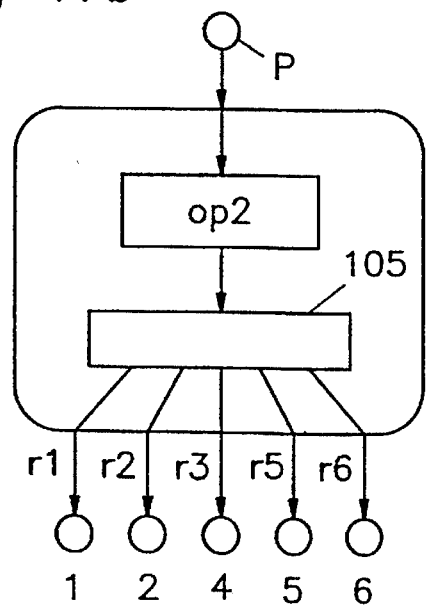
FIG. 17B illustrates the equivalent resultant control stage in FIG. 17A.

An output selection 104 is made in dependence on the value of the result from OP2 in the control case feature I. In this type of control stage specialization, the control stage operation OP2 replaces the control stage operation OP1 in the control stage D1 and the substituting control stage operation OP2 is executed first. A first output selection 104 is made in dependence on the result of the operation OP2. When the result is among the result sets r3, r5 or r6, a corresponding output is chosen. The output selection 103 is then made and if the result from OP2 is found in the result sets r1 or r2, a corresponding output 1 or 2 is chosen. As will be seen from the Figure, the same result set r3 may occur in both control case D and in control case feature I, although the control stage specialization D1 overrides the control case D. The result of the control stage specialization is illustrated in FIG. 17B, which shows the equivalent resultant control stage which, outwardly seen, forms a new control stage Z which includes the control stage operation OP2 from the control case feature I and which has an output selection 105 which handles results which may lie in one of the result sets r1, r2, r3, r5 and r6, which correspond in sequence to the control stage outputs 1, 2, 4, 5 and 6. There are thus five outputs.

Output 3 which was found in control case D is thus fully blocked and there is thus found no result set which causes this output 3 to be selected.

In addition to the control case feature I overriding the operation OP1 in control case D, the control case feature I extends the control case D by testing the result from the control stage operation OP2 in the output selection 104 in the control case feature I, before testing the result in the output selection 103 in control case D.

The control case specialization in the control case feature I is bound to a certain, specific control stage, in this case, the control stage D1, although the manner in which control stage specialization is effected by the exchange of a control stage operation and the modification of the output selection is a general effect which can be achieved with each control stage specialization, irrespective of how the control stage in the basic control case D is considered.

FIG. 18A illustrates control stage specialization of the second type, and involves expansion of the result in the absence of an operation exchange. The basic control case is the control case D from FIG. 17A, while the control case feature is referenced J. The control case feature J has a control stage operation 105, referred to as PASS, which means that the control stage operation of the control case specialization passes, i.e. effects nothing, and that the control stage operation OP1 in control case D is executed instead. On the other hand, the output selection, referenced 106, is expanded in the control case feature J by several results r3, r4, r6 and control stage outputs 4, 5, 6 are added. In this case, the control logic executor will first try to execute the control case feature in the manner described with reference to FIG. 12, but finds that the operation is a pass operation. The control logic executor then returns to the basic control case D and executes the control stage operation OP1, which then returns a result. The output selection shall then be made. The control logic executor first tries the output selection 106 in the control case feature J even in this case, and ascertains whether or not the result is found among the result sets r3, r5, r6 in the control case feature J. If the result is found among the sets, a corresponding output 4, 5 or 6 is chosen. If the result does not belong to any of the sets r3, r4 or r5, the control logic executor returns to the basic control case D and tries the result in the output selection 103. Either the control stage output 1 or the control output 2 is therewith selected.

FIG. 18B illustrates the equivalent resultant control stage Y, which thus includes the control stage operation OP1 from the basic control case D and an output selection 107 having five different outputs. It should be noted that the output 3 in the control case D is also blocked in this equivalent control stage. The output 4 is selected when the result from OP1 belongs to the result set r3 which is associated with the output selection 106, which is effected before the output selection 103.

Control stage specialization with resultant expansion in accordance with FIG. 18A is often used in analysis, since analysis often involves the analysis of new results which have not earlier been encountered and, in such cases, these new results can be permitted to guide the branches in the control logic by adding a control case feature of the second type to the control case in which the analysis takes place.

Figure 19A:
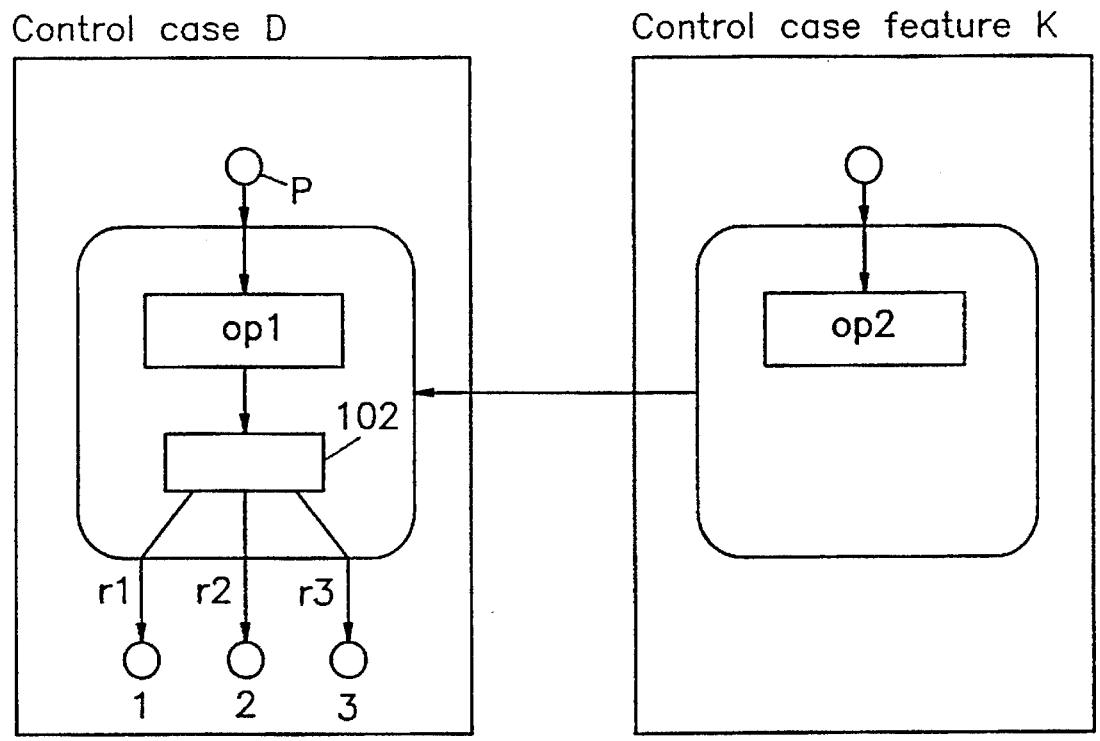
FIG. 19A illustrates modification of a control case by operation exchange.
Figure 19B:
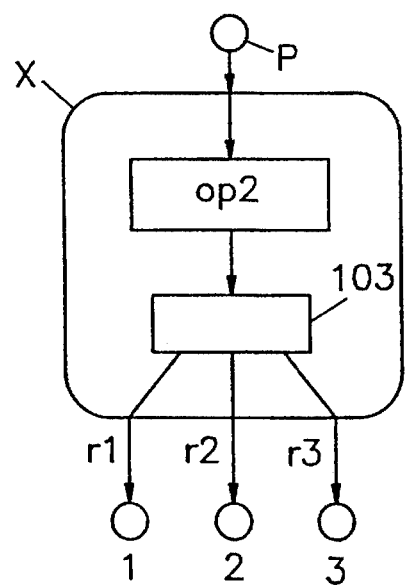
FIG. 19B illustrates the equivalent control stage in FIG. 18A.

FIG. 19A illustrates a third type of control stage specialization, in which solely an operation exchange takes place. The basic control case is the basic control case D from FIG. 17A and the control case feature is referenced K. In this case, the control case feature K includes only a control stage operation OP2 and no output selection. The control case feature K affords no further possible output, but solely exchanges the operation OP1 in the basic control case D. The equivalent resultant control stage X is shown in FIG. 19B.

Figure 20A:
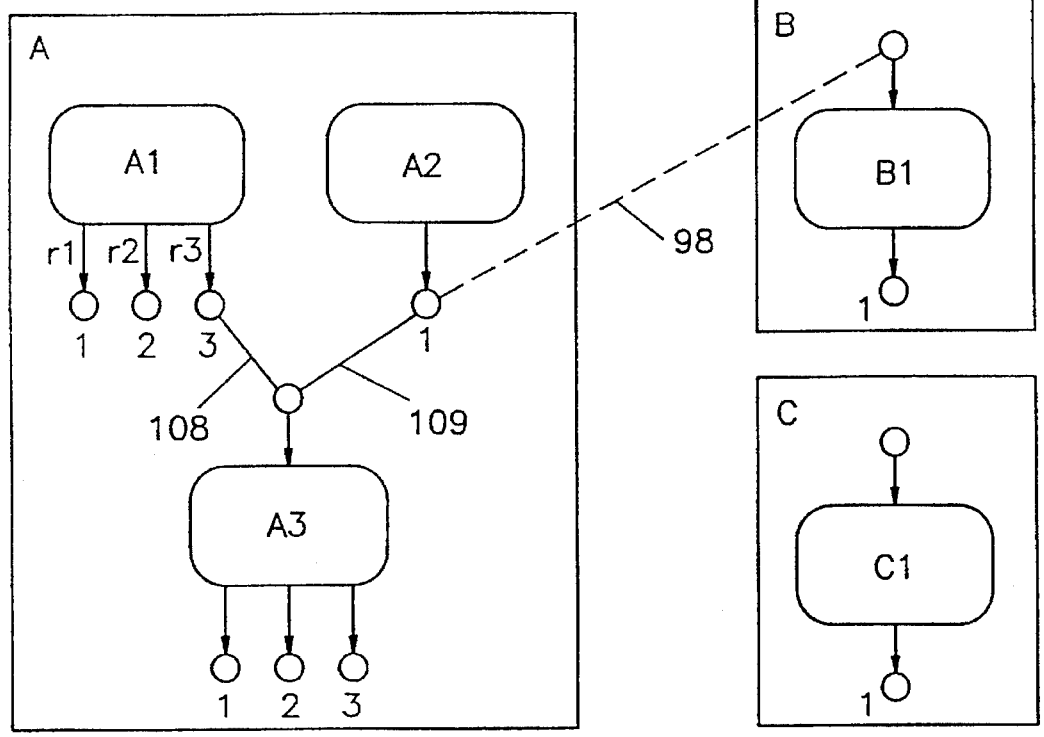
FIG. 20A illustrates control case modification involving input takeover.

FIG. 20A illustrates the mechanism for an output takeover. The output takeover is described with reference to a general control case reference A, which has three control stages A1, A2 and A3, each having a single input and one or more outputs. The control stage A1 has three outputs 1, 2, 3, the control stage A2 has one output A and the control stage A3 has three outputs 1, 2, 3. A link 108 connects the output 3 of A1 to the input of A3, and a link 109 connects the output 1 of A2 to the same input of A3. Also found is a control case feature B which is connected to the output 1 of the control stage A2 by a link 98. The control case feature B takes over continued execution of the control case A only when the operation in the control stage A2 is executed. The control case A ends when B1 has been executed. The link 109 will never have any function as a result of the output takeover 98. This is characteristic of output takeover.

Figure 20B:
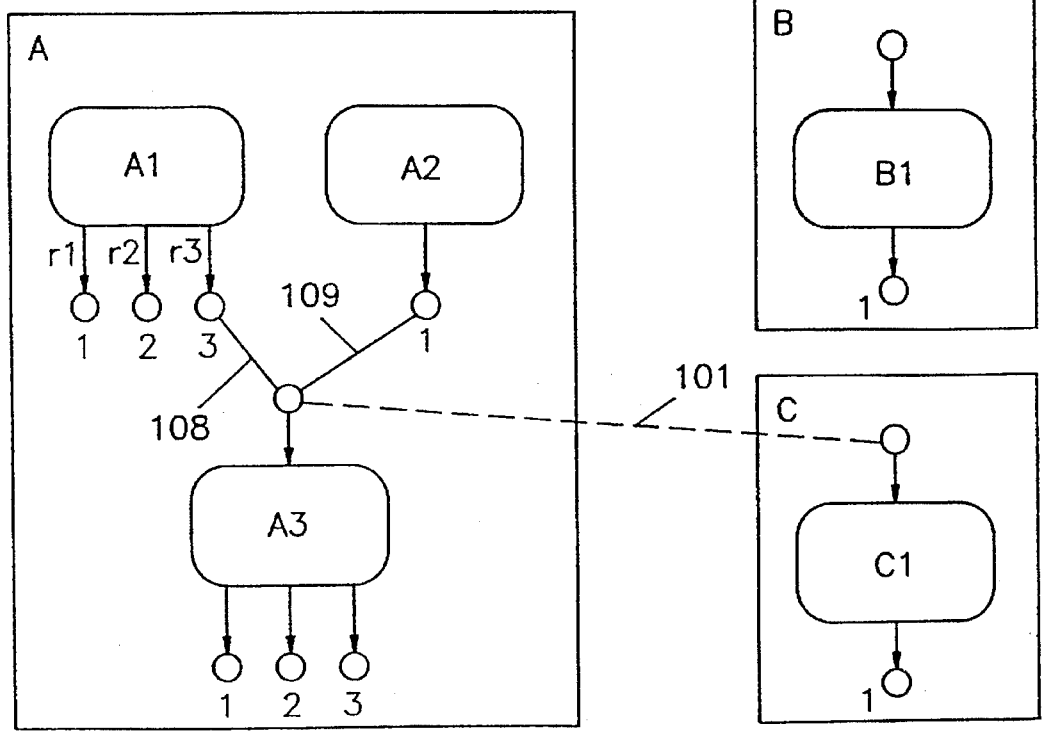
FIG. 20B illustrates control case modification, involving output takeover.

FIG. 20B illustrates the input takeover mechanism. Input takeover is described with reference to a general control case, referenced A, of the general construction illustrated in FIG. 20A. Also found is a control case feature C which is connected to the input of the control stage A3 by a link 101. If the control stage A1 is executed and gives a result which belongs to the result set r3, the output 3 of the control stage A1 is selected. The control case feature C will then take over the continued execution, wherewith the control case A ends at output 1 from the control stage C1. The link 109 will point to the control case feature C, even when the output 1 of the control stage A2 is reached, wherewith the control case feature C is executed. Thus, the control case feature P will be executed irrespective of whether the input P of A3 has been reached from the control stage A1 or from the control stage A2. This is characteristic of input takeover.

Figure 21:
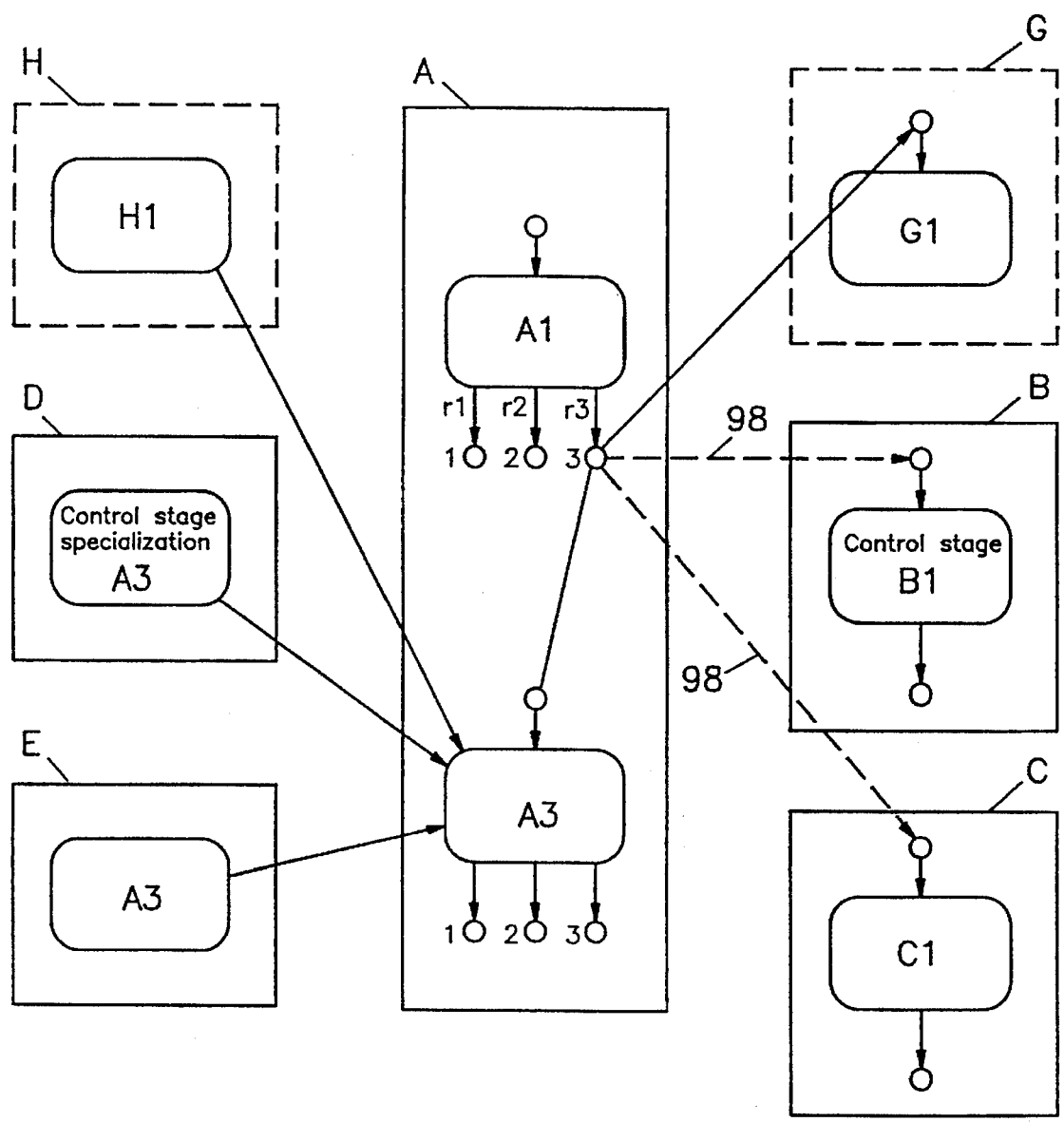
FIG. 21 illustrates the handling of conflicts between control case features, and the handling of control case features which imply observing a control case without modifying the control case.

FIG. 21 illustrates a number of examples of conflicts that can occur between control case features which are involved in a general control case, referenced A, which has two control stages A1 and A3. Each of two control case features B and C have an output takeover on the output 3 from the control stage A1. Conflict will thus occur in this case, since it is desirable that a control case will always be deterministic, i.e. that a result which belongs to the result set r3 will always result in the selection of one and the same control stage. Chance must never decide which of the control case features B or C is executed. In this case, the control logic executor 47 is unaware of whether the control case shall continue in the control case feature B or in the control case feature C.

A similar conflict exists with regard to the control case features D and E, both of which are control stage specialization feature types to the control stage A3. The control logic executor is unaware of whether it shall execute the control case feature D or the control case feature E.

According to the invention, the two aforementioned conflicts can be resolved in two different ways. Firstly, one control case feature can be given priority over the other, for instance B can be given priority over C and D can be given priority over E. This solution which involves predetermining which control case shall have priority over another control case results in the control case obtaining a firmly-bound structure, since the priority will always be the same when the two control case features B and C and D and E are activated simul-taneously during the execution process. Secondly, the conflict can be resolved by creating a conflict resolving control case feature G, shown in broken lines, which includes software which is effective in resolving the conflict between two or more specified control case features. A conflict resolving control case G is superimposed, suitably dynamically, on the control case A instead of B and C. When executing the conflict resolving control case feature G, the control case feature G elects to superimpose either the control case feature B or the control case feature C, depending on the prevailing state of the connection. The selected control case feature is then executed.

A conflict resolving control case feature H, similar to the control case feature G, may also be provided for the control stage specialization A3 in the control case features D and E, so that the control case will be deterministic, in which case, however, the control case feature H is not assigned a fixed priority.

Figure 22:
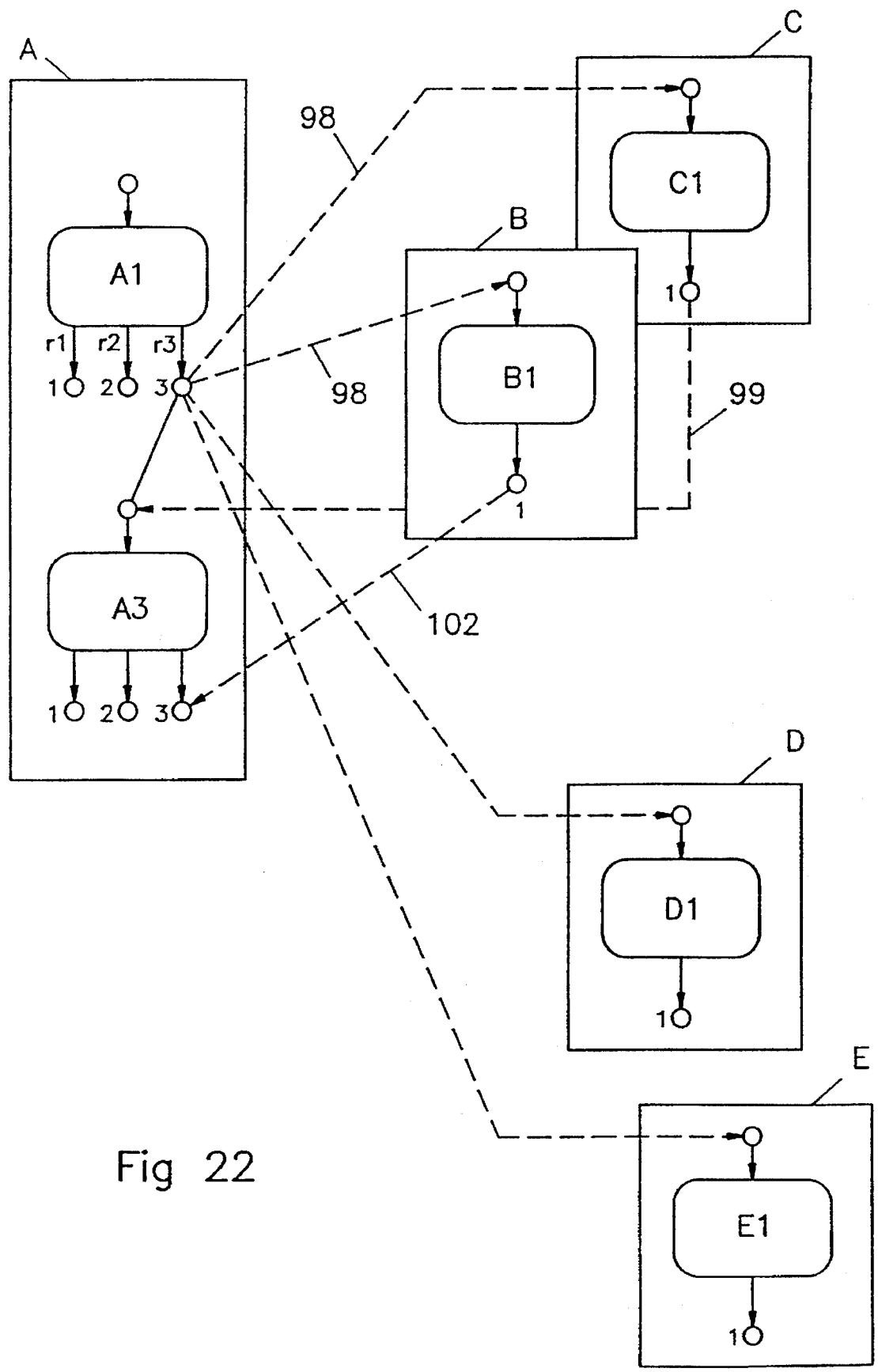
FIG. 22 illustrates an example of handling a priority control case feature and of observing a control case feature.

FIG. 22 illustrates a basic control case A, two priority assigned control case features B and C, a new type of control case feature, called observing control case features D and E, and also illustrates how these features are handled from the control logic executor. The basic control case A includes two control stages A1 and A3. The control stage A1 provides a result which belongs to a result set r3, which results in the selection of output 3. Two control case features B and C are both connected to the control stage A1 through the medium of an output takeover, shown with the aid of broken links 98, and will both continue the execution process. The control case feature C has an output 1 which is connected to the input f the control stage A3 by means of a link 99, which involves input return. The control case feature B has an output 1 which is connected to the output 3 of the control stage A3 by means of a link 102, which involves output return. Assume that the control case feature C has priority over the control case feature B. Thus, the control case feature B will never be executed when the control case feature C is superimposed at the same time on the basic control case A. Also found are two control case features D and E, both of which will be activated and executed when the control stage A1 produces a result which belongs to the result set r3. None of the control case features D and E is of the priority assigned type. In the following, non-priority control case features are referred to as observing control cases. Such observing control cases are executed in sequence prior to executing the priority assigned control case feature C. The observing control case features D and E are executed totally independently of the control case feature C.

The above description of the control cases 46 in FIG. 4 is a conceptual description of the function of said control cases. The description describes implicitly how the control logic executor 47 functions by the aforesaid division of a control case into two stages, of which the first stage involves execution of a control stage operation and the second stage involves output selection. It is considered appropriate to describe the possible data structure of a control case before describing the function of the control logic executor.

There are two possibilities of implementing the control stage operations in respect of control stage operations that are directed towards object units, e.g. call operations. For instance, the operations towards the object unit can either be effected by the control logic executor on the request of a control stage, or there may be included in a control stage a compiled code which calls the operation directly and therewith commands the operation to deliver its result to the control logic executor, which in turn delivers the result to the control stage in which the output selection is made. The first of these possibilities means that the control stage will be represented in the form of data which is interpreted by the control logic executor. This is the preferred embodiment of the invention and will therefore be described in more detail.

Figure 23:
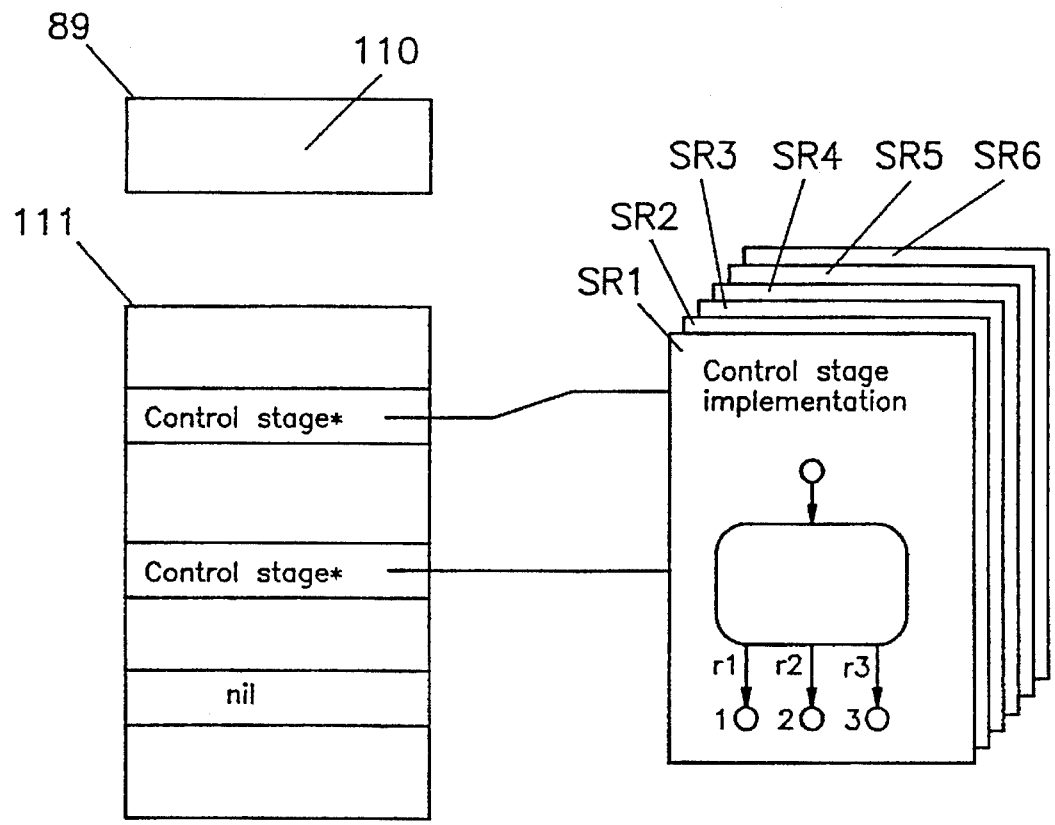
FIG. 23 illustrates an example of data structure representing a control case.

FIG. 23 illustrates the possible data structure of a control case. The Figure is related to the control case S shown in FIG. 13. Each control stage in the control case shown in FIG. 23 is illustrated in the form of a number of control stage implementations SR1, SR2, SR3, SR4, SR5 and SR6, each corresponding to a respective control stage S1, S2, S3, S4, S5 and S6.

If the control case is implemented with, e.g., C++ code, each control stage implementation will be a respective C++ class, for instance.

The control case start 89, described below, is represented by data 110 which discloses the identity of the first control stage to be executed in a control case. The data structure also includes a control stage table 111 which does not include the actual control stages but references to each of the control stages in the control case. These references are called pointers and are identified by an *. The control stage table, which is realized in the form of a data area in a memory, includes in addition to the data area also the addresses of the storage location in which the control stage implementation data, in the present case the code begins. The control stage table is indexed with a reference which Applicant has chosen to call the control stage identity, control stage-ZD. The control stage-ID may, for instance, consist of continuous numbering beginning from the number 1. The control stage-ID of the control stage S1 is referenced 1, the control stage-ID of the control stage S2 is referenced 2, and so on. The control stage table may thus be considered as an array of vectors with one position for each control stage-ID. Other structures, for instance matrix-like structures, may be used instead of such a linear array of vectors.

The data structure illustrated in FIG. 23 also includes a control link matrix 112. The control link matrix shows the link in the flow of control stages (FIG. 13). More specifically, the control link matrix shows the next-following control stage in the flow for a given control stage and a given output. The input to the next-following control stage is represented by the actual identity of the control stage, this being possible because a control stage only has one input. The control link matrix is such that each row corresponds to its respective control stage identity. When the control case has fixed control stages, as in the case of the illustrated embodiment, the matrix will have fixed rows, each corresponding to its respective control stage, S1–S6. The matrix columns are numbered consecutively, beginning from 1. These numbers also refer to the number of the output of the control stage-ID concerned. The control stage-ID is used as a matrix element for the next control stage in the control case.

Example: The control case shown in FIG. 13 has a link 113 from the output 3 of the control stage S4 to the input of the control stage S6. When the control stage S4 has the control stage identity 4 and the control stage S6 has the control stage identity 6, this link is represented in the control link matrix in the following way. The columns are numbered 1, 2 and 3, corresponding to the numbers on the output of the different control stages S1–S6. The link 112 is thus found in column 3, more specifically the fourth row, which corresponds to the control stage S4. The matrix element is introduced in the square or block in which the fourth row intersects the third column, in this case the digit 6 corresponding to the identity of the next-following control stage S6 in the control case.

Figure 24:
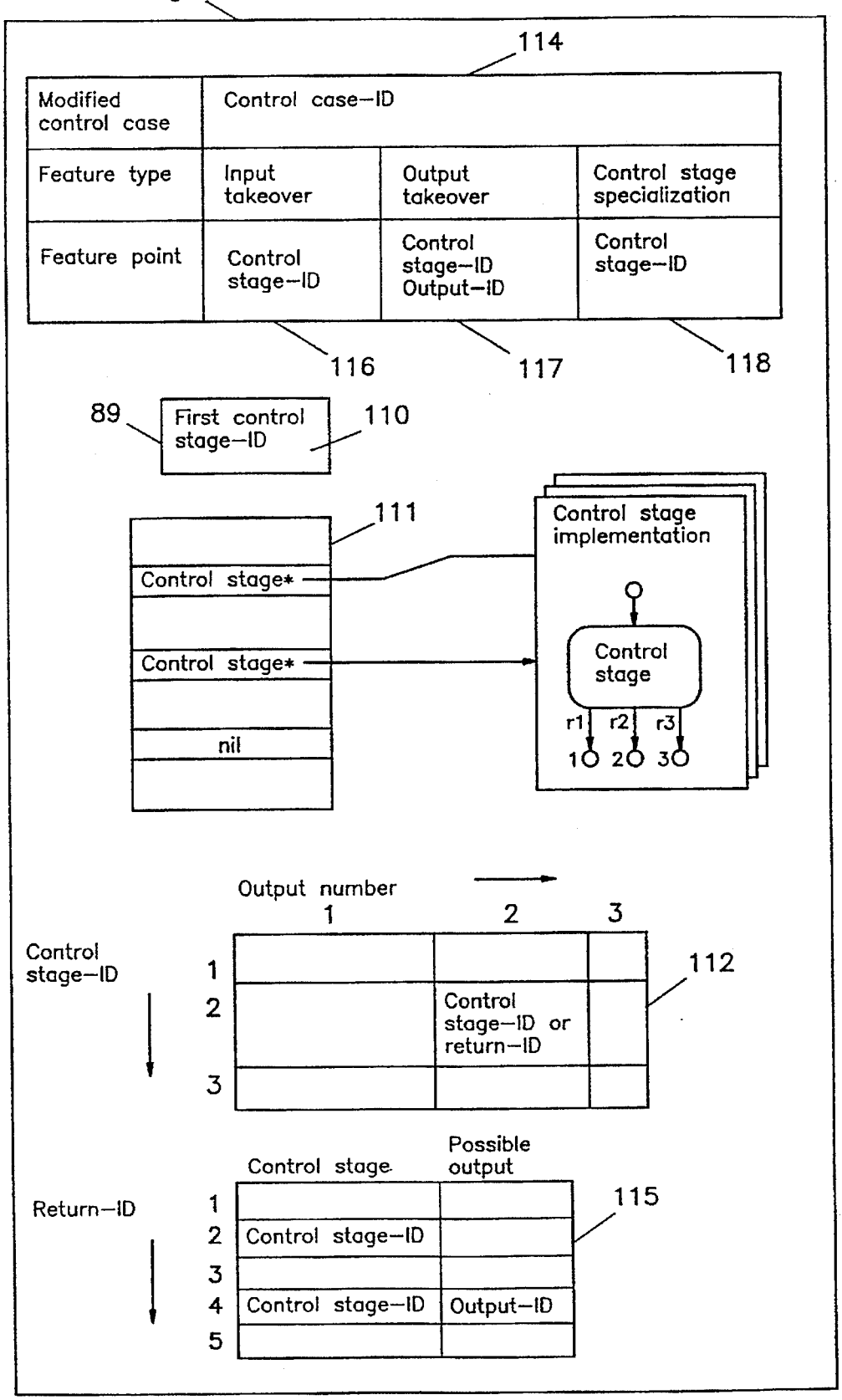
FIG. 24 illustrates an example of a data structure representative of a control case feature.

FIG. 24 illustrates a data structure for representation of a control case feature. FIG. 24 is similar to FIG. 23 but does not refer to FIG. 13. The control case start 89 with disclosure of the first control stage-ID 110, the control stage table 111 and the control link matrix 112 is the same as in the earlier described FIG. 23. The control stages in the control stage table refer, of course, to the own control stages of the control case feature. It is necessary for the data structure to include also information relating to how the control case feature is effected, i.e. the manner in which the control case feature accepts the control from another control case and also how the control case feature hands back the control, if this is relevant. Information relating to control takeover is found in a separate feature information table 114, and information relating to any control return that may occur is found in a return table 115. The return table 115 discloses those points in the basic control case to which the control shall be returned, and also the type of return concerned, i.e. whether the return is an input return or an output return.

The information required for a control case to take over control from another control case includes the control case identity of the control case from which control shall be accepted, and also which of the three different types of control case features is concerned, i.e. whether the feature is an input takeover, output takeover or control stage specialization feature. It is necessary for the control case feature to be aware of the point at which the control takeover shall take place with each of the three types of control takeover. The points concerned are thus inputs or outputs of a control stage. Information relating to such points is stored in data form in the feature information table 114, which has three table headings, one for each type of control case feature. If the control takeover is effected by input takeover, the identity of the control stage from which the control takeover takes place is given beneath the table heading input takeover. When the control takeover is effected by an output takeover, the corresponding point from which the control shall be taken over, i.e. the identity of the control stage and the identity of the output from this control stage, i.e. the number of the outputs of the control stage from which the control shall be taken over is listed beneath the table heading output takeover. When the control takeover is effected by control stage specialization, i.e. a control case feature of the first type, it suffices to disclose the identity of the control stage beneath the table heading control stage specialization. Thus, under the heading input takeover, block 116 discloses the control stage identity, block 117 discloses both the control stage identity and the output identity, and block 118 discloses the control stage identity. The control link matrix 112 is conveniently modified in relation to the matrix illustrated in FIG. 23, by disclosing either a return identity, abbreviated to return-ID, or a control stage identity, instead of the next control stage identity. When the control link matrix 112 discloses the control stage identity, a continuation involving a new control stage is concerned. If a return identity is disclosed instead, a return to the basic control case is concerned. Thus, two different types of information can be included in the control link matrix. Applicant has chosen to distinguish between control stage-ID and return-ID, by stating control stage identity (control stage-ID) with positive integers and the return-ID with negative integers. More specifically, each return is given an individual identity, for instance consecutive numbering, and in accordance with what has been described above the return may consist of two types, namely input return and output return. The type of return concerned is described in the return table 115. The return table has two columns: control stages and possible outputs, and one row for each return identity. When concerning an input return, only control stage-ID need be given in the control stage column, whereas when concerning an output return it is necessary to disclose the identity of the control stage to which return in the basic control case shall take place and also to disclose the number of the output of this control stage. Although not necessary, the matrix element "possible output" may occur. If this matrix element is not present, it means that control has been returned to an input and then only the identity of the control stage to whose input the return has been effected is disclosed. Non-disclosure means that an output return is concerned, wherewith the identity of the control stage to which return shall take place and the number of the output in this stage is disclosed on the row relating to the identity of the return.

Figure 25:
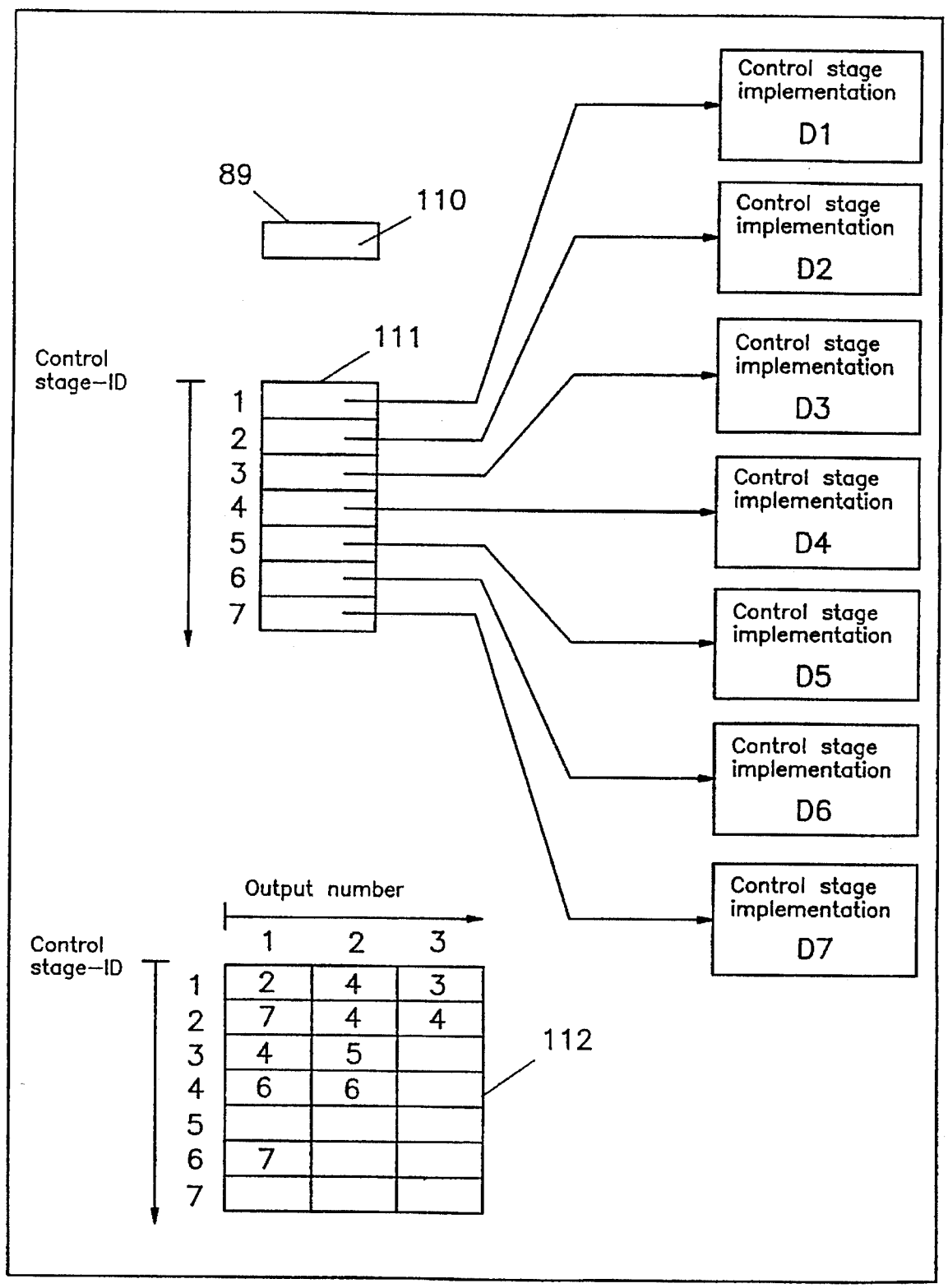
FIG. 25 illustrates an example representative of the control case D in FIG. 13.

FIG. 25 is a representation of the control case D in FIG. 14. The data in a data field 110 in the control case start 89 discloses the identity of the first control stage in the control case. On the basis of this information, the control logic executor 104 enters the control stage table 111 to the control stage-ID 1, where the control stage pointer points to the control stage implementation D1. It is evident from the control link matrix 112 that the control stage-ID 1 has three outputs which pass to the control stages having the identity 2, 4 and 3. It can be ascertained through the control stage table 111 that these control stage identities each correspond to the implementation of the control stages D2, D4 and D3. The link from output number 1 of the control stage D1 passes to the control stage-ID 2 which in the control stage table is seen to be the control stage implementation D2, i.e. the input of the control stage D2. Thus, it is possible in this way to determine clearly the order in which the control stages shall be executed in the control case D of FIG. 14, with the aid of the representation illustrated in FIG. 25. For instance, it is evident from the control link matrix 112 that the control stage identities 3 and 4 only have two outputs, that the control stage identity 5 lacks an output, meaning that the control case ends when the corresponding control stage has been executed, that the control stage identity 6 has an output, and that the control stage identity 7 lacks outputs.

Figure 26:
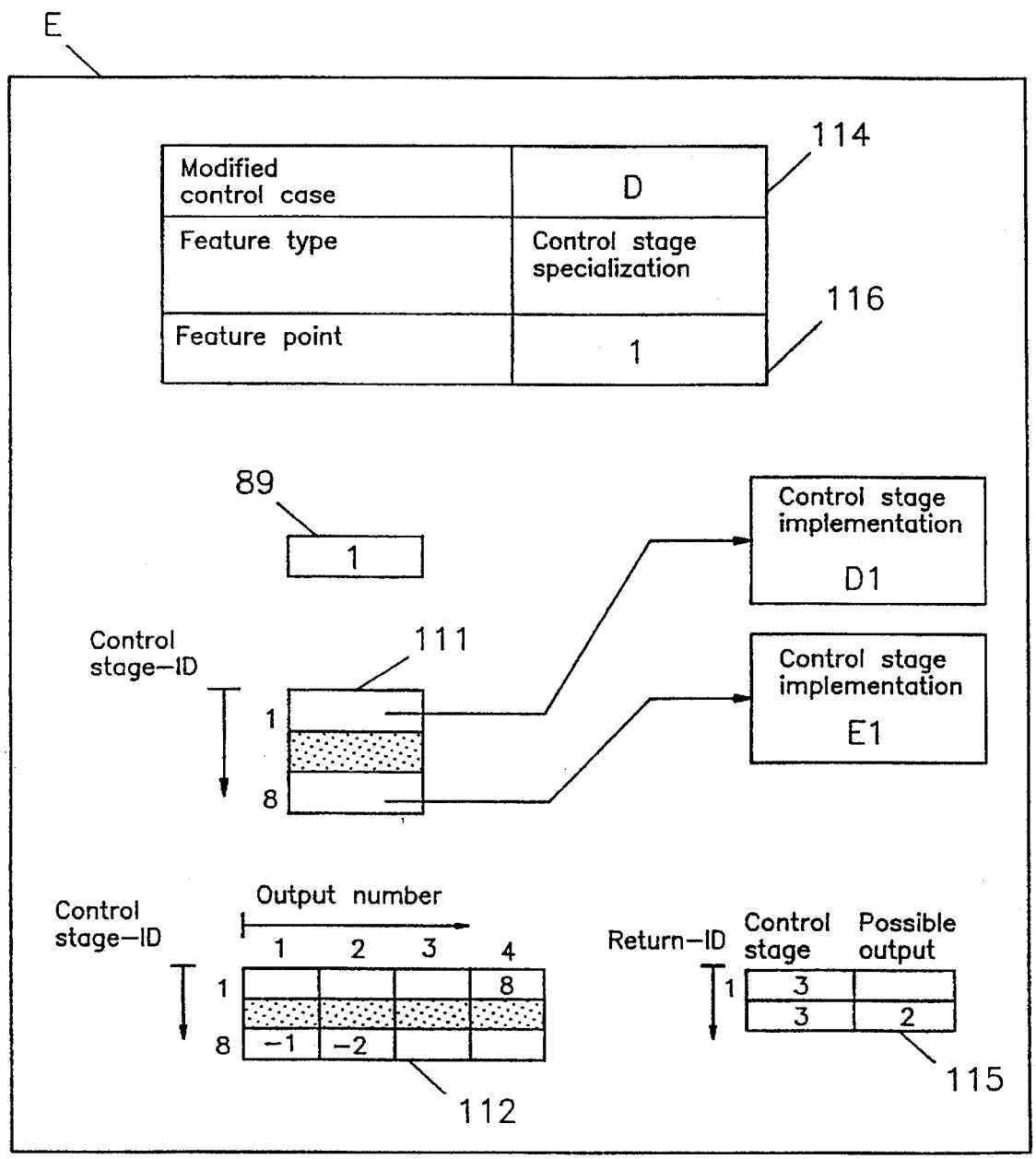
FIG. 26 illustrates an example of a representation of the control case feature E in FIG. 13.

FIG. 26 illustrates the representation of the control case feature E shown in FIG. 14. The feature information 114 discloses that the control case feature is of the type referred to as control stage implementation and that he takeover shall take place at the feature point which has the control stage-ID 1. It is seen from the control stage table 111 that the control case feature has two control stages which have the identities 1 and 8. In this case, it has been elected to use as the control stage-ID the same identities as those specialized by the control stage. The control stage-ID 1 in FIG. 26 thus corresponds to the control stage-ID in FIG. 25. The control stages in the control case features are then numbered consecutively, and hence the new control stage obtains the control stage-ID 8 in FIG. 26. Although this is a conceivable implementation, it will be understood that it can be achieved in many different ways. Thus, the control stage implementation E1 corresponds to the control stage-ID 8, while in turn the control stage implementation E1 corresponds to the control stage E1. In this case, the control link matrix 112 is a simple matrix, since it is a question of control stage implementation with an expanded result, wherein a new output is added, this new output being given the number 4 in the consecutive series of numbers. This is the only link found for the control stage-ID 1. It is also seen from the control link matrix 112 that two returns are found, marked with the two minus signs, from the control stage-ID 8, namely on output 1 and output 2. The returns are numbered consecutively and, in the illustrated case, obtain number 1 and 2 respectively. The return table 115 discloses the type of return concerned. It is seen from the return table 115 that the return identified by return-ID No. 1 passes to the control stage-ID 3, i.e. the control stage implementation D3, and that no output is found, since no output reference is given for this control stage identity. Thus, the return concerned is an input return. The return identified by return-ID No. 2 passes to the same control stage-ID 3, but the return table shows that an output is present, in this case output 2. The return concerned is thus an output return on the output of the control stage D3.

Figure 27:
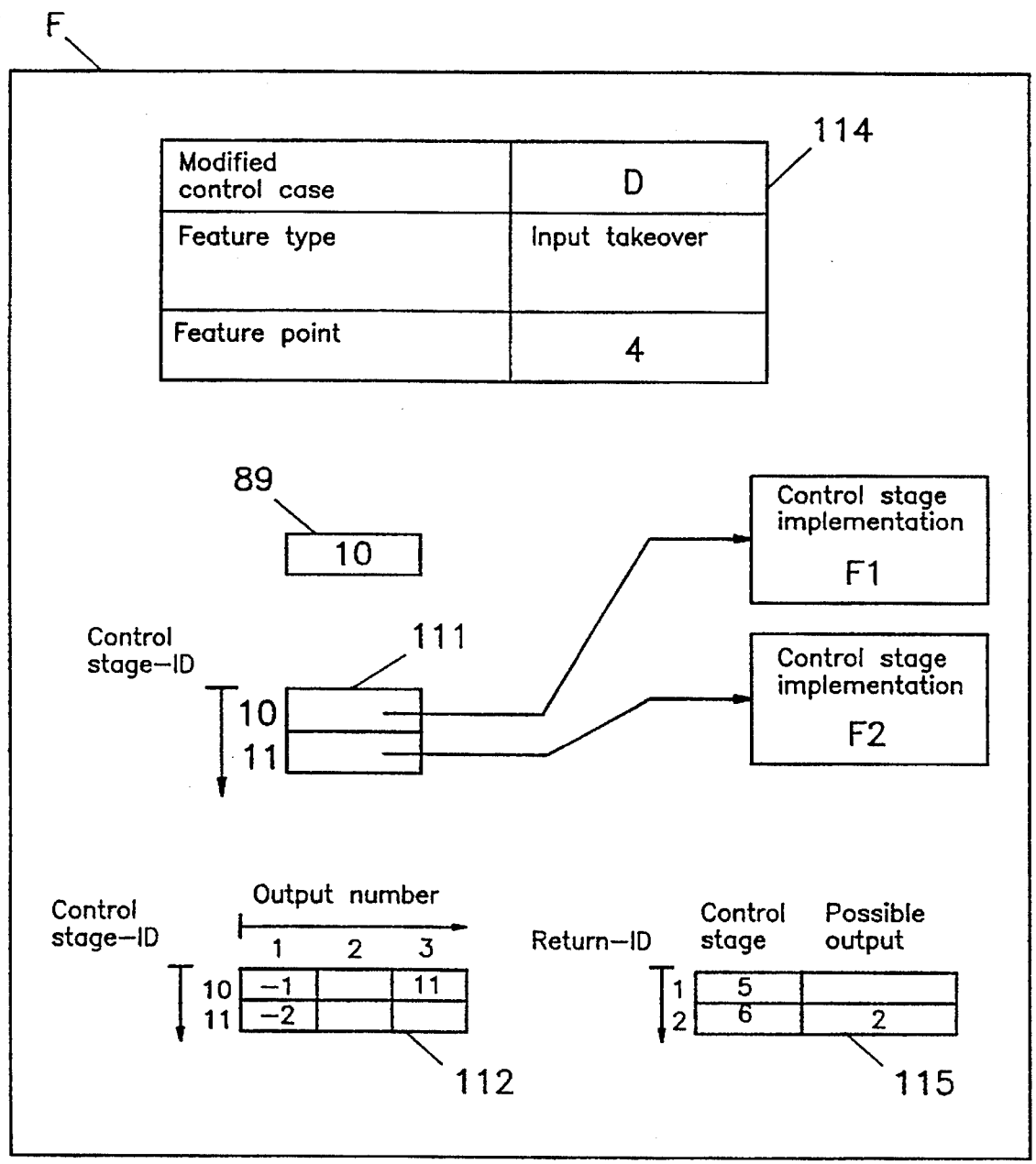
FIG. 27 illustrates an example of a representation of the control case feature F in FIG. 13.

FIG. 27 illustrates a representation of the control case feature F in FIG. 14. The control case feature F has two control stages F1 and F2 which have been given the control stage identities 10 and 11. In the control case feature F, the feature information 114 modifies the control case D, and it is seen from the feature information that an input takeover is concerned and that this takeover shall take place at the feature point 4, i.e. in that control stage having the control stage identity 4. It is seen from the control stage table for the control case D, shown in FIG. 25, that the control stage-ID 4 has a pointer which points to the controls stage implementation D4. Thus, in this case, the takeover of the input of the control stage D4 is concerned. It is seen from the data in the control case start 89 that the control case feature is started in the control stage-ID 10 which from the control stage table 111 in FIG. 27 at the control stage-ID 10 has a pointer which points to the control stage implementation for F1. It is also seen from the control stage table that the control case feature F has a second control stage which corresponds to the control stage implementation F2. It is seen from the control link matrix 112 that the control case feature has only one link, namely that execution shall continue with the control stage that has the control stage-ID 11, i.e. the control stage F2, from the control stage-ID 10 corresponding to the control stage implementation F1. The two minus signs occurring in the control link matrix 112 indicate that two returns occur. As before mentioned, the returns are numbered consecutively. The first return is given the identity return-ID 1 and is found on the output of control stage-ID 10, while the other return is given the identity return-ID 2 and is found on output number 1 of the control stage-ID 11. The return table 115 shows the connections between the control case feature F and the basic control case D. In this case, the return having the identity return-ID No. 1 discloses that the return is an input return to the control stage having control stage-ID No. 5, since no matrix element is found in the column headed "possible output". The return having the identity return-ID 2 is an output return to control stage 6 output number 2.

Figure 28:
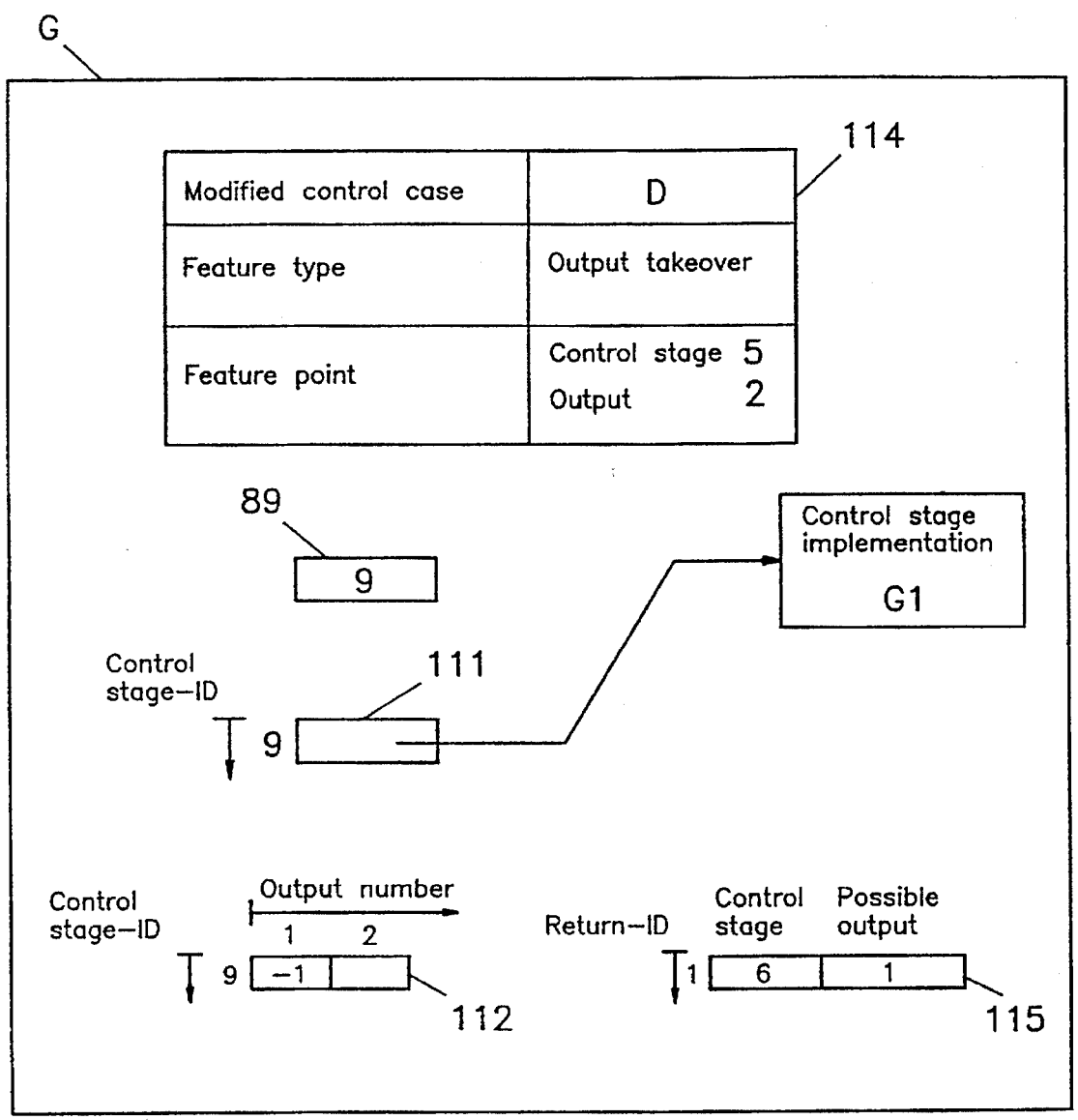
FIG. 28 illustrates an example of a representation of the control case feature G in FIG. 13.

FIG. 28 shows the representation for the control case feature G in FIG. 14. The representation is constructed in the same way as the control case feature F and it is therefore not necessary to describe this representation in greater detail. It is seen from the representation that the matter concerned is one of an output takeover having a feature point in control stage 5 output number 2, that only one control stage is found in the control case feature, that no links are present, that the return is an output return, and that the return shall take place to the control stage-ID 6 on output number 1.

Figure 29:
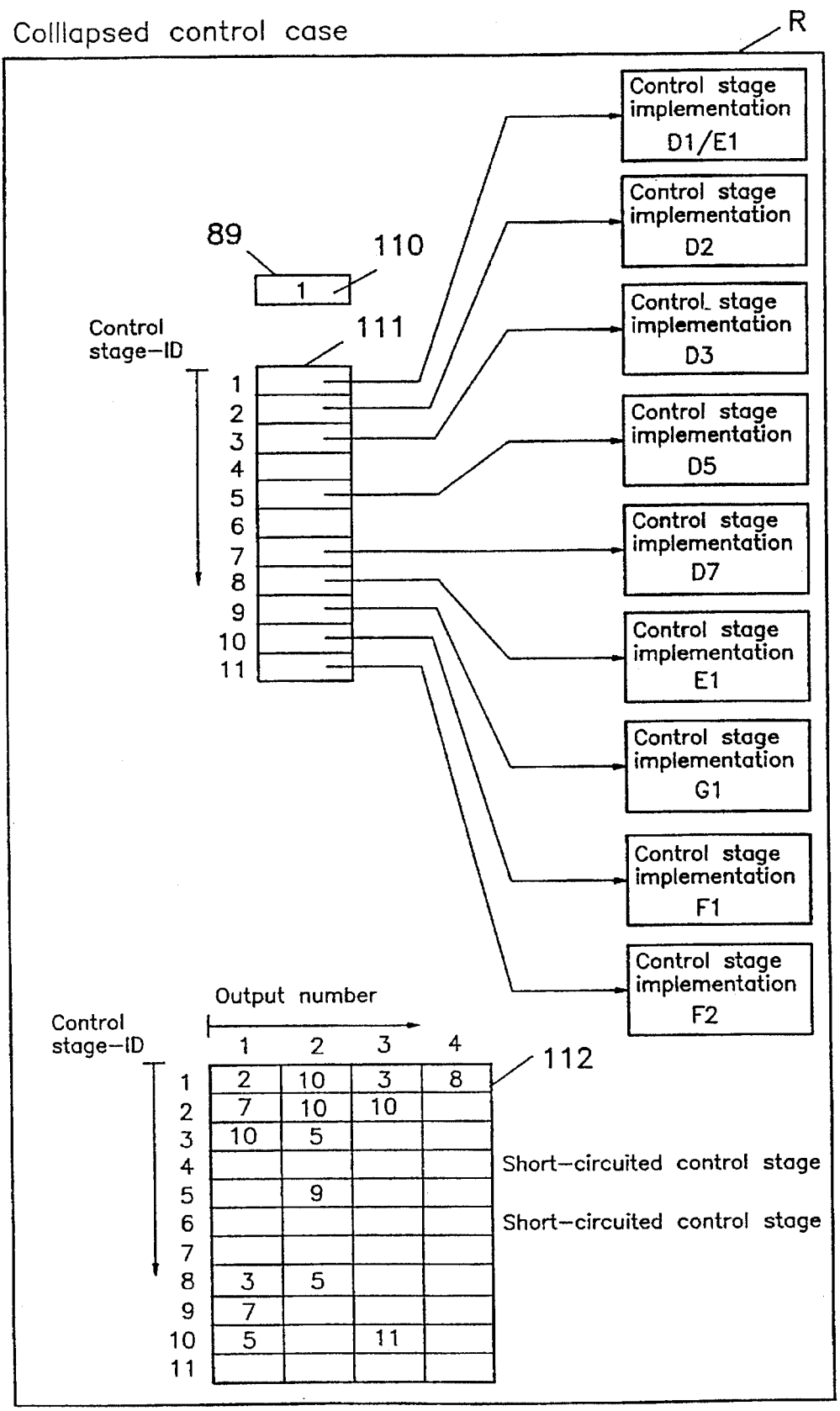
FIG. 29 illustrates an example of a collapse of the control case feature E, F, G in the control case D.

As before mentioned with reference to FIG. 15 and FIGS. 16A–F, control cases and control case features can be mutually combined while observing the ordered sequence in which they shall be executed, there being a considerable possible number of different combinations. It is possible to produce a new resultant control case from each such combination. FIG. 29 illustrates a resultant control case which is constructed from the control case D and the control case features E, F and G shown in FIG. 14. The control cases are said to be collapsed to a resultant control case. The implementation of such a collapsed control case has the same structure as remaining control cases. FIG. 29 shows the control case features E, F and G built into the control case D, and that a resultant control case R occurs. This integration of the control case and the control case features occurs through the agency of linking, in the same manner as that previously described. It is seen from the control link matrix 112 that the control stages having the control stage identities 4 and 6 are short-circuited. This fact can be read from the table, since the control link matrix does not contain any matrix elements which refer to this stage. All remaining control stage-ID numbers are present in the control link matrix 112, although, of course, with the exception of the first. It is also seen from the control link matrix that certain control stages lack outputs, among them the control stage-ID number 7. Control stages that are short-circuited have also been omitted from the implementation, since they are not of interest.

It is assumed in FIG. 29 that the control cases E, F and G have been integrated with the control case D in conjunction with the programming of the control case R and that the short-circuited control stages D4 and D6 have been omitted from the control case R. On the other hand, if the integration of said control cases has been effected when loading the software in a telephone exchange, the control stage implementations D4 and D6 will naturally remain, in accordance with what has been earlier described.

Figure 16A:
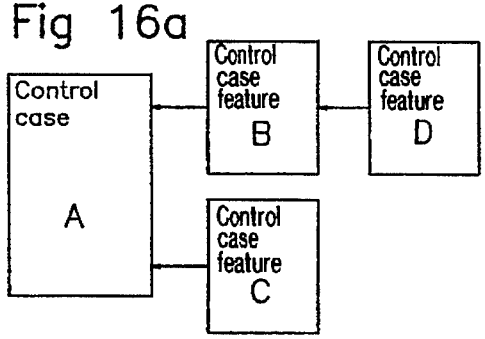
FIGS. 16A–F illustrate the various combinations that can be produced by a programmer with the control cases and control case features illustrated in FIG. 15.
Figure 16D:
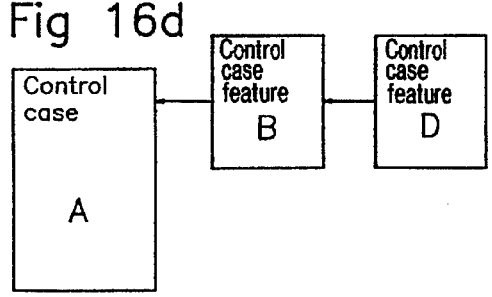
Figure 16B:
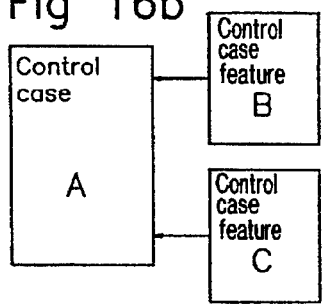
Figure 16E:
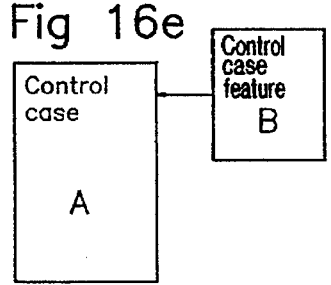
Figure 16C:
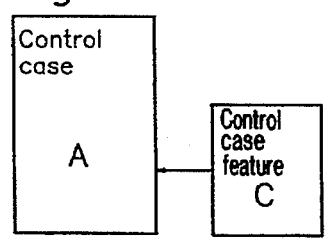
Figure 16F:
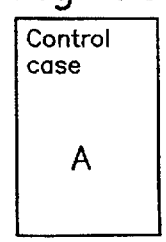

FIG. 30 illustrates the control logic 23 of FIG. 4 in more detail. That part of the Figure which lies above the broken line 119 illustrates the data structure for the representation of a control case in accordance with FIG. 23, the data structure for the representation of a control case feature in accordance with FIG. 24 and the data structure for a control case configuration 120. A control case configuration 120 is not a program, but contains data which points-out the basic control case, for instance A in FIG. 22, and the control case features, B and C, and any observing control case features D and E which may occur, all of which together form the control case to be executed. Data for the basic control case and the control case features is arranged in a first table 121A, called a priority control case list. The control case of lowest priority is the basic control case, whereafter the control case features of the basic control case follow in their order of priority. The priority desired is assigned to the control case features in conjunction with programming the control cases. Data for observing control case features, in this case features D and E, that are associated with the basic control case are disclosed in a second table 121B, called the observing control case list. The configuration 120 keeps an account of those control cases 46 which are active for each execution at that moment. The configuration 120 is influenced by operations that are directed towards the control logic executor 47. The control case configuration 120 for execution of a first control case includes a first array of data and the control case configuration 120 for the execution of a second control case includes a second array of data which is different to the first array. For instance, an execution may involve an individual telephone conversation. The control case configuration may be changed in the progress of execution. For instance, a subscriber may request a certain service during the progress of a call, in which case the data content of the control case configuration concerned will be changed so that a control case feature is superimposed dynamically on the control case. This is illustrated in FIGS. 16A–F. FIG. 16B illustrates the control case which is executed and which corresponds to a given data content of the control case configuration 120. When the subscriber requests the aforesaid service, represented by the control case feature D, a transition is made from FIG. 16B to 16A, by changing the data content of the control case configuration 120. This dynamic change is effected by the control logic executor 47 shown in detail at the bottom of FIG. 30.

The primary purpose of the control logic executor 47 is to initiate and to control the execution of control cases. Seen from a functional aspect, the control logic executor 47 includes a first functional unit 122 which initiates and terminates execution, a second functional unit 123 which executes control stages, a third functional unit 124, called a link executor, which controls linking of control cases, i.e. linking of an output from one control stage to an input of another control stage, and a fourth functional unit 125 which is called a control stage executor. The logic according to which the second functional unit 123 operates will be described below with reference to FIG. 34. The logic according to which the link executor 124 operates will be described below with reference to FIG. 36. The logic of the control stage executor 125 will be described with reference to FIG. 33. When executing a control stage, the control stage executor 125 can jump from control case to control case, depending on whether control stage specializations are present. The start logic 45 starts the control logic executor 47, by activating the functional unit 122, which therewith orders the functional unit 123 to begin execution starting from the first control stage in the first control case, referenced A, which is always the basic control case in the priority control case list 121. The functional unit then interacts with the control stage executor 125 and the link executor 124 on those occasions shown in FIG. 34. Normally, several control cases shall be executed, and it is therefore necessary to repeat the function in the function block 123 several times, as indicated by the arrow 126. Execution is terminated in response to a command from the first functional block 122, when no control stages remain to be executed in control case A.

Figure 31:
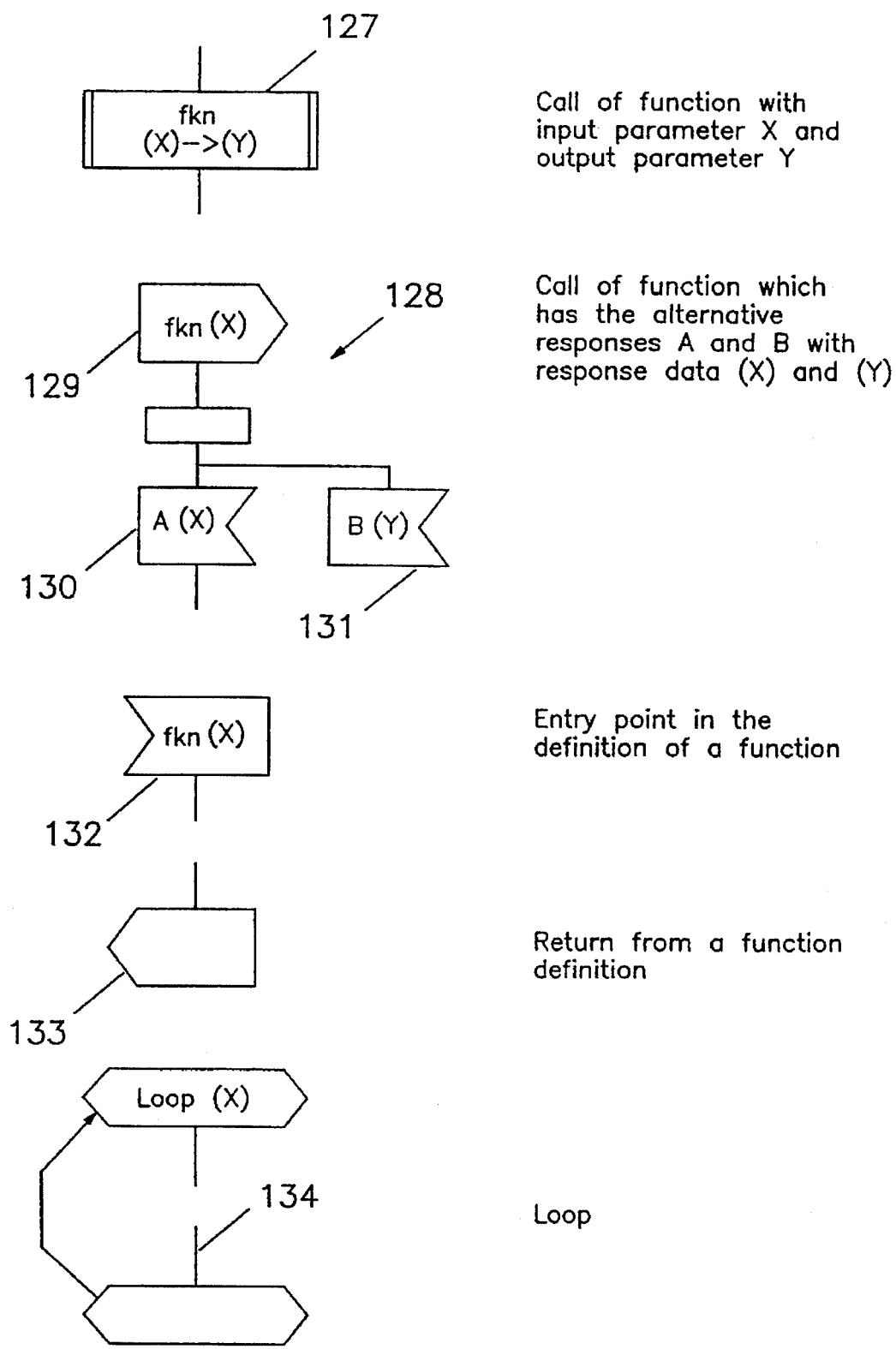
FIG. 31 clarifies graphic symbols used in different flowsheets.

FIG. 31 illustrates the notation occurring in the flowsheet described below. The symbol 127 identifies the call of a function fkn which receives an input parameter x and which returns an output parameter y. The symbol complex 128 includes a symbol 129 for a call of a function fkn (x) which, as a result of the call, returns either a response A(x), shown by the symbol 130, or a response B(x), shown by the symbol 131. These responses can be coded in many different ways. In the program language C++, one response can be considered to be a normal response, and the other will then be considered a so-called "exception". It should be noted that the symbol complex 128 is not comparable with the conventional rhomboidal question symbol with associated response. The symbol 132 has a waist and is used to mark an entry point in a function. The symbol 133 marks the transmission of a return or of responses from a function. Several symbols 133 may be present, these symbols then corresponding to different return points from a function. A function which has only one return point will thus have only the symbols 132 and 133, i.e. one input and one output. The notation 134 is used to describe a loop. The variable x is an iterator. The iterator is used, for instance, to step through all control cases. This can be effected by arranging the iterator to point-out control case after control case. The iterator will thus run over a set and take its value from each unit in the set.

Figure 32:
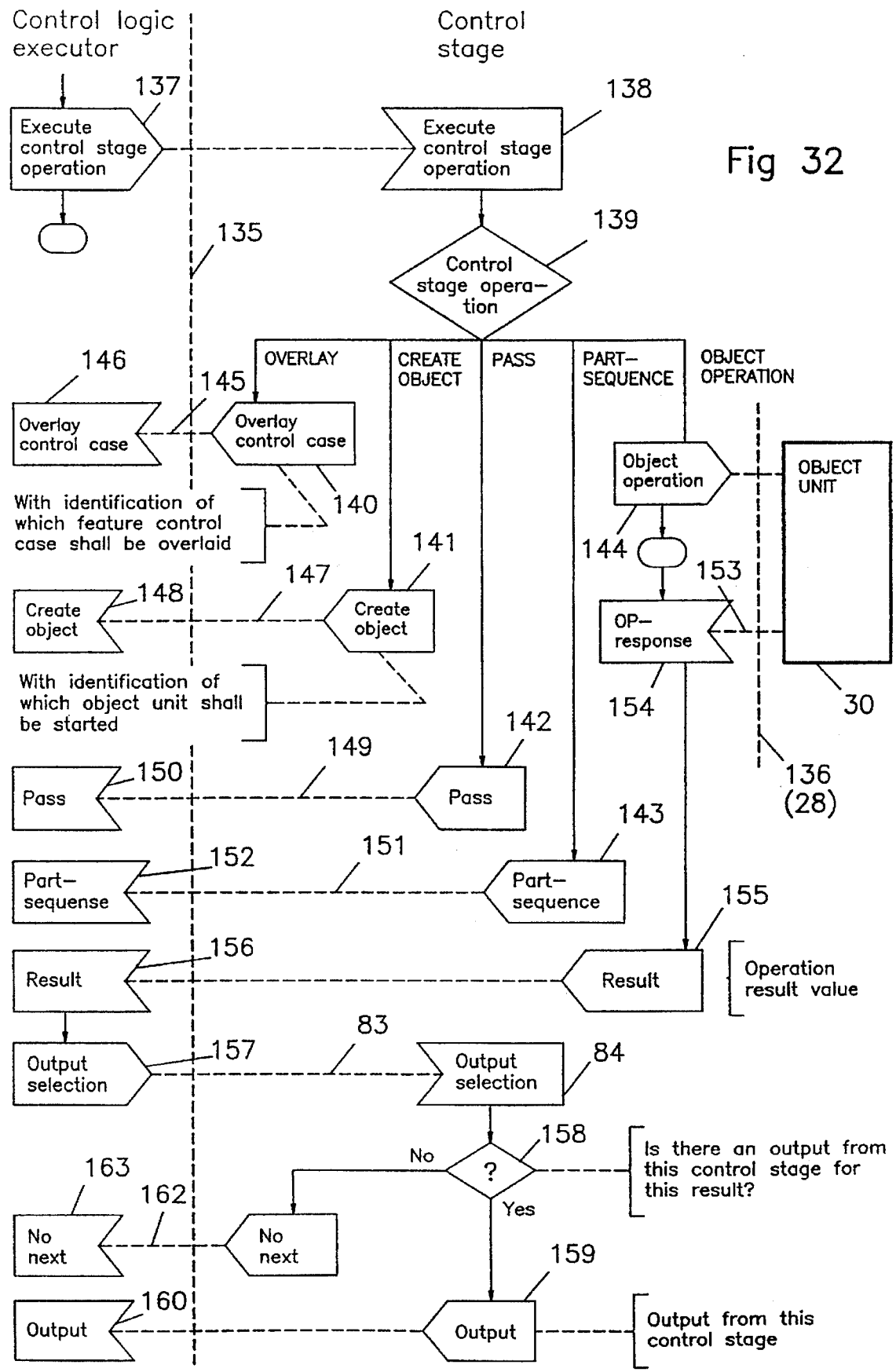
FIG. 32 is a flowsheet which illustrates the logic according to which a control stage works during its execution.

FIG. 32 illustrates the logic implementation of a control stage, for instance the control stage S1 in FIG. 12. The control stage is shown in the centre of the Figure, between the broken lines 135 and 136. The control logic executor 47 is shown to the left of the broken line 135, while what the control stage is able to create is shown to the right of the broken line 136. The broken line 135 represents an interface between the control logic executor 47 and the control stage S1, and the broken line 136 represents the interface 28, FIG. 3, between the control logic executor and those object units 30–35 that have been created with the aid of the control stage. As previously described with reference to FIG. 12, a control stage is called by the control logic executor in order to execute a control stage operation and in order to carry out an output selection. The control stage executor 47 sends a request, block 137, to the control stage requesting the stage to execute a control stage operation. The control stage receives this request, block 138. In order to be able to execute the control stage operation, it is necessary for the control stage to know which control stage operation is concerned. This selection takes place in block 139. The different control stage operations that can be achieved in a control stage include the overlaying of a control case, block 140, the creation of several objects, block 141, the execution of the operation PASS, block 142, the execution of a part-sequence, block 143, or the execution of an object operation, block 144.

The operation, superimposing or overlaying of control cases has been described earlier with reference to FIG. 14. In the case of the illustrated control case implementation, the operation overlaying of control cases is achieved simply by inserting the control case to be overlaid into the list 121A above the control case that has senior priority. It is necessary for the control stage operation 140 to send information relating to the control case or the control case feature that shall be overlaid. Such information, for instance the control case-ID, is sent in the form a signal 145 to the control logic executor and is received in a corresponding function, block 146, which overlays the stated control case/control case feature. If the control stage is to create an object, block 141, as earlier described with reference to FIG. 5, it is necessary for the control stage operation to disclose the identity in a signal 147 of the object unit to be created. This identity together with the signal to create the object is sent in a signal 147 which in turn is sent to the corresponding function 148 in the control stage executor. For instance, the matter in this case may be one of having identified a certain subscriber and of now creating a subscriber object. The operation pass, block 142, instructs the control stage executor, via a signal 149, to do nothing, i.e. the operation "do nothing", block 150.

Those operations which render a control stage so powerful include the call 143 of a part-sequence and the call 144 of an object operation. The call 144 is the connection of the control logic to the object logic. A call 143 of a part-sequence 48 results in the specification of the identity of the part-sequence and the transmission of this identity, in the form of a signal 151, to the control logic executor 47, where the call is received in a corresponding function, block 152, which initiates execution of the part-sequence. The part-sequence is executed by the control logic executor 47 and when the part-sequence has been executed to its end, a return is made to the point from which it was called.

An object operation, block 144, involves the call of one of the listed object units, e.g. the object unit 32. In response to the call, the object unit delivers an object response, indicated by the broken line 153, which is received in the control stage, block 154. This operation response corresponds to the operation responses 56, 57 and 58 in FIG. 5, i.e. discloses the state of an object. The operation responses are sent as a result, block 155, to the control stage executor. This transmission is represented by the broken line 82, which corresponds to the line 82 in FIG. 12. The control logic executor receives the result in a corresponding operation, block 156. This describes the logic for executing a control stage operation, illustrated in the upper half of FIG. 32. The logic shown in FIG. 32 is generic for all conceivable control stages. Only parts of the generic structure shown in FIG. 32 are used, depending on the actual control stage concerned.

When the control logic executor 47 has obtained a result, block 156, the control logic executor, block 157, sends a result message back to the control stage and an output selection, block 84, is now made in said control stage, this return of a result message being symbolized by the broken line 83, which corresponds to the line 83 in FIG. 12. The result message is sent, for instance, in the form of a query "Is there an output for this control stage for this result". The logic in the output selection is illustrated by selection block 158. If there is an output for the result, alternative Yes, the control stage, block 159, sends to the control logic executor a signal which identifies the output selected. Block 160 illustrates a corresponding function for receiving the identity of the output. If there is no output in the selection block 158 which corresponds to the obtained result, alternative No, the control stage, block 161, sends to the control stage executor a message informing the executor that no next output is found from the control stage, this message being symbolized by the broken line 162. The message is received in a corresponding function, block 163, in the control logic executor. In the implementation of a control case and a control case feature illustrated in FIGS. 23, 24, the output selection according to blocks 84, 158 and 159 is achieved simply by reading the control link matrix 112.

Figure 33:
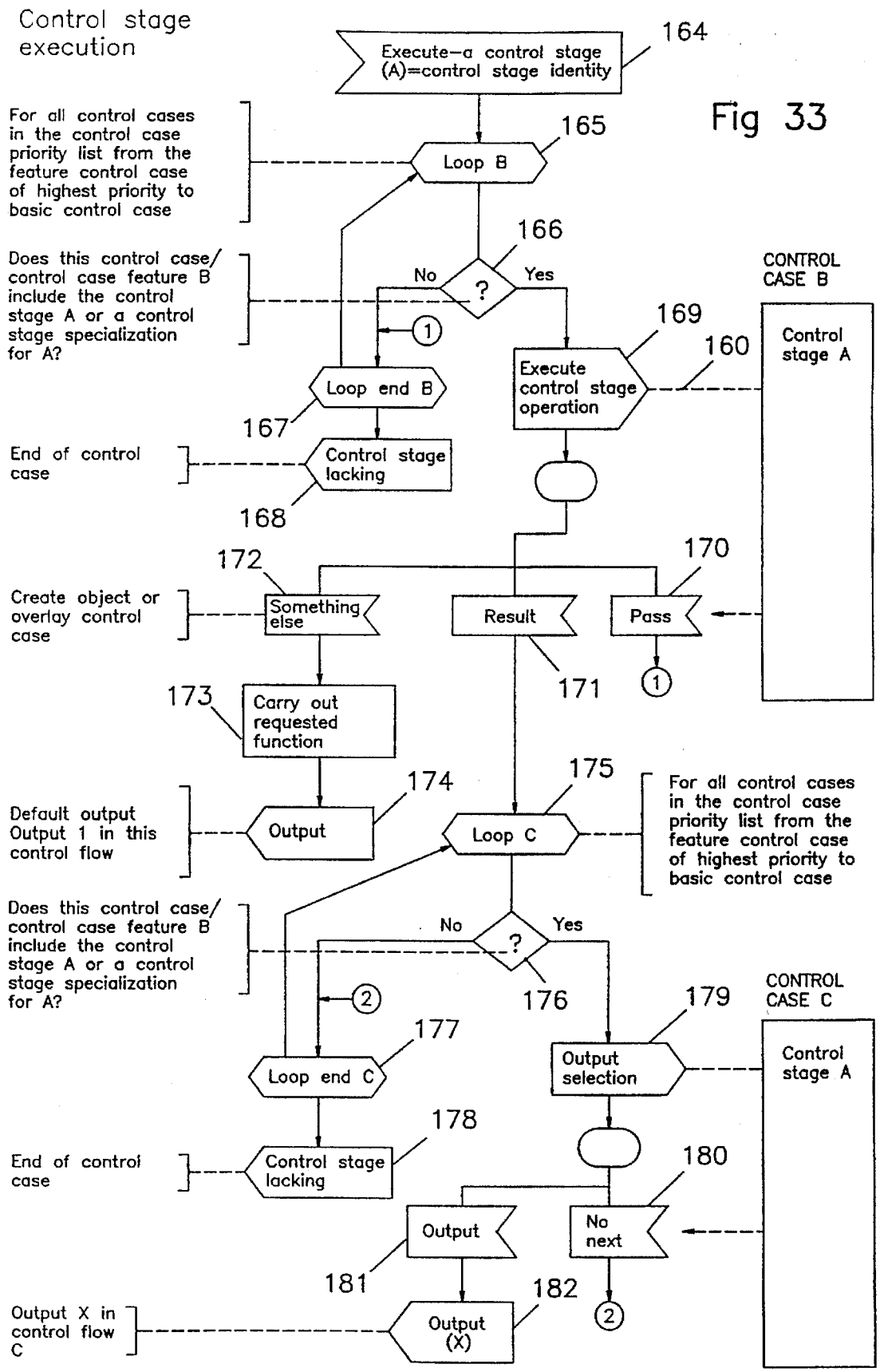
FIG. 33 is a flowsheet which illustrates the execution logic of a control logic during execution of a control stage.

FIG. 33 illustrates the logic of the control logic executor 47 in conjunction with executing a control case and any possible control case feature that is additional to the control case. The control case and control case feature are executed by the control stage. The function of the control logic executor is described with a departure from the function of a control stage. Block 164 represents the entry point in the execution of a control stage A. The function in block 164 receives an identity for the relevant control stage as an argument. A control stage and control case specializations to said stage can occur in a number of different control cases. Thus, it is first necessary to search among the overlaid or superimposed control case features in order to establish which feature has the highest priority. This is effected in loop 165 and the search is made among the control case features in the priority control case list 121A, FIG. 30. A search is made in the loop 165 to establish whether the control stage A or some specialization of the control stage is found in the control case feature that is next in line for execution. If no control stage specialization is found, which is decided in selection block 166, alternative No, the loop is ended, block 167, which means that the control stage executor moves to investigate the control case feature of the next highest priority, seen downwards in the order of priority, whereafter the loop is repeated and either no control stage is found, block 168, and the control case is ended, which may result in a return when concerning an observing control case. When the loop 165, 167 finds a control case which is to be executed, the query block 166 is answered with Yes and a control stage operation shall be executed, block 169, which thus corresponds to the block 137, FIG. 32. When the control stage operation is executed, one of the following results may be obtained, either pass, block 170, result, block 171, or something else, block 172. By something else is meant that the function of the control stage operation is to create objects or to overlay control cases. The block 171 corresponds to the block 155 in FIG. 32, and the block 172 corresponds to the blocks 140 and 141 in FIG. 32. Initially, the alternative according to block 172 is investigated and the requested function is carried out, block 173. In this case, the requested function is carried out, i.e. the control stage is overlaid or an object is created. Subsequent to having carried out the operations in the control stage, a switch is made to the output of the control stage, block 174. It is assumed in this case that output number 1 is the default output. On the other hand, if the control stage operation is pass, block 170, a switch is made to the program position 1 in loop 167. The control stage operation was thus of the type illustrated in FIG. 18A and the operation still wishes to enter in order to investigate the output selection. However, the operation does not wish to give priority to the control case in just this particular instance. The loop continues to search for a control case or a control case feature of lower priority. An operation is finally found, which then gives he result 190. 171. The first part of the control stage is therewith executed.

The next step to be carried out when executing a control stage involves output selection. Since all results are returned to the control logic executor, it is necessary to start a new loop, block 175, and to search through all control cases in order to ascertain whether or not the result belongs to a control case feature of higher priority, whereafter the loop continues to examine all control case features in the order of priority in a downward direction in the priority control case list 121A, until there is found a control case feature which has an output selection for the result concerned, block 179. The search made in loop 175 begins with the control case feature that has the highest priority in the list 121A. If this control case feature has no output selection which suits the result concerned, selection block 176, alternative No, the loop continues with the next control case feature in the list 121A. This enables the search to be made among all control case features in the list 121A until all of the control case features in the list 121A have been examined without finding an appropriate control case feature, block 177. A message is then sent to the control logic executor to the effect that control stages having an output selection for the result concerned are not to be found, i.e. are lacking, block 178. On the other hand, if the loop 175 in the list 121A finds a control case or a control case feature which has an output selection that suits the result concerned, alternative Yes in selection block 176, the loop 175 is broken and an output selection is made, block 179. However, the control logic executor is not certain that the control stages in the control case feature found has an output selection, since the result "no next", block 180, can be obtained. In this case, a switch is made to program position 2, which corresponds to a continuation of the selection alternative No in selection block 176. The loop now ends. There is thus no output for the obtained result. The logic is such that when there is no output which fits, or suits, the obtained result, the situation "no next" is said to occur. On the other hand, if the output selection 179 gave a result which corresponds to an output, block 181, then agreement is found between the result and output number and the control stage executor obtains the number on the relevant output, block 182. This number is signalled to the control stage executor. The control stage executor is therewith informed of the output to which the control stage shall be delivered, with relevant attention being paid to any control stage specializations that may occur. In other words, it can be said that in addition to executing control stages, the control stage execution process also implements the feature function implied by control stage specializations. On the other hand, the manner in which the control stage executor implements input takeover, output takeover and return is described with reference to the flowsheet shown in FIG. 34. The two loops 165 and 175 shown in FIG. 33 implement the three variants of control stage specialization illustrated in FIGS. 17–19. The first loop 165 is effected in order to find the operation in the control stage specialization, and the second loop 175 is effected in order to find the output selection. In the case of the implementation illustrated in FIGS. 23, 24, the output selection is achieved by examining the control link matrix 112 or a control stage specialization. An empty block in the control link matrix is corresponded by the block 180, "no next", whereas a block which includes a matrix element is corresponded by block 181 and 182.

Figure 34:
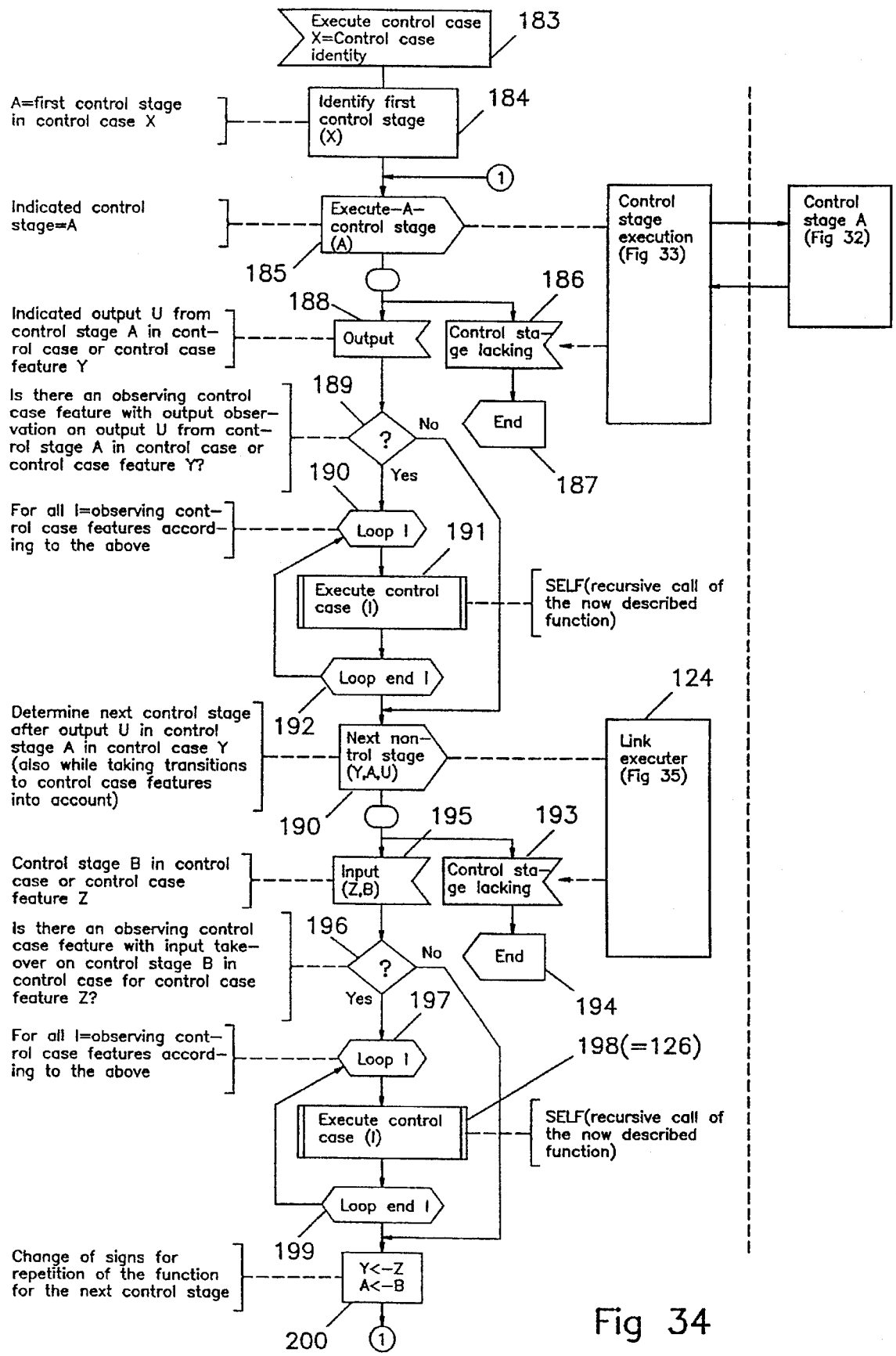
FIG. 34 is a flowsheet which illustrates the logic of a control logic execution during the execution of a control case.

The execution of a control case is started by the control logic executor receiving the identity X of the control case to be executed, the start block 183 in FIG. 34. This identity is obtained, for instance, from the start logic 45 in the manner described with reference to FIG. 36. As will be seen from FIGS. 23–29, there is included a data field 110 which includes information relating to the identity of the first control stage. Block 184 in FIG. 34 identifies the function of identifying the first control stage by reading the information contained in the data field 110.

Figure 35:
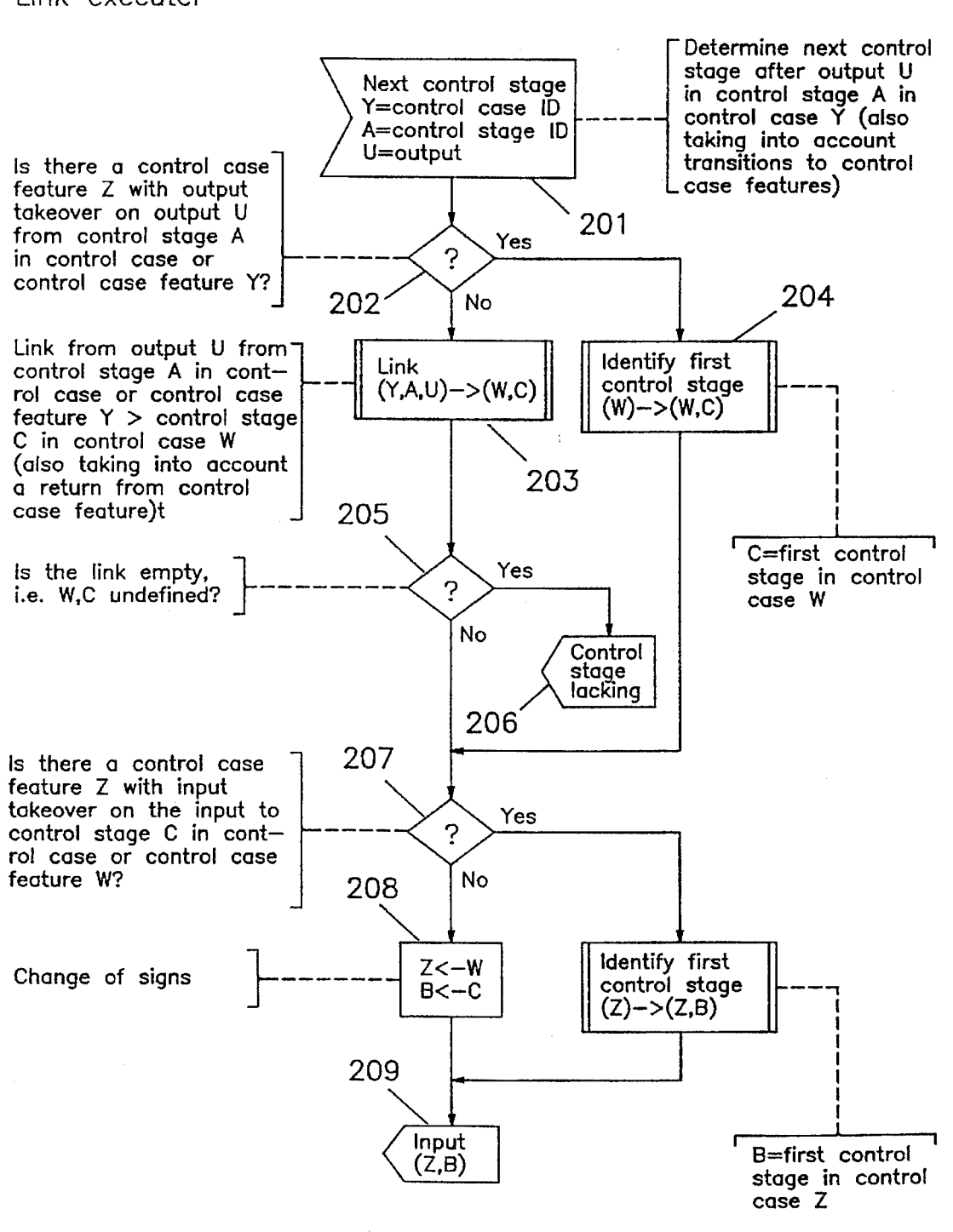
FIG. 35 is a flowsheet which illustrates the logic according to which the link execution works.

The first control stage is executed by calling the control logic executor 47, block 185. When the executor 47 is called, the executor, in turn, calls the control stage with the given identity, FIG. 32, and therewith obtain a response. The response obtained from the control logic executor 47 may be that the control stage is not found, block 186, wherewith the control case ends, block 187, or that a given output is pointed-out, block 188, wherewith the number of the output is received. If there is no control stage, block 187, it is a simple matter of a return, namely the only return that is found, and the control case is ended. If there is found an output, block 188, the control logic executor will have delivered the output number to said output and the control logic executor will have learned of this number from a control stage A1 in a control case or a control case feature Y. It should be noted that this control case feature is not necessarily the same feature as that which was called by the control stage A1, since control stage specializations may occur. See for instance FIG. 14, in which execution of the control stage D1 involves a transition or switch to the control case feature E. The control logic executor thus orders execution of the control case D1 in the control case D, but the output from this control case is found in the control case feature E, i.e. the control case has been changed. In order to find this output, it is first ascertained whether or not there is an observing control case feature that has an output takeover on the output that is pointed-out in function block 188 from the control stage A1 in the control case or in a control case feature Y. This investigation takes place in selection block 189. Thus, if no observing control case feature is found, alternative No in selection block 189, a switch is made to the next control stage after the output U in control stage A1 in the control case feature Y. This is shown in block 190. On the other hand, if an observing control case feature is found, the Yes alternative in selection block 189, there is produced a loop 190 which searches through all observing control case features and simply executes these features, block 191. All observing control case features are executed and the loop comes to an end, block 192, wherein the next-following control stage is determined, block 190, which is effected by calling the link executor 124, the logic of which is illustrated in FIG. 35. The link executor identifies the next-following control stage, as described above. In the simplest case, a link is traced from one output to an input, although the procedure may be complicated by the presence of an output takeover. The link executor informs the control logic executor 47 of the next-following control stage after the output U in the control stage A1 of the control case Y. In response, the control logic executor may obtain the answer that a control stage is lacking, block 193. The control case is therewith ended, block 194, since no link is found. For instance, the execution process has reached the control stage D7 shown in FIG. 14. However, the normal case is that the link executor will find an input to a new control stage B1, either via the link or via an input return. A new control stage B1 has therewith been identified in a control case B or in a control case feature Z. This identification is denoted by the function block 195. Subsequent to such identification having taken place, it may again be a question of a new control case. Irrespective of whether the control case is new or not, a check is made in block 196 to ascertain whether any observing control case features that have input takeover are found on the identified input. If such features are present, they are executed. This is illustrated by arrow 126 in FIG. 30. It was earlier ascertained, loop 190, whether or not observing control case features were to be found on the output. Now, however, it is ascertained whether or not such observing control case features are to be found on the input and, in a similar manner to that earlier described, all such observing control case features in a loop 197 are executed with the function 198 of executing such observing control cases. Finally, no observing control case features remain to be executed, and a loop end 199 is reached and the control logic executor 47 has therewith arrived at the next-following control stage via the link, block 200. A change of signs takes place in block 200, i.e. Z becomes Y and B1 becomes A1, whereafter the function for the next-following control stage is repeated and a switch is made to program position 1 beneath block 184.

FIG. 35 illustrates the link executor 124, the function of which is to cause jumps between control cases. The link executor will be described in relation to the data structures illustrated in FIGS. 23–29, and thus utilizes the information contained in the control stage tables 111 and the control link matrices 112 to carry out its work. The first function of the link executor, block 201, is called "next control stage" and as an argument receives control case-ID=Y, control stage-ID=A1 and output number=U. The link executor is intended to find the link to the next-following control stage from this output U. The first query investigated by the link executor is whether or not a control case feature Z with output takeover is found on output U from control stage A1, in a control case or in a control case feature Y. This is effected in selection block 202. If no control case feature is found on the output concerned, the No alternative, a switch is made to the function LINK, block 203, which denotes that output U from control stage A1 in a control case or a control case feature Y is linked to a control stage C1 in a control case W, while also taking into account a return from the control case feature. The function LINK is implemented simply by reading the control link matrix for the control case concerned. Reading of the control case Y or the control case feature Y may involve a return to the control case W.

When a takeover is found on the output concerned, the Yes alternative in selection block 202, a switch is made to a function which identifies the first control stage, block 204. This function simply means that a new control case is pointed-out, namely the control case that shall take over the execution. Information relating to this new control case is obtained from block 110 in FIG. 24.

If the function block 203 indicated by the link is empty, i.e. if the control link matrix does not include an output, this indicates that a control stage is lacking. Whether or not this is the case is ascertained in selection block 205. If a control stage is lacking, the Yes alternative in selection block 205, this fact is divulged to the control stage executor, block 206. If no output is lacking, there is thus found an output and this output may arrive from the link function 203 or from the function 204. Thus, in the flowsheet shown in FIG. 14, we have passed from an output to an input and it is now necessary to ascertain whether or not any further control case feature is present on the indicated input, which is achieved in selection block 207. For instance, the indicated input may have a control case feature with input takeover. If no such control Ease feature is found, the No alternative in selection block 207, the input sought for has thus been encountered, block 209. The signs of the control cases and the control case features are now changed in the same manner as that earlier described, and the identified control case is referenced B whereas the identified control case feature is referenced Z. This change of sign takes place in block 208. The indicated input sends a message back to the input of control stage B in the control case Z. On the other hand, if there is found a control stage which constitutes an input takeover on the input, for instance the control stage F1 in FIG. 14, the link executor is informed to this effect, by reading the feature information 114 in all control case features. Several control stages may form a feature on an input and it is therefore necessary to introduce a loop (not shown) before the link executor is able to express itself positively as to which control stage is the first control stage. When the first control stage with input takeover is encountered, this control stage is identified, block 210.

Figure 36:
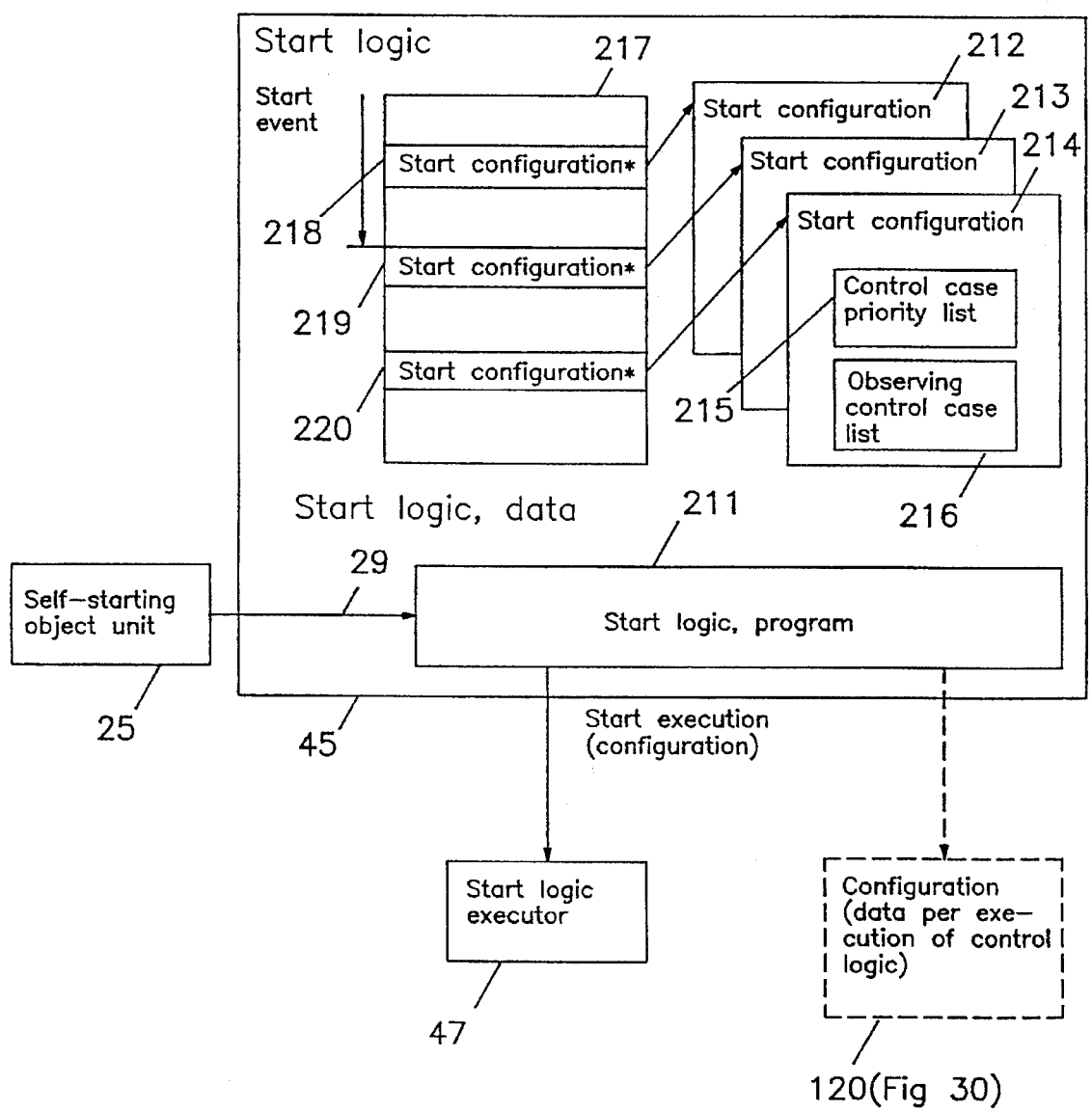
FIG. 36 is a block schematic illustrating the start logic.

FIG. 36 shows the start logic 45 in detail. The illustrated start logic is divided into data and a start logic program 211. The data includes a number of start configurations 212, 213, 214, each being associated with a respective start event. A start configuration includes data which represents a list 215 including control cases which have been assigned an order of priority, and a list 216 of observing control cases. The start logic also includes a list 217 which includes pointers 218, 219, 220 which contain address information which denotes those memory locations in which the data relating to respective control case configurations 212, 213, 214 is stored. When the start logic obtains a start event from a self-starting object unit 25, via an interface of type 29, the start logic program 211 examines the list 217 for a start configuration which corresponds to the start event. When the start event has been found, the start logic program copies the data contained in the start configuration found to the memory area or location in which the control case configuration 120 in FIG. 30 is stored. The data copied into the memory is now used as data for the control case configuration 120. As before mentioned, the data contained in the control case configuration can be changed as the control case is executed, by overlaying control cases with the aid of the operations.

By way of example, a start event is an event in which a stimulus, for instance the lifting of a telephone receiver, activates a self-starting object unit, for instance object unit 25, which in turn starts the start logic program via an interface of type 29. In this example, it is the act of lifting the telephone receiver that identifies the start event.

Figure 37:
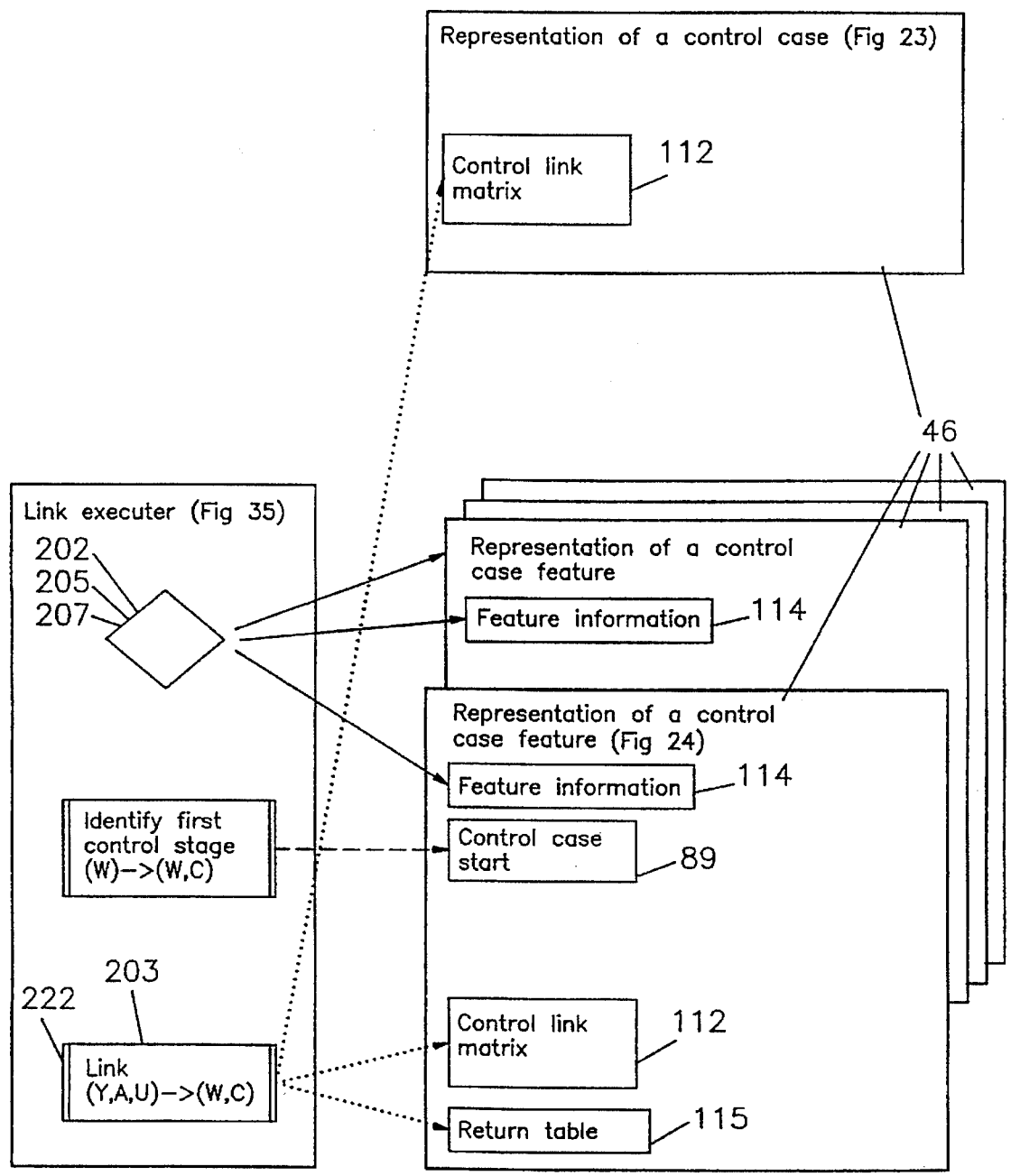
FIG. 37 is a block schematic which illustrates the relationship of the control logic executor and the link executor to data structures in a representation of a control case.

FIG. 37 illustrates the manner in which the procedures of the link executor 124, shown in FIG. 35, coact with the data structures shown in FIG. 30, i.e. with the representations of control cases and of control case features, in order to gather the requisite data information. When a control case has been identified, as described with reference to FIG. 36, it is necessary to identify the first control stage in this control case. This shall take place in procedure 221. Such identification is effected simply by reading the data in the control case start 89. The procedure LINK, block 222, corresponds to block 203 in FIG. 35, and the requisite data is read from the control link matrix and the return table for the control case concerned. The control link matrix may also be read to ascertain the next control case in turn for execution. Responses to the query procedures 202, 205, 207 illustrated in FIG. 35 are obtained at the illustrated locations where the feature information 114 is stored in the representation of the control case feature 46 concerned.

The control logic executor 47 in FIG. 34 also has a number of procedures 189, 190, 196 and 197 which obtain their information on the locations in the representation concerned, as shown in FIG. 37.

The general structure of a control stage has been described in the aforegoing with reference to FIG. 12, and the general logic for a control stage has been described with reference to FIG. 32. FIG. 38 illustrates an example of how a control stage S1 can be implemented in the form of a data structure, which is interpreted by the logic illustrated in FIG. 32. Although the control stage S1 is described in the following as a data structure, it will be understood that the same description applies as though the control stage were described as a compiled code.

The control stage S1 includes three data fields, of which a first field 223 is concerned with operation codes, a second field 224, a parameter field, is concerned with the storage of parameters, and a third field 225, a result field, is concerned with the mapping of the result values against output numbers. The operation codes are shown at the bottom of the Figure. If the operation is one of overlaying control cases, operation code 1, then the parameter field 224 must contain (1) control case-ID for the control case feature which is to be overlaid on the executed configuration, and (2) the priority of the control case feature. If the control case feature has no priority, i.e. the feature is an observing control case feature, the control case feature shall be included in the list 121B of observing control case features, as shown in FIG. 30. The operation concerning the overlaying of control cases returns no result. If the operation is one of creating a new object, marked with operation code 2, the parameter field must contain (1) the identity of the object unit for which a new object is to be created, and (2) a reference to this object, object-ID. The operation in which objects are created returns no result. The control logic executor 47 makes a list of all objects created in conjunction with the procedure 141 in FIG. 32, this list also storing object-IDs for the created objects. Starting from an object-ID, the control logic executor 47 has access to all information relating to the individual objects. If the operation in the control stage is a pass operation, operation code 3, no parameters are found and pass will return no result. If the operation is an object operation, operation code 4, i.e. an operation shall be performed on an object, the parameter field shall then contain (1) the reference to the object, i.e. object-ID, and (2) the reference to the operation. It is assumed that the operation can be carried out in sequence. An operation performed on an object will always return a result, which is mapped against an output from the control stage as described above. The result is compared either with a given value or with a given value range, stored in the field 226 shown to the left in the result table 225, and a given output corresponds to this value or this value range, as shown in the fields 227 to the right in the result table. Finally, if the operation is a part-sequence operation, operation code 5, the parameter field will include a reference to the part-sequence. The part-sequence operation gives no result. The control stage S1 has an input which is represented by calling the control stage, and the outputs from the control stage are represented by those numbers which have been assigned to the output and which are stored in the fields 227.

I claim:

1. A method for modulizing the operations of a telecommunication system which includes a number of resources and software for controlling the individual resources and the manner in which these resources coordinate at a superordinate level, wherein the software is divided into object logic and control logic, comprising the steps of:

controlling respective individual resources using said object logic, which includes a number of object units, each of which represents a respective type of resource, and wherein a resource of one specific type can be used for a number of different purposes; and controlling cooperation between corresponding resources using said control logic which includes a number of control cases, each of which in turn mutually combine a number of object units in a superordinate fashion, irrespective of the manner in which an individual object unit is intended to influence its resource.

2. A method according to claim 1, wherein a control case includes a number of control stages, each having only one input, at least one first operation and at least one output, said control stages being mutually connected by links, and wherein each of said links is constructed so as to connect one output from a preceding control stage with the input of a subsequent control stage.

3. A method according to claim 2, wherein at least one output of a number of control stages is connected to the input of one control stage.

4. A method according to claim 3, wherein the connecting points of the links connecting the control stages are potential connection points to control case features can be connected by means of links to a basic control case so as to modify said basic control case.

5. A method according to claim 4, wherein a number of control case features are connected to one basic control case.

6. A method according to claim 5, wherein one control case feature is connected to another control case feature.

7. A method according to claim 4, wherein the control stage operation is of a first type and so configured as to be directed towards objects created in the object logic and to deliver a result as a first response parameter.

8. A method according to claim 7, wherein in addition to the control stage operation of the first type, said control stage also includes output selection, and a number of outputs, the output selection being so configured as to divide the result obtained from the first control stage operation into result sets, each being associated with a respective output and being so designed to select the output from the control stage that is associated with the result set to which the result from the first control stage operation belongs.

9. A method according to claim 8, wherein the control case has at least one branch produced by using the result obtained from the first control stage operation to control the output selection in the second operation.

10. A method according to claim 9, wherein the input and/or an output of at least one control stage in the basic control case forms said connection points to which a control case feature is connected by means of links.

11. A method according to claim 10, wherein a control case feature which specializes a control stage in the basic control case is connected to a first connection point of the specialized control stage in the basic control case with a link from the first connection point to the input of the first control stage in the control case feature in order to transfer execution from the basic control case to a third operation, the control case feature when execution of the basic control case reaches the first connection point, said third operation being executed prior to the first operation in the basic control case.

12. A method according to claim 10, wherein a control case feature which replaces a control stage in the basic control case modifies the basic control case in that execution is transferred from the basic control case to the control case feature through a link from the input of the replaced control stage in the basic control case to the input of the first control stage in the control case feature, when execution of the basic control case has reached the connection point formed by said input.

13. A method according to claim 11, wherein a control case feature which expands a basic control case by transferring execution from the basic control case to the control case feature through a link from an output of a control stage in the basic control case to the input of the first control stage in the control case feature, when execution of the basic control case has reached the connection point formed by said output.

14. A method according to claim 11, wherein the control case feature specializes the basic control case by exchanging the first operation for said third operation and/or by introducing a result selection operation which shows a number of result sets, each corresponding to a respective output; and in that the result obtained from the third operation is first tested against the current output selection operation prior to being tested against the first output selection operation.

15. A method according to claim 14, wherein a first result set defined in the current output selection operation coincides with a second result set in the first output selection operation, and wherein the output in said control stage in the basic control case which corresponds to said second result set is never reached when executing either the basic control case or the control case feature.

16. A method according to claim 11, wherein a control case feature returns the execution to the basic control case through a link which connects an output from a control stage in the control case feature to the input of a control stage in the basic control case.

17. A method according to claim 16, wherein a control case feature returns the execution to the basic control case through a link which connects an output from a control stage in the control case feature to an output of a control stage in the basic control case.

18. A method according to claim 4, wherein an observing control case feature is connected to a connection point in a control stage of a control case; and wherein execution of the observing control case feature is begun when execution of the control case has reached said connection point; and execution of the observing control case being ended in the observing control case without returning execution to the basic control case.

19. A method according to claim 10, wherein a control case feature is connected to the basic control case in one of three ways selected from among the group including of (a) fixed connection effected in conjunction with programming basic control cases and control case features, (b) semi-fixed connection effected in conjunction with loading basic control cases and control case features in the telecommunication system, (c) dynamic connection effected in conjunction with the ongoing establishment of a connection.

20. A method according to claim 7, wherein a control stage operation is of a type which is selected from among the following group of operations: (a) a first control stage operation which directs itself towards an object; Co) a second control stage operation which orders a part-sequence to execute; (c) a third control stage operation which starts a new object; (d) a fourth control stage operation which starts another control case; (e) a fifth control stage operation which connects a control case feature to a basic control case; and (f) a sixth operation which does nothing.

21. A method according to claim 20, wherein the fifth control stage operation connects one control case feature to another control case feature.

22. A method according to claim 20, wherein when each of several control case features is connected to a common connection point in a control stage of the basic control case and all aspire simultaneously to take over the continued execution, priority is given to only one of said control case features and wherein when the execution in the basic control case reaches the common connection point, only the control case feature to which priority has been assigned will take over the execution from the basic control case.

23. A method according to claim 21, wherein the control logic includes start logic for starting an individual control case, and a control logic executor for controlling the execution of a started control case.

24. A method according to claim 23, wherein the control logic executor has a control case configuration which includes a list of the basic control cases, control case features and any observing control case features that are present, which together form a control case.

25. A method according to claim 24, wherein the start logic includes a start logic program, a number of start configurations, each being associated with a respective start event and each representing those control cases, control case features and, when applicable, observing control case features that have previously been associated with the start events, and when a start event occurs, the start logic functions to copy the start configuration corresponding to said start event to the control case configuration of the control logic executor, and wherein the control logic executor begins to execute the control case corresponding to the start event.

26. A method according to claim 25, wherein a self-starting object unit, which in response to a stimulus initiates a start event for starting a control case.

27. A method according to claim 26, wherein a first control case initiates a start event which causes the start logic to initiate in the control logic executor execution of a second control case which differs from the first control case.

28. A method according to claim 27, wherein each object unit has a respective standardized interface towards its respective resource; and in that all self-starting object units also include a respective second standardized interface towards the control logic.

29. A method according to claim 28, wherein the object units are of a first and a second kind, the first kind functioning to control hardware and the second kind functioning to control the allocation of memory locations for the storage of data relating to subscribers, services and routing.

30. A method according to claim 29, in which each object unit includes a first operation for creating objects, a last operation for annulling a created object, wherein the object unit also preferably includes an operation which is directed towards a created object; and in that said operation always delivers a result as a first response parameter.

* * * * *